US007134687B2

(12) United States Patent
Breed et al.

(10) Patent No.: US 7,134,687 B2
(45) Date of Patent: Nov. 14, 2006

(54) REAR VIEW MIRROR MONITOR

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 250 days.

(21) Appl. No.: 10/365,129

(22) Filed: Feb. 12, 2003

(65) Prior Publication Data
US 2003/0184065 A1  Oct. 2, 2003

Related U.S. Application Data

(63) Continuation-in-part of application No. 10/114,533, filed on Apr. 2, 2002, now Pat. No. 6,942,248, which is a continuation-in-part of application No. 10/058,
(Continued)

(51) Int. Cl.
*B60R 21/16* (2006.01)
(52) U.S. Cl. .......................................... 280/735; 701/45
(58) Field of Classification Search ................ 280/734, 280/735; 701/45; 340/436, 438, 446, 447
See application file for complete search history.

(56) References Cited

U.S. PATENT DOCUMENTS

| 3,275,975 A | 9/1966 | King .............................. 340/1 |
| 3,974,350 A | 8/1976 | Breed .......................... 200/61 |

(Continued)

FOREIGN PATENT DOCUMENTS

| DE | 4023109 | 1/1992 | | |
| JP | 1-197151 | 8/1989 | ................. | 180/287 |
| JP | 3-533 | 1/1991 | ................. | 180/272 |
| WO | 94/22693 | 10/1994 | ................. | 280/735 |

OTHER PUBLICATIONS

"Vehicle Occupant Position Sensing", D. Breed, W. DuVall and V. Castelli, SAE Paper No. 940527, Feb. 1994.
"Learned Classification of Sonar Targets Using a Massively Parallel Network", R.P. Gorman and T.J. Sejnowski, IEEE Transactions on Acoustics, Speech and Signal Processing, vol. 36, No. 7, Jul. 1988.
"Analysis of Hidden Units in a Layered Network Trained to Classify Sonar Targets", R.P. Gorman and T.J. Sejnowski, Neural Networks, vol. 1, pp. 75-89, 1988.

*Primary Examiner*—Paul N. Dickson
*Assistant Examiner*—Toan C. To
(74) *Attorney, Agent, or Firm*—Brian Roffe

(57) ABSTRACT

A vehicle including a system for obtaining information about occupants of the vehicle including a rear-view mirror including a mirror part and a support for mounting the mirror part to the vehicle (such as to a windshield of the vehicle), a wave-receiving system arranged on the mirror for receiving waves from spaces above seats of the vehicle in which occupants would normally be situated and a processor coupled to the wave-receiving system and arranged to obtain information about the occupants based on the waves received by the wave-receiving system. The wave-receiving system may include an infrared receiver, a transmitter/receiver capable of transmitting and receiving waves, an ultrasonic wave receiver and/or an array for displaying infrared light reflected from or generated by the occupants. Based on the waves received by the wave-receiving system, the processor may identify or ascertain the identity of the occupants, determine the position or movement of the occupants and/or determine the distance between the wave-receiving system and the occupants. The processor may embody a pattern recognition system for obtaining information about the occupants based on training designed to create an algorithm capable of processing data on the waves received by the wave-receiving system into information about the occupants.

22 Claims, 36 Drawing Sheets

Related U.S. Application Data 706, filed on Jan. 28, 2002, which is a continuation-in-part of application No. 09/891,432, filed on Jun. 26, 2001, now Pat. No. 6,513,833, which is a continuation-in-part of application No. 09/838,920, filed on Apr. 20, 2001, now Pat. No. 6,778,672, which is a continuation-in-part of application No. 09/563,556, filed on May 3, 2000, now Pat. No. 6,474,683, which is a continuation-in-part of application No. 09/437,535, filed on Nov. 10, 1999, now Pat. No. 6,712,387, which is a continuation-in-part of application No. 09/047,703, filed on Mar. 25, 1998, now Pat. No. 6,039,139, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,703 is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 10/058,706 is a continuation-in-part of application No. 09/639,299, filed on Aug. 15, 2000, now Pat. No. 6,422,595, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299 is a continuation-in-part of application No. 09/409,625, filed on Oct. 1, 1999, now Pat. No. 6,270,116, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299 is a continuation-in-part of application No. 09/448,337, filed on Nov. 23, 1999, now Pat. No. 6,283,503, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 09/639,299 is a continuation-in-part of application No. 09/448,338, filed on Nov. 23, 1999, now Pat. No. 6,168,198, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, said application No. 10/058,706 is a continuation-in-part of application No. 09/543,678, filed on Apr. 7, 2000, now Pat. No. 6,412,813, which is a continuation-in-part of application No. 09/047,704, filed on Mar. 25, 1998, now Pat. No. 6,116,639, which is a continuation-in-part of application No. 08/640,068, filed on Apr. 30, 1996, now Pat. No. 5,829,782, which is a continuation of application No. 08/239,978, filed on May 9, 1994, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,704 is a continuation-in-part of application No. 08/905,876, filed on Aug. 4, 1997, now Pat. No. 5,848,802, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned, application No. 10/365,129, which is a continuation-in-part of application No. 10/151,615, filed on May 20, 2002, which is a continuation-in-part of application No. 09/891,432, filed on Jun. 26, 2001, now Pat. No. 6,513,833, which is a continuation-in-part of application No. 09/838,920, filed on Apr. 20, 2001, which is a continuation-in-part of application No. 09/563,556, filed on May 3, 2000, now Pat. No. 6,474,683, which is a continuation-in-part of application No. 09/437,535, filed on Nov. 10, 1999, said application No. 09/437,535 is a continuation-in-part of application No. 09/047,703, filed on Mar. 25, 1998, now Pat. No. 6,039,139, which is a continuation-in-part of application No. 08/640,068, filed on Apr. 30, 1996, now Pat. No. 5,829,782, which is a continuation of application No. 08/239,978, filed on Mar. 31, 1993, now abandoned, which is a continuation-in-part of application No. 08/040,978, filed on Mar. 31, 1993, now abandoned, which is a continuation-in-part of application No. 07/878,571, filed on May 5, 1992, now abandoned, said application No. 09/047,703 is a continuation-in-part of application No. 09/639,299, filed on Aug. 15, 2000, which is a continuation-in-part of application No. 09/543,678, filed on Apr. 7, 2000, which is a continuation-in-part of application No. 09/047,704, filed on Mar. 25, 1998, now Pat. No. 6,116,639, and a continuation-in-part of application No. 08/905,876, filed on Aug. 7, 1997, now Pat. No. 5,848,802, which is a continuation of application No. 08/905,877, filed on Aug. 4, 1997, now Pat. No. 6,186,537, and a continuation-in-part of application No. 08/905,876, filed on Aug. 4, 1997, now Pat. No. 5,848,802, which is a continuation-in-part of application No. 08/640,068, filed on Apr. 30, 1996, now Pat. No. 5,829,782, which is a continuation of application No. 08/505,036, filed on Jul. 21, 1995, now Pat. No. 5,653,462, which is a continuation of application No. 08/505,036, filed on Jul. 25, 1995, now Pat. No. 5,653,462, which is a continuation of application No. 08/505,036, filed on Jul. 21, 1995, now Pat. No. 5,653,462, which is a continuation of application No. 08/239,978, filed on May 9, 1994, now abandoned, which is a continuation of application No. 08/040,978, filed on Mar. 31, 1993, now abandoned, which is a continuation of application No. 08/040,978, filed on Mar. 31, 1993, now abandoned, which is a continuation-in-part of application No. 07/878,571, filed on May 5, 1992, which is a continuation of application No. 07/878,571, filed on May 5, 1992, which is a continuation-in-part of application No. 07/878,517, filed on May 5, 1992, now Pat. No. 5,270,883.

(56) References Cited

U.S. PATENT DOCUMENTS

| | | | |
|---|---|---|---|
| 4,198,864 A | 4/1980 | Breed | 73/492 |
| 4,284,863 A | 8/1981 | Breed | 200/61.53 |
| 4,329,549 A | 5/1982 | Breed | 200/61.45 M |
| 4,573,706 A | 3/1986 | Breed | 280/734 |
| 4,683,373 A | 7/1987 | Tupman | 180/272 |
| 4,900,880 A | 2/1990 | Breed | 200/61.45 M |
| 4,931,767 A * | 6/1990 | Albrecht et al. | 340/425.5 |
| 4,995,639 A | 2/1991 | Breed | 280/735 |
| 5,322,323 A | 6/1994 | Ohno et al. | 280/735 |
| 5,330,226 A * | 7/1994 | Gentry et al. | 280/735 |
| 5,366,241 A * | 11/1994 | Kithil | 280/735 |
| 5,398,185 A | 3/1995 | Omura | 280/735 |
| 5,482,314 A * | 1/1996 | Corrado et al. | 280/735 |
| 5,550,677 A | 8/1996 | Schofield et al. | 359/604 |
| 5,573,269 A | 11/1996 | Gentry et al. | 280/735 |
| 5,602,734 A | 2/1997 | Kithil | 364/424.055 |
| 5,626,359 A * | 5/1997 | Steffens et al. | 280/735 |
| 5,653,462 A | 8/1997 | Breed et al. | 280/735 |
| 5,670,853 A | 9/1997 | Bauer | 318/286 |
| 5,683,103 A | 11/1997 | Blackburn et al. | 280/735 |
| 5,702,123 A * | 12/1997 | Takahashi et al. | 280/735 |
| 5,722,686 A | 3/1998 | Blackburn et al. | 280/735 |
| 5,732,375 A | 3/1998 | Cashler | 701/45 |
| 5,758,899 A | 6/1998 | Foo et al. | 280/735 |
| 5,829,782 A | 11/1998 | Breed et al. | 280/735 |
| 5,948,031 A | 9/1999 | Jinno et al. | 701/45 |
| 5,964,815 A | 10/1999 | Wallace et al. | 701/45 |
| 5,997,033 A | 12/1999 | Gray et al. | 280/735 |
| 6,007,095 A | 12/1999 | Stanley | 280/735 |
| 6,014,602 A | 1/2000 | Kithil et al. | 280/735 |
| 6,025,783 A | 2/2000 | Steffens, Jr. | 280/735 |
| 6,027,138 A | 2/2000 | Tanaka et al. | 280/735 |
| 6,029,105 A | 2/2000 | Schweizer | 280/735 |
| 6,053,529 A | 4/2000 | Frusti et al. | 280/735 |
| 6,208,249 B1 | 3/2001 | Saito et al. | 340/561 |
| 6,220,627 B1 | 4/2001 | Stanley | 280/735 |
| 6,302,545 B1 | 10/2001 | Schofield et al. | 359/601 |

* cited by examiner

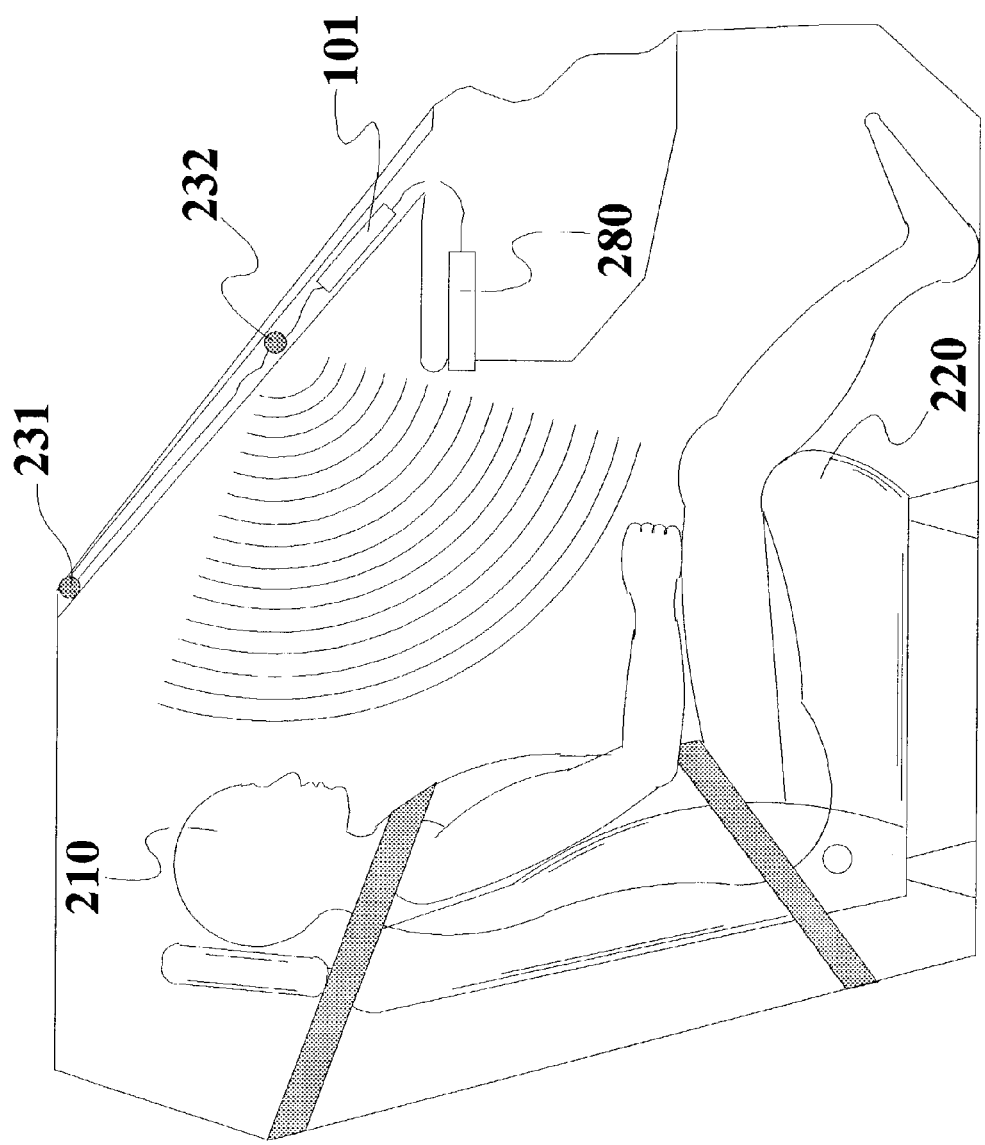

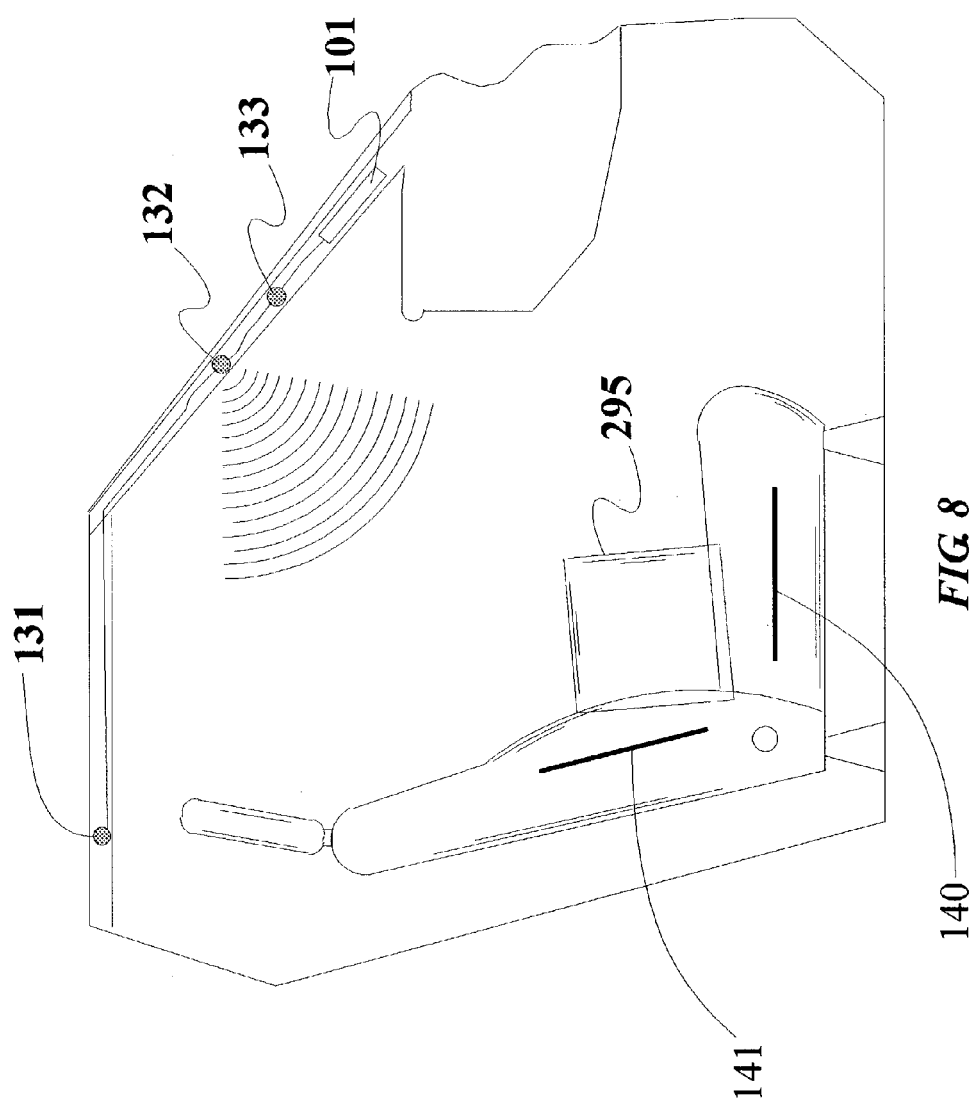

REAR VIEW MIRROR MONITOR

CROSS REFERENCE TO RELATED APPLICATIONS

This application is a continuation-in-part of U.S. patent application Ser. No. 10/114,533 filed Apr. 2, 2002 now U.S. Pat. No. 6,942,248 which in turn is a continuation-in-part of U.S. patent application Ser. No. 10/058,706 filed Jan. 28, 2002 which in turn is:

1) a continuation-in-part of U.S. patent application Ser. No. 09/891,432, filed Jun. 26, 2001, now U.S. Pat. No. 6,513,833, which is a continuation-in-part of U.S. patent application Ser. No. 09/838,920 filed Apr. 20, 2001 now U.S. Pat. No. 6,778,672 which is a continuation-in-part of U.S. patent application Ser. No. 09/563,556 filed May 3, 2000, now U.S. Pat. No. 6,474,683, which is a continuation-in-part of U.S. patent application Ser. No. 09/437,535 filed Nov. 10, 1999 now U.S. Pat. No. 6,712,387 which in turn is a continuation-in-part of U.S. patent application Ser. No. 09/047,703 filed Mar. 25, 1998, now U.S. Pat. No. 6,039,139, which in turn is:

a) a continuation-in-part of U.S. patent application Ser. No. 08/640,068 filed Apr. 30, 1996, now U.S. Pat. No. 5,829,782, which in turn is a continuation application of U.S. patent application Ser. No. 08/239,978 filed May 9, 1994, now abandoned, which is a continuation-in-part of U.S. patent application Ser. No. 08/040,978 filed Mar. 31, 1993, now abandoned, which is a continuation-in-part of U.S. patent application Ser. No. 07/878,571 filed May 5, 1992, now abandoned; and b) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application.

2) a continuation-in-part of U.S. patent application Ser. No. 09/639,299 filed Aug. 15, 2000 which is:

a) a continuation-in-part of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application;

b) a continuation-in-part of U.S. patent application Ser. No. 09/409,625 filed Oct. 1, 1999, now U.S. Pat. No. 6,270,116, which is a continuation-in-part of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application; and c) a continuation-in-part of U.S. patent application Ser. No. 09/448,337 filed Nov. 23, 1999, now U.S. Pat. No. 6,283,503, which is a continuation-in-part of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application; and d) a continuation-in-part of U.S. patent application Ser. No. 09/448,338 filed Nov. 23, 1999, now U.S. Pat. No. 6,283,503, which is a continuation-in-part of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application; and 3) a continuation-in-part of U.S. patent application Ser. No. 09/543,678 filed Apr. 7, 2000 which is a continuation-in-part of U.S. patent application Ser. No. 09/047,704 filed Mar. 25, 1998, now U.S. Pat. No. 6,116,639, which in turn is:

a) a continuation-in-part of U.S. patent application Ser. No. 08/640,068 filed Apr. 30, 1996, now U.S. Pat. No. 5,829,782, which in turn is a continuation application of U.S. patent application Ser. No. 08/239,978 filed May 9, 1994, now abandoned, which is a continuation-in-part of U.S. patent application Ser. No. 08/040,978 filed Mar. 31, 1993, now abandoned, which is a continuation-in-part of U.S. patent application Ser. No. 07/878,571 filed May 5, 1992, now abandoned; and b) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of the 08/040,978 application which is a continuation-in-part of the 07/878,571 application This application is also a continuation-in-part of U.S. patent application Ser. No. 10/151,615 filed May 20, 2002 which in turn is:

1) a continuation-in-part of U.S. patent application Ser. No, 09/891,432, filed Jun. 26, 2001, now U.S. Pat. No. 6,513,833, which is a continuation-in-part of U.S. patent application Ser. No. 09/838,920 filed Apr. 20, 2001 now U.S. Pat. No. 6,778,672, which is a continuation-in-part of U.S. patent application Ser. No. 09/563,556 filed May 3, 2000, now U.S. Pat. No. 6,474,683, which is a continuation-in-part of U.S. patent application Ser. No. 09/437,535 filed Nov. 10, 1999 now U.S. Pat. No. 6,712,387, which in turn is a continuation-in-part of U.S. patent application Ser. No. 09/047,703 filed Mar. 25, 1998, now U.S. Pat. No. 6,039,139, which in turn is:

a) a continuation-in-part of U.S. patent application Ser. No. 08/640,068 filed Apr. 30, 1996, now U.S. Pat. No. 5,829,782, which in turn is a continuation application of U.S. patent application Ser. No. 08/239,978 filed May 9, 1994, now abandoned, which is a continuation-in-part of U.S. patent application Ser. No. 08/040,978 filed Mar. 31, 1993, now abandoned, which is a continuation-in-part of U.S. patent application Ser. No. 07/878,571 filed May 5, 1992, now abandoned; and b) a continuation-in-part of U.S. patent application Ser. No. 08/905,876 filed Aug. 4, 1997, now U.S. Pat. No. 5,848,802, which is a continuation of U.S. patent application Ser. No. 08/505,036 filed Jul. 21, 1995, now U.S. Pat. No. 5,653,462, which is a continuation of the 08/040,978 filed Mar. 31, 1993 now abandoned application which is a continuation-in-part of the 07/878,571 application filed May 05, 1992 now abandoned;

2) a continuation-in-part of U.S. patent application Ser. No. 09/639,299 filed Aug. 15, 2000 now U.S. Pat. No. 6,722,595 which is a continuation of U.S. patent application Ser. No. 08/905,877 filed Aug. 4, 1997, now U.S. Pat. No. 6,186,537, which is a continuation of U.S. patent application Ser. No. 08/505,036 filed Jul. 21, 1995, now U.S. Pat. No. 5,653,462, which is a continuation of the 08/040,978 filed May 31, 1993 now abandoned application which is a continuation-in-part of the 07/878,571 application filed May 05, 1992 now abandoned; and 3) a continuation-in-part of U.S. patent application Ser. No. 09/543,678 filed Apr. 7, 2000 which in turn is a continuation-in-part of U.S. patent application Ser. No. 09/047,704 filed Mar. 25, 1998, now U.S. Pat. No. 6,116,639, which is: 1) a continuation-in-part of the 08/640,068 application which is a continuation application of the 08/239,978 application; and 2) a continuation-in-part of the 08/905,876 application, which a is continuation of the 08/505,036 application, which is a continuation of the 08/040,978 application which continuation-in-part of the 07/878,571 application.

This application is also related to (in view of common subject matter), but does not claim priority from, U.S. patent application Ser. No. 09/084,641 filed May 26, 1998, now U.S. Pat. No. 5,901,978, U.S. patent application Ser. No. 09/562,994 filed May 1, 2000, now U.S. Pat. No. 6,254,127, U.S. patent application Ser. No. 09/891,665 filed Jun. 26, 2001, and U.S. patent application Ser. No. 09/543,997 filed Apr. 6, 2000, now U.S. Pat. No. 6,234,520.

All of the foregoing patent applications and patents are incorporated by reference herein in their entirety.

FIELD OF THE INVENTION

The present invention relates generally to methods and arrangements for obtaining information about an occupying item in a vehicle using a wave-detecting device . The wave-detecting device is arranged in association with a processor so that the detected waves can be processed to provide information about the occupying item, such as its presence, position, or information about the vehicle. In a preferred embodiment, the wave-detecting device is arranged in connection with a rear view mirror.

BACKGROUND OF THE INVENTION

1. History and General Statement of the Problem

In 1984, the National Highway Traffic Safety Administration (NHTSA) of the U.S. Department of Transportation issued a requirement for frontal crash protection of automobile occupants. This regulation mandated "passive occupant restraints" for all passenger cars by 1992. A more recent regulation required both driver and passenger side airbags on all passenger cars and light trucks by 1998. In addition, the demand for airbags is constantly accelerating in both Europe and Japan (~36 million vehicles) and all vehicles produced in these areas and eventually worldwide (~50 million vehicles) will likely be equipped with airbags as standard equipment, if they do not include them already.

Whereas thousands of lives have been saved by airbags, significant improvements can be made. As discussed in detail in U.S. Pat. No. 5,653,462 referenced above, for a variety of reasons, vehicle occupants can be or get too close to the airbag before it deploys and can be seriously injured or killed upon deployment of the airbag.

Also, a child in a rear facing child seat, which is placed on the right front passenger seat, is in danger of being seriously injured if the passenger airbag deploys. This has now become an industry-wide concern and the U.S. automobile industry is continually searching for an easy, economical solution, which will prevent the deployment of the passenger side airbag if a rear facing child seat is present. An improvement on the invention disclosed in the above-referenced patent, as will be disclosed in greater detail below, includes more sophisticated means to identify objects within the passenger compartment and will solve this problem.

Initially, these systems will solve the out-of-position occupant and the rear facing child seat problems related to current airbag systems and prevent unneeded deployments when a seat is unoccupied. Airbags are now under development to protect rear seat occupants in vehicle crashes. A system is therefore needed to detect the presence of occupants, position, (to determine if they are out-of-position), and type(to identify the presence of a rear facing child seat) in the rear seat. Current and future automobiles may have eight or more airbags as protection is sought for rear seat occupants and from side impacts. In addition to eliminating the disturbance of unnecessary airbag deployments, the cost of replacing these airbags will be excessive if they all deploy in an accident. The improvements described below minimize this cost by not deploying an airbag for a seat, which is not occupied by a human being. An occupying item of a seat may be a living occupant such as a human being or dog, another living organism such as a plant, or an inanimate object such as a box or bag of groceries.

Side impact airbag systems began appearing on 1995 vehicles. The danger of deployment induced injuries will exist for side impact airbags as they now do for frontal impact airbags. A child with his head against the airbag is such an example. The system of this invention will minimize such injuries.

2. General Solution to the Problem and Resulting Benefits

A device to monitor the vehicle interior and identify its contents is needed to solve these and many other related problems. For example, once a Vehicle Interior Identification and Monitoring System (VIMS) for identifying and monitoring the contents of a vehicle is in place, many other products become possible including the following:

Inflators and control systems now exist which will adjust the amount of gas flowing into and/or out of the airbag to account for the size and position of the occupant and for the severity of the accident. The vehicle identification and monitoring system of this invention will control such systems based on the presence, size and position of vehicle occupants or the presence, position and orientation of an occupied child seat.

Vehicles can be provided with a standard cellular phone or other telematics communication system as well as the Global Positioning System (GPS), an automobile navigation or location system with an optional connection to a manned assistance facility, which is now available on several vehicle models. In the event of an accident, the phone may automatically call 911, or contact OnStar™ or similar service for emergency assistance and report the position of the vehicle. If the vehicle also has a system as described below for monitoring each seat location, the number and perhaps the condition of the occupants could also be reported and/or photographs of the vehicle interior before, during and/or after the accident can be transmitted. In that way, the emergency service (EMS) would know what equipment and how many ambulances to send to the accident site and prioritize the accident when several accidents occur in the same time frame. Moreover, a communication channel can be opened between the vehicle and a monitoring facility/ emergency response facility or personnel to enable directions to be provided to the injured occupant(s) of the vehicle to assist in any necessary first aid prior to arrival of the emergency assistance personnel.

Once an occupant sensor is operational, the vehicle entertainment system can be improved if the number, size and location of occupants and other objects were known. However, it is not believed that, prior to the instant invention, engineers have thought to determine the number, size and/or location of the occupants and use such determination in combination with the entertainment system. Indeed, this information can be provided by the vehicle interior identification and monitoring system of this invention to thereby improve a vehicle's entertainment system. Once one considers monitoring the space in the passenger compartment an alternate method of characterizing the sonic environment comes to mind which is to send and receive a test sound to see what frequencies are reflected, absorbed or excite resonances and then adjust the spectral output of the entertainment system accordingly.

As the VIMS improves to where such things as the exact location of the occupants ears and eyes can be determined, even more significant improvements to the entertainment system become possible through the use of noise canceling sound, and the rear view mirrors can be automatically adjusted for the driver's eye location.

Another example involves the monitoring of the driver's behavior over time that can be used to warn a driver if he or she is falling asleep, or to stop the vehicle if the driver loses the capacity to control it.

Similarly to the entertainment system, the heating, ventilation and air conditioning system (HVAC) can be improved if the number, attributes and location of vehicle occupants were known. This can be used to provide a climate control system tailored to each occupant, for example, or the system can be turned off for certain seat locations if there are no occupants present at those locations.

In some cases, the position of a particular part of the occupant is of interest such as: (a) his hand or arm and whether it is in the path of a closing window so that the motion of the window needs to be stopped; (b) the position of the shoulder so that the seat belt anchorage point can be adjusted for the best protection of the occupant; or, (c) the position of the rear of the occupants head so that the headrest can be adjusted to minimize whiplash injuries in rear impacts.

Additionally, using an advanced VIMS, as explained below, the position of the driver's eyes can be accurately determined and portions of the windshield, or of a special visor, can be selectively darkened to eliminate the glare from the sun or oncoming vehicle headlights. This system can use electro-chromic glass, a liquid crystal device, Xerox Gyricon, Research Frontiers SPD, semiconducting and metallic (organic) polymer displays, spatial light monitors, electronic "Venetian blinds", electronic polarizers or other appropriate technology, and, in some cases, detectors to detect the direction of the offending light source. In addition to eliminating the glare, the standard sun visor can now also be eliminated. Alternately, the glare filter can be placed in another device such as a transparent sun visor that is placed between the driver's eyes and the windshield.

3. Pattern Recognition

The present invention adds more sophisticated pattern recognition capabilities such as fuzzy logic systems, neural networks, modular neural network systems or other pattern recognition computer based algorithms to the occupant position measurement system disclosed in the above referenced patents and/or patent applications and greatly extends the areas of application of this technology. An example of such a pattern recognition system using neural networks using sonar is discussed in two papers by Gorman, R. P. and Sejnowski, T. J. "Analysis of Hidden Units in a Layered Network Trained to Classify Sonar Targets", *Neural Networks*, Vol.1. pp. 75–89, 1988, and "Learned Classification of Sonar Targets Using a Massively Parallel Network", IEEE Transactions on Acoustics, Speech, and Signal Processing, Vol. 36, No. 7, July 1988.

4. Definitions

Some embodiments of the invention are described below and unless specifically noted, it is the applicants' intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C.§112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

"Pattern recognition" as used herein will generally mean any system which processes a signal that is generated by an object, or is modified by interacting with an object, in order to determine which one of a set of classes that the object belongs to. Such a system might determine only that the object is or is not a member of one specified class, or it might attempt to assign the object to one of a larger set of specified classes, or find that it is not a member of any of the classes in the set. The signals processed are generally electrical signals coming from transducers which are sensitive to either acoustic or electromagnetic radiation and if electromagnetic, they can be either visible light, infrared, ultraviolet, radar or other part of the electromagnetic spectrum, or electric or magnetic fields.

"To identify" as used herein will generally mean to determine that the object belongs to a particular set or class. The class may be one containing all rear facing child seats, one containing all human occupants, all human occupants not sitting in a rear facing child seat, or all humans in a certain height or weight range, all humans that are in a position where they can be protected by an airbag, all humans that are in a position where they are at risk to be seriously injured by an airbag depending on the purpose of the system. In the case where a particular person is to be recognized, the set or class will contain only a single element, the person to be recognized.

5. Some Examples of the Invention

In a passive infrared system a detector receives infrared radiation from an object in its field of view, in this case the vehicle occupant, and determines the temperature of the occupant based on the infrared radiation. The VIMS can then respond to the temperature of the occupant, which can either be a child in a rear facing child seat or a normally seated occupant, to control some other system. This technology can provide input data to a pattern recognition system but it has limitations related to temperature. The sensing of the child could pose a problem if the child is covered with blankets. It also might not be possible to differentiate between a rear facing child seat and a forward facing child seat. In all cases, the technology will fail to detect the occupant if the ambient temperature reaches body temperature as it does in hot climates. Nevertheless, for use in the control of the vehicle climate, for example, a passive infrared system that permits an accurate measurement of each occupant's temperature is useful.

In a laser optical system an infrared laser beam is used to momentarily illuminate an object, occupant or child seat in the manner as described, and illustrated in FIG. 8, of U.S. Pat. No. 5,653,462 cross-referenced above. In some cases, a charge-coupled device (a type of TV camera also referred to as a CCD array) or a CMOS device is used to receive the reflected light. In other cases when a scanning laser is used a pin or avalanche diode or other photo detector can be used. The laser can either be used in a scanning mode, or, through the use of a lens, a cone of light, swept line of light, or a pattern or structured light can be created which covers a large portion of the object. Additionally, one or more LEDs can be used as a light source.

Also, triangulation can be used in conjunction with an offset scanning laser to determine the range of the illuminated spot from the light detector. Various focusing systems also can have applicability in some implementations to measure the distance to an occupant. In most cases, a pattern recognition system, as defined above, is used to identify and classify, and can be used to locate, the illuminated object and its constituent parts. The optical systems generally provide the most information about the object and at a rapid data rate. Its main drawback is cost which is considerably above that of ultrasonic or passive infrared systems. As the cost of lasers and imagers comes down in the future, this system will become more competitive. Depending on the implementation of the system, there may be some concern for the safety of the occupant if a laser light can enter the occupant's eyes. This is minimized if the laser operates in the infrared spectrum particularly at the "eye-safe" frequencies.

Radar systems have similar properties to the laser system discussed above. The wavelength of a particular radar system can limit the ability of the pattern recognition system to detect object features smaller than a certain size. Also, depending on the radar frequency, the detecting method can be based on the modification of the waves in different ways such as reflection, absorption, scattering or transmission. Once again, however, there is some concern about the health effects of radar on children and other occupants. This concern is expressed in various reports available from the United States Food and Drug Administration Division of Devices.

Naturally, electromagnetic waves from other parts of the electromagnetic spectrum can also be used such as, for example, those used with what are sometimes referred to as capacitive or electric field sensors, for example as described in U.S. patents by Kithil et al. Nos. 5,366,241, 5,602,734, 5,691,693, 5,802,479, 5,844,486 and 6,014,602; by Jinno et al. U.S. Pat. No. 5,948,031; and SAE technical papers 982292 and 971051 which are incorporated herein by reference. Additionally, as discussed in more detail below, the sensing of the change in the characteristics of the near field that surrounds an antenna is an effective and economical method of determining the presence of water in the vicinity of the antenna and thus a measure of occupant presence. The use of electric field and capacitance sensors and their equivalence to the occupant sensors described herein requires a special discussion.

6. Electric Field, Capacitance and Wave Sensors

Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between/near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus for the purposes of this invention, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Pat. No. 5,602,734.

An electromagnetic field disturbed or emitted by a passenger in the case of an electromagnetic wave sensor, for example, and the electric field sensor of Kithil, for example, are in many ways similar and equivalent for the purposes of this invention. The electromagnetic wave sensor is an actual electromagnetic wave sensor by definition because they sense parameters of a wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5–7): "The proximity sensor 12 each function by creating an electrostatic field between oscillator input loop 54 and detector output loop 56, which is affected by presence of a person near by, as a result of capacitive coupling, . . . "). It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/near the plates of the capacitor.

Kithil declares that he uses a static electric field in his capacitance sensor. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasistatic electric field in the space between the capacitor plates, and a detector to reveal an informative change of the sensor capacitance caused by the presence of an occupant (see FIG. 7 and its description). In this case, the system becomes a "wave sensor" in the sense that it starts generating actual time-varying electric field that certainly originates electromagnetic waves according to the definition above. That is, Kithil's sensor can be treated as a wave sensor regardless of the shape of the electric field that it creates, a beam or a spread shape.

As follows from the Kithil patent, the capacitor sensor is likely a parametric system where the capacitance of the sensor is controlled by influence of the passenger body. This influence is transferred by means of the near electromagnetic field (i.e., the wave-like process) coupling the capacitor electrodes and the body. It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares the coupling is due to a static electric field, such a situation is not realized in his system because an alternating electromagnetic field ("quasi-wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is:" 11. *Physics*. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam-type electromagnetic wave sensor.

The following definitions are applicable and are from the Encyclopedia Britannica:

"electromagnetic field"

"A property of space caused by the motion of an electric charge. A stationary charge will produce only an electric field in the surrounding space. If the charge is moving, a magnetic field is also produced. An electric field can be produced also by a changing magnetic field. The mutual interaction of electric and magnetic fields produces an electromagnetic field, which is considered as having its own existence in space apart from the charges or currents (a stream of moving charges) with which it may be related . . . " (Copyright 1994–1998 Encyclopedia Britannica)

"displacement current"

". . . in electromagnetism, a phenomenon analogous to an ordinary electric current, posited to explain magnetic fields that are produced by changing electric fields. Ordinary electric currents, called conduction currents, whether steady or varying, produce an accompanying magnetic field in the vicinity of the current. [ . . . ]

"As electric charges do not flow through the insulation from one plate of a capacitor to the other, there is no conduction current; instead, a displacement current is said to be present to account for the continuity of the magnetic effects. In fact, the calculated size of the displacement current between the plates of a capacitor being charged and discharged in an alternating-current circuit is equal to the size of the conduction current in the wires leading to and from the capacitor. Displacement currents play a central role in the propagation of electromagnetic radiation, such as light and radio waves, through empty space. A traveling, varying magnetic field is everywhere associated with a periodically changing electric field that may be conceived in terms of a displacement current. Maxwell's insight on displacement current, therefore, made it possible to understand electromagnetic waves as being propagated through space completely detached from electric currents in conductors." Copyright 1994–1998 Encyclopedia Britannica "electromagnetic radiation"

". . . energy that is propagated through free space or through a material medium in the form of electromagnetic waves, such as radio waves, visible light, and gamma rays. The term also refers to the emission and transmission of such radiant energy. [ . . . ]

"It has been established that time-varying electric fields can induce magnetic fields and that time-varying magnetic fields can in like manner induce electric fields. Because such electric and magnetic fields generate each other, they occur jointly, and together they propagate as electromagnetic waves. An electromagnetic wave is a transverse wave in that the electric field and the magnetic field at any point and time in the wave are perpendicular to each other as well as to the direction of propagation. [ . . . ]

"Electromagnetic radiation has properties in common with other forms of waves such as reflection, refraction, diffraction, and interference. [ . . . ]" Copyright 1994–1998 Encyclopedia Britannica The main part of the Kithil "circuit means" is an oscillator, which is as necessary in the system as the capacitor itself to make the capacitive coupling effect be detectable. An oscillator by nature creates a time varying electric field in a capacitor or waves. The system can operate as a sensor only if an alternating current flows through the sensor capacitor, which, in fact, is a detector from which an informative signal is acquired. Then this current (or, more exactly, integral of the current over time—charge) is measured and the result is a measure of the sensor capacitance value. The latter in turn depends on the passenger presence that affects the magnitude of the waves that travel between the plates of the capacitor making the Kithil sensor a wave sensor by the definition herein.

An additional relevant definition is:

"Capacitive coupling"

The transfer of energy from one circuit to another by means of the mutual capacitance between the circuits. (188) The coupling may be deliberate or inadvertent. Capacitive coupling favors transfer of the higher frequency components of a signal, whereas inductive coupling favors lower frequency components, and conductive coupling favors neither higher nor lower frequency components." http://- - -.its-.bldrdoc.gov/fs-1037/dir-006 /_0842.htm Another similarity between one embodiment of the sensor of this invention and the Kithil sensor is the use of a voltage-controlled oscillator (VCO).

7. Ultrasonic Occupant Sensors

The ultrasonic system is the least expensive and potentially provides less information than the optical or some radar systems due to the delays resulting from the speed of sound and due to the wave length which is considerably longer than the optical (including infrared) systems. The longer wavelength limits the detail, which can be seen by the system. In spite of these limitations, as shown below, ultrasonics can provide sufficient timely information to permit the position and velocity of an occupant to be accurately known and, when used with an appropriate pattern recognition system, it is capable of positively determining the presence of a rear facing child seat. One pattern recognition system that has been used to identify a rear facing child seat is a neural networks and is similar to that described in the above-referenced papers by Gorman et al.

8. Occupant Location Based on Focusing

A focusing system, such as used on some camera systems, can be used to determine the initial position of an occupant but, in most cases, it is too slow to monitor his position during a crash. This is a result of the mechanical motions required to operate the lens focusing system, however, methods do exist that do not require mechanical motions. By itself it cannot determine the presence of a rear facing child seat or of an occupant but when used with a charge-coupled or CMSO device plus some infrared illumination for vision at night, and an appropriate pattern recognition system, this becomes possible. Similarly, the use of three dimensional cameras based on modulated waves or range-gated pulsed light methods combined with pattern recognition systems are now possible based on the teachings of the inventions disclosed herein and the commonly assigned patents and patent applications referenced above.

9. Information About an Occupying Item

As discussed above, it is desirable to obtain information about an occupying item in a vehicle in order to control a component in the vehicle based on the characteristics of the occupying item. For example, if it were known that the occupying item is inanimate, an airbag deployment system would generally be controlled to suppress deployment of any airbags designed to protect passengers seated at the location of the inanimate object.

When the occupying item is human, in some instances the information about the occupying item can be the occupant's position, size and weight. Each of these properties can have an effect on the control criteria of the component. One system for determining a deployment force of an air bag system in described in U.S. Pat. No. 6,199,904 (Dosdall).

This system provides a reflective surface in the vehicle seat that reflects microwaves transmitted from a microwave emitter. The position, size and weight of a human occupant are said to be determined by calibrating the microwaves detected by a detector after the microwaves have been reflected from the reflective surface and pass through the occupant.

10. Child Seat Detection Prior Art

With respect to prior art related to the detection of child restraining seats, U.S. Pat. No. 5,605,348 (Blackburn et al.) describes method and apparatus for sensing a rearward facing child restraining seat in which a child restraining seat identification tag is secured to the child restraining seat and an antenna coil is energized to transmit an EMF field. The tag is made of an amorphous material that radiates a return EMF signal that is received by the antenna coil. The system determines whether a rear-facing child seat is present based on the presence of the return EMF signal, which is received only if the tag mounted to bottom front of the child seat is within a certain distance from the antenna coil mounted in the back portion of the seat.

Drawbacks of the system of Blackburn et al. are that a special tag must be incorporated into the child seat in order to detect the same, the system cannot differentiate between other similarly tagged objects and the system relies on the proper placement of the tag on the child seat. In other words, if the tag were to be improperly placed on the child seat, then the system would not accurately determine the presence and orientation of the same. Also, the system of Blackburn et al. does not generate, e.g., via the antenna coil, a signal based on the contents of the seat which is different depending on the contents of the seat, i.e., the signal for an adult occupant is different from the signal for a forward-facing child seat which is different from the signal for a rear-facing child seat, etc., and analyze the same in order to determine whether the contents of the seat include a child seat in a rear-facing position. Rather, the EMF field generated by the tag is the same signal, and only the power output is varied. Thus, either no signal (no EMF field) will be generated representing the absence of a rear-facing child seat or a signal (an EMF field) will be generated representing the presence of a rear-facing child seat.

11. Summary

From the above discussion, it can be seen that the addition of sophisticated pattern recognition means to any of the illumination and/or reception technologies for use in a motor vehicle permits the development of a host of new products, systems or capabilities heretofore not available and as described in more detail below.

OBJECTS AND SUMMARY OF THE INVENTION

Briefly, the claimed inventions are methods and arrangements for obtaining information about an object or occupants in a vehicle. This determination is used in various methods and arrangements for, for example, controlling occupant protection devices in the event of a vehicle crash.

The determination can also be used in various methods and arrangements for, controlling heating and air-conditioning systems to optimize the comfort for any occupants, controlling an entertainment system as desired by the occupants, controlling a glare prevention device for the occupants, preventing accidents by a driver who is unable to safely drive the vehicle and enabling an effective and optimal response in the event of a crash (either oral directions to be communicated to the occupants or the dispatch of personnel to aid the occupants) as well as many others. Thus, one objective of the invention is to obtain information about occupancy of a vehicle before, during and/or after a crash and convey this information to remotely situated assistance personnel to optimize their response to a crash involving the vehicle and/or enable proper assistance to be rendered to the occupants after the crash.

Principle objects and advantages of the claimed invention are:

1. To mount an occupant sensor in an advantageous position to obtain a commanding view of the passenger compartment of the vehicle.

2. To mount an occupant sensor in a position which is subject to little or no obstructions.

In order to achieve these objects, a vehicle including a system for obtaining information about occupants of the vehicle comprises a rear-view mirror including a mirror part and a support for mounting the mirror part to the vehicle (such as to a windshield of the vehicle), a wave-receiving system arranged on the mirror for receiving waves from spaces above seats of the vehicle in which occupants would normally be situated and a processor coupled to the wave-receiving system and arranged to obtain information about the occupants based on the waves received by the wave-receiving system. The wave-receiving system may comprise an infrared receiver, a transmitter/receiver capable of transmitting and receiving waves, an ultrasonic wave receiver and/or an array for displaying infrared light reflected from or generated by the occupants.

Based on the waves received by the wave-receiving system, the processor may be arranged to identify or ascertain the identity of the occupants, determine the position of the occupants, determine movement of the occupants and/or determine the distance between the wave-receiving system and the occupants. The processor may embody a pattern recognition system for obtaining information about the occupants based on training designed to create an algorithm capable of processing data on the waves received by the wave-receiving system into information about the occupants.

The wave-receiving system may comprise a transmitter/receiver capable of transmitting and receiving waves whereby the processor is arranged to determine the distance between the transmitter/receiver and the occupants based on the waves transmitted and received by the transmitter/receiver. A separate wave transmitter may be arranged to transmit waves into the spaces above the seats.

A method for obtaining information about occupants of the vehicle in accordance with the invention comprises the steps of mounting a rear view mirror to the vehicle such as to the windshield of the vehicle, arranging a wave-receiving system on the mirror, operatively actuating the wave-receiving to receive waves from spaces above seats of the vehicle in which occupants would normally be situated including when occupants are present in the seats, and processing the received waves to obtain information about the occupants in the seats. The same enhancements to the system described above may also be applied in the method.

Principle objects and advantages of other disclosed inventions that can be used in conjunction with the claimed invention are:

1. To obtain information about an object in a vehicle using resonators or reflectors arranged in association with the object, such as the position of the object and the orientation of the object.

2. To provide a system designed to determine the orientation of a child seat using resonators or reflectors arranged in connection with the child seat.

3. To provide a system designed to determine whether a seatbelt is in use using resonators and reflectors, for possible use in the control of a safety device such as an airbag.

4. To provide a system designed to determine the position of an occupying item of a vehicle using resonators or reflectors, for possible use in the control of a safety device such as an airbag.

5. To provide a system designed to determine the position of a seat using resonators or reflectors, for possible use in the control of a vehicular component or system which would be affected by different seat positions.

6. To recognize the presence of a human on a particular seat of a motor vehicle and to use this information to affect the operation of another vehicle system such as the entertainment system, airbag system, heating and air conditioning system, pedal adjustment system, mirror adjustment system, wireless data link system or cellular phone, among others.

7. To recognize the presence of a human on a particular seat of a motor vehicle and then to determine his/her position and to use this position information to affect the operation of another vehicle system.

8. To affect the vehicle entertainment system, e.g., the speakers, based on a determination of the number, size and/or location of various occupants or other objects within the vehicle passenger compartment.

9. To determine the location of the ears of one or more vehicle occupants and to use that information to control the entertainment system, e.g., the speakers, so as to improve the quality of the sound reaching the occupants' ears through such methods as noise canceling sound.

10. To recognize the presence of a human on a particular seat of a motor vehicle and then to determine his/her velocity relative to the passenger compartment and to use this velocity information to affect the operation of another vehicle system.

11. To determine the position of a seat in the vehicle using sensors remote from the seat and to use that information in conjunction with a memory system and appropriate actuators to position the seat to a predetermined location.

12. To determine the position, velocity or size of an occupant in a motor vehicle and to utilize this information to control the rate of gas generation, or the amount of gas generated, by an airbag inflator system or otherwise control the flow of gas into or out of an airbag.

13. To determine the fact that an occupant is not restrained by a seatbelt and therefore to modify the characteristics of the airbag system. This determination can be done either by monitoring the position of the occupant or through the use of a resonating device placed on the shoulder belt portion of the seatbelt.

14. To determine the presence and/or position of rear seated occupants in the vehicle and to use this information to affect the operation of a rear seat protection airbag for frontal, rear or side impacts, or rollovers.

15. To determine the presence and/or position of occupants relative to the side impact airbag systems and to use this information to affect the operation of a side impact protection airbag system.

16. To determine the openness of a vehicle window and to use that information to affect another vehicle system.

17. To determine the presence of an occupant's hand or other object in the path of a closing window and to affect the window closing system.

18. To remotely determine the fact that a vehicle door is not tightly closed using an illumination transmitting and receiving system such as one employing electromagnetic or acoustic waves.

19. To determine the position of the shoulder of a vehicle occupant and to use that information to control the seatbelt anchorage point.

20. To determine the position of the rear of an occupant's head and to use that information to control the position of the headrest.

21. To recognize the presence of a rear facing child seat on a particular seat of a motor vehicle and to use this information to affect the operation of another vehicle system such as the airbag system.

22. To determine the total number of occupants of a vehicle and in the event of an accident to transmit that information, as well as other information such as the condition of the occupants before, during and/or after a crash, to a receiver remote from the vehicle, such information may include images.

23. To affect the vehicle heating, ventilation and air conditioning system based on a determination of the number, size and location of various occupants or other objects within the vehicle passenger compartment.

24. To determine the temperature of an occupant based on infrared radiation coming from that occupant and to use that information to control the heating, ventilation and air conditioning system.

25. To provide a vehicle interior monitoring system for determining the location of occupants within the vehicle and to include within the same system various electronics for controlling an airbag system.

26. To determine the approximate location of the eyes of a driver and to use that information to control the position of the rear view mirrors of the vehicle and/or adjust the seat.

27. To monitor the position of the head and/or other parts of the vehicle driver and determine whether the driver is falling asleep or otherwise impaired and likely to lose control of the vehicle and to use that information to affect another vehicle system.

28. To monitor the position of the eyes or eyelids of the vehicle driver and determine whether the driver is falling asleep or otherwise impaired and likely to lose control of the vehicle, or is unconscious after an accident, and to use that information to affect another vehicle system.

29. To determine the location of the eyes of a vehicle occupant and/or the direction of a light source such as the headlights of an oncoming vehicle or the sun and to cause a filter to be placed in such a manner as to reduce the intensity of the light striking the eyes of the occupant.

30. To determine the location of the eyes of a vehicle occupant and/or the direction of a light source such as the headlights of a rear approaching vehicle or the sun and to cause a filter to be placed in such a manner as to reduce the intensity of the light reflected from the rear view mirrors and striking the eyes of the occupant.

31. To recognize a particular driver based on such factors as facial characteristics, physical appearance or other attributes and to use this information to control another vehicle system such as the vehicle ignition, a security system, seat adjustment, or maximum permitted vehicle velocity, among others.

32. To provide an occupant sensor which determines the presence and health state of any occupants in a vehicle and, optionally, to send this information by telematics to one or more remote sites. The presence of the occupants may be determined using an animal life or heart beat sensors 33. To provide an occupant sensor which determines whether any occupants of the vehicle are breathing or breathing with difficulty by analyzing the occupant's motion and, optionally, to send this information by telematics to one or more remote sites.

34. To provide an occupant sensor which determines whether any occupants of the vehicle are breathing by analyzing the chemical composition of the air/gas in the vehicle and, optionally, to send this information by telematics to one or more remote sites.

35. To provide an occupant sensor which determines whether any occupants of the vehicle are conscious by analyzing movement of their eyes, eyelids or other parts and, optionally, to send this information by telematics to one or more remote sites.

36. To provide an occupant sensor which determines whether any occupants of the vehicle are wounded to the extent that they are bleeding by analyzing air/gas in the vehicle and, optionally, to send this information by telematics to one or more remote sites.

37. To provide an occupant sensor which determines the presence and health state of any occupants in the vehicle by analyzing sounds emanating from the passenger compartment and, optionally, to send this information by telematics to one or more remote sites. Such sounds can be directed to a remote, manned site for consideration in dispatching response personnel.

38. To provide an occupant sensor which determines whether any occupants of the vehicle are moving using radar systems, such as micropower impulse radar (MIR), which can also detect the heartbeats of any occupants and, optionally, to send this information by telematics to one or more remote sites.

39. To provide a vehicle monitoring system which provides a communications channel between the vehicle (possibly through microphones or speaker transducers distributed throughout the vehicle) and a manned assistance facility to enable communications with the occupants after a crash or whenever the occupants are in need of assistance (e.g., if the occupants are lost, then data forming maps as a navigational aid can be transmitted to the vehicle).

40. To provide a vehicle monitoring system using modulated radiation to aid in the determining of the distance from a transducer (either ultrasonic or electromagnetic) to an occupying item of a vehicle.

41. To provide a glare filter for a glare reduction system that uses semiconducting or metallic (organic) polymers to provide a low cost system, which may reside in the windshield, visor, mirror or special device.

42. To provide a very low cost monitoring and presence detection system that uses the property that water in the near field of an antenna changes the antenna's loading or impedance matching or resonant properties.

43. To provide a glare filter based on electronic Venetian blinds, polarizers or spatial light monitors.

44. To provide an interior monitoring system which provides three-dimensional information about an occupying item from a single transducer mounting location.

45. To provide an interior monitoring system that utilizes either/or the reflection, scattering, absorption or transmission of waves including capacitive or other field based sensors.

46. To provide a windshield where a substantial part of the area is covered by a plastic electronics film for a display and/or glare control.

47. To provide a method of measuring the distance from a sensor to an occupant or part thereof using calculations based of the degree of focus of an image.

48. To provide for a driver monitoring system using an imaging transducer mounted on the rear view mirror.

49. Using structured light to determine the distance to an occupant from a transducer.

50. To provide a single camera system that passes the requirements of FMVSS-208.

51. To control a vehicle component using eye tracking techniques.

52. To use a visor as a display and/or glare stopper.

BRIEF DESCRIPTION OF THE DRAWINGS

The following drawings are illustrative of embodiments of the system developed or adapted using the teachings of this invention and are not meant to limit the scope of the invention as encompassed by the claims.

FIG. 5 is a side view with parts cutaway and removed showing schematically the interface between the vehicle interior monitoring system of this invention and the vehicle entertainment system.

FIG. 8 is a side view with parts cutaway and removed of a vehicle showing the passenger compartment containing a box on the front passenger seat and a preferred mounting location for an occupant and rear facing child seat presence detector and including an antenna field sensor.

FIG. 11A is an enlarged view of the section 11A in FIG. 11.

FIG. 12A is an enlarged view of the section designated 12A in FIG. 12.

FIG. 12B is an enlarged view of the section designated 12B in FIG. 12A.

DETAILED DESCRIPTION OF THE INVENTION

1. Basic System

Figure 1:
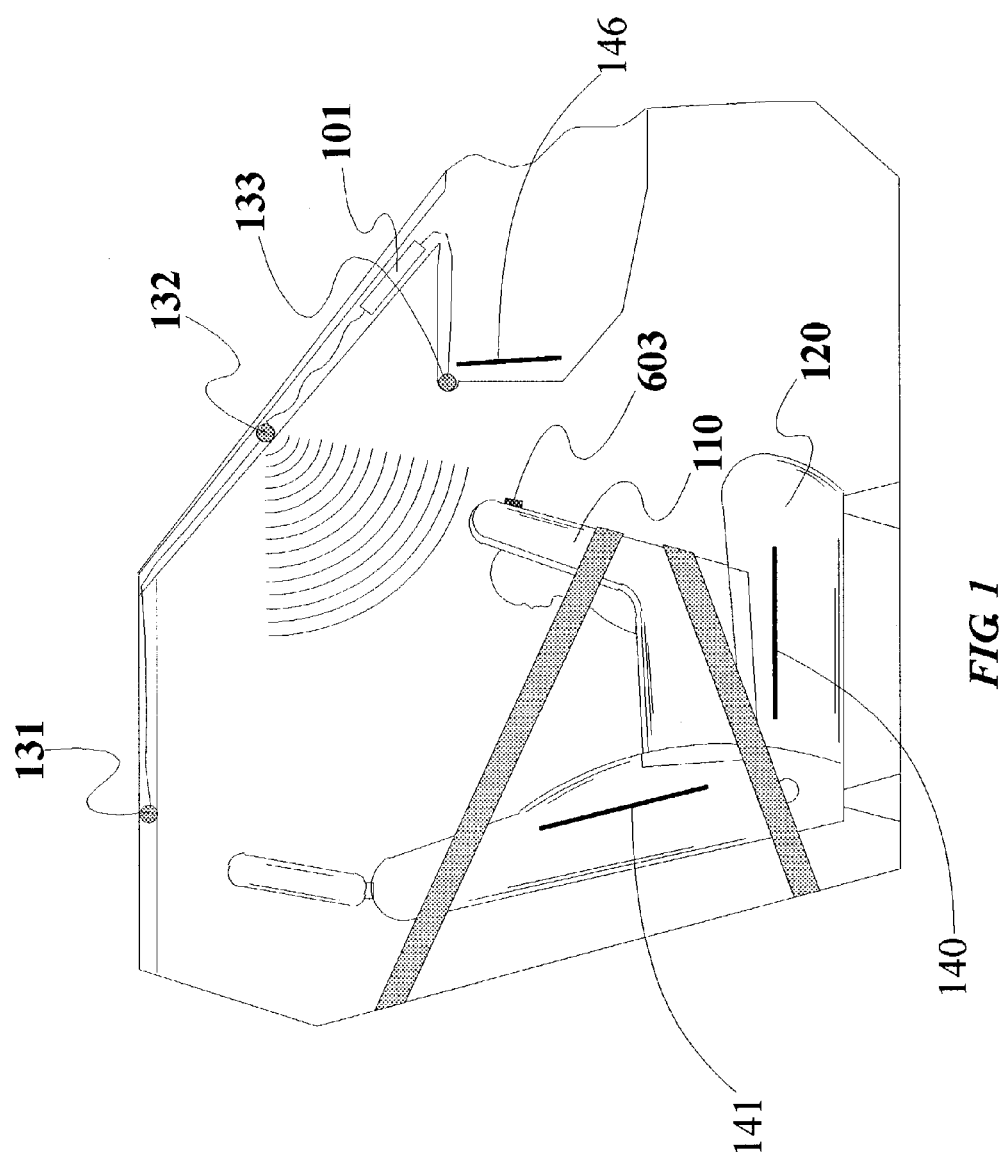
FIG. 1 is a side view with parts cutaway and removed of a vehicle showing the passenger compartment containing a rear facing child seat on the front passenger seat and a preferred mounting location for an occupant and rear facing child seat presence detector including an antenna field sensor and a resonator or reflector placed onto the forward most portion of the child seat.

Referring to the accompanying drawings wherein the same reference numerals refer to the same or similar elements, FIG. 1 is a side view, with parts cutaway and removed of a vehicle showing the passenger compartment containing a rear facing child seat 110 on a front passenger seat 120 and a preferred mounting location for a first embodiment of a vehicle interior monitoring system in accordance with the invention. The interior monitoring system is capable of detecting the presence of an occupant and the rear facing child seat 110 (or more generally, a child seat and its orientation). In this embodiment, three transducers 131, 132 and 133 are used alone, or, alternately in combination with one or two antenna near field monitoring sensors or transducers, 140 and 141, although any number of wave-transmitting transducers or radiation-receiving receivers may be used. Such transducers or receivers may be of the type that emit or receive a continuous signal, a time varying signal or a spatial varying signal such as in a scanning system. One particular type of radiation-receiving receiver for use in the invention is a receiver capable of receiving electromagnetic waves.

In an embodiment wherein ultrasonic energy is used, transducer 132 transmits ultrasonic energy toward the front passenger seat, which is modified, in this case by the occupying item of the passenger seat, for example the rear facing child seat 110, and the modified waves are received by the transducers 131 and 133. Modification of the ultrasonic energy may constitute reflection of the ultrasonic energy back by the occupying item of the seat. The waves received by transducers 131 and 133 vary with time depending on the shape, location and size of the object occupying the passenger seat, in this case the rear facing child seat 110. Each different occupying item will reflect back waves having a different pattern. Also, the pattern of waves received by transducer 131 will differ from the pattern received by transducer 133 in view of its different mounting location. In some systems, this difference permits the determination of location of the reflecting surface (for example the rear facing child seat 110) through triangulation. Through the use of two transducers 131, 133, a sort of stereographic image is received by the two transducers and recorded for analysis by processor 101, which is coupled to the transducers 131, 132, 133.

Transducer 132 can also be a source of electromagnetic radiation, such as an LED, and transducers 131 and 133 can be CMOS, CCD imagers or other devices sensitive to electromagnetic radiation or fields. This "image" or return signal will differ for each object that is placed on the vehicle seat and it will also change for each position of a particular object and for each position of the vehicle seat. Elements 131, 132, 133, although described as transducers, are representative of any type of component used in a wave-based or electric field analysis technique, including, e.g., a transmitter, antenna or a capacitor plate.

Transducers 140, 141 and 146 are antennas placed in the seat and instrument panel such that the presence of an object, particularly a water-containing object such as a human, disturbs the near field of the antenna. This disturbance can be detected by various means such as with Micrel parts MICREF102 and MICREF104, which have a built in antenna auto-tune circuit. These parts cannot be used as is and it is necessary to redesign the chips to allow the auto-tune information to be retrieved from the chip.

The "image" recorded from each ultrasonic transducer/ receiver (transceiver), for ultrasonic systems, is actually a time series of digitized data of the amplitude of the received signal versus time. Since there are two receivers in this example, two time series are obtained which are processed by processor 101. Processor 101 may include electronic circuitry and associated embedded software. Processor 101 constitutes one form of generating mechanism in accordance with the invention that generates information about the occupancy of the passenger compartment based on the waves received by the transducers 131, 132, 133. This three-transducer system is for illustration purposes only and the preferred system will usually have at least three transceivers that may operate at the same or at different frequencies and each may receive reflected waves from itself or any one or more of the other transceivers or sources of radiation.

Other types of transducers can be used along with the transducers 131, 132, 133 or separately and all are contemplated by this invention. Such transducers include other wave devices such as radar or electronic field sensing such as described in U.S. Pat. No. 5,366,241 to Kithil, U.S. Pat. No. 5,602,734 to Kithil, U.S. Pat. No. 5,691,693 to Kithil, U.S. Pat. No. 5,802,479 to Kithil, U.S. Pat. No. 5,844,486 to Kithil, U.S. Pat. No. 5,948,031 to Rittmueller, U.S. Pat. No. 6,014,602 to Kithil, and U.S. Pat. No. 6,275,146 to Kithil, all of which are incorporated herein by reference. Another technology, for example, uses the fact that the content of the near field of an antenna affects the resonant tuning of the antenna. Examples of such a device are shown as antennas 140, 141 and 146 in FIG. 1. By going to lower frequencies, the near field range is increased and also at such lower frequencies, a ferrite-type antenna could be used to minimize the size of the antenna. Other antennas that may be applicable for a particular implementation include dipole, microstrip, patch, yagi etc. The frequency transmitted by the antenna can be swept and the (VSWR) voltage and current in the antenna feed circuit can be measured. Classification by frequency domain is then possible. That is, if the circuit is tuned by the antenna, the frequency can be measured to determine the object in the field.

When different objects are placed on the front passenger seat, the two images from transducers 131, 133 are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see U.S. Pat. No. 5,943,295 to Varga et. al., which is included herein by reference.

The determination of these rules is central to the pattern recognition techniques used in this invention. In general, three approaches have been useful, artificial intelligence, fuzzy logic and artificial neural networks (although additional types of pattern recognition techniques may also be used, such as sensor fusion). In some implementations of this invention, such as the determination that there is an object in the path of a closing window as described below, the rules are sufficiently obvious that a trained researcher can look at the returned acoustic signals and devise a simple algorithm to make the required determinations. In others, such as the determination of the presence of a rear facing child seat or of an occupant, artificial neural networks are used to determine the rules. One such set of neural network software for determining the pattern recognition rules is available from the NeuralWare Corporation of Pittsburgh, Pa.

The system used in a preferred implementation of this invention for the determination of the presence of a rear facing child seat, of an occupant or of an empty seat is the artificial neural network. In this case, the network operates on the two returned signals as sensed by transducers 131 and 133. Through a training session, the system is taught to differentiate between the three cases. This is done by conducting a large number of experiments where all possible child seats are placed in all possible orientations on the front passenger seat. Similarly, a sufficiently large number of experiments are run with human occupants and with boxes, bags of groceries and other objects (both inanimate and animate). Sometimes as many as 1,000,000 such experiments are run before the neural network is sufficiently trained so that it can differentiate among the three cases and output the correct decision with a very high probability. Of course, it must be realized that a neural network can also be trained to differentiate among additional cases, e.g., a forward facing child seat.

Once the network is determined, it is possible to examine the result using tools supplied by NeuralWare, for example, to determine the rules that were finally arrived at by the trial and error techniques. In that case, the rules can then be programmed into a microprocessor resulting in a fuzzy logic or other rule based system. Alternately, a neural computer can be used to implement the net directly. In either case, the implementation can be carried out by those skilled in the art of pattern recognition. If a microprocessor is used, a memory device is also required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

In the embodiment wherein electromagnetic energy is used, it is to be appreciated that any portion of the electromagnetic signals that impinges upon a body portion of the occupant is at least partially absorbed by the body portion. Sometimes, this is due to the facts that the human body is composed primarily of water, and that electromagnetic energy is readily absorbed by water. The amount of electromagnetic signal absorption is related to the frequency of the signal, and size or bulk of the body portion that the signal impinges upon. For example, a torso of a human body tends to absorb a greater percentage of electromagnetic energy as compared to a hand of a human body for some frequencies.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, etc., so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

Figure 2:
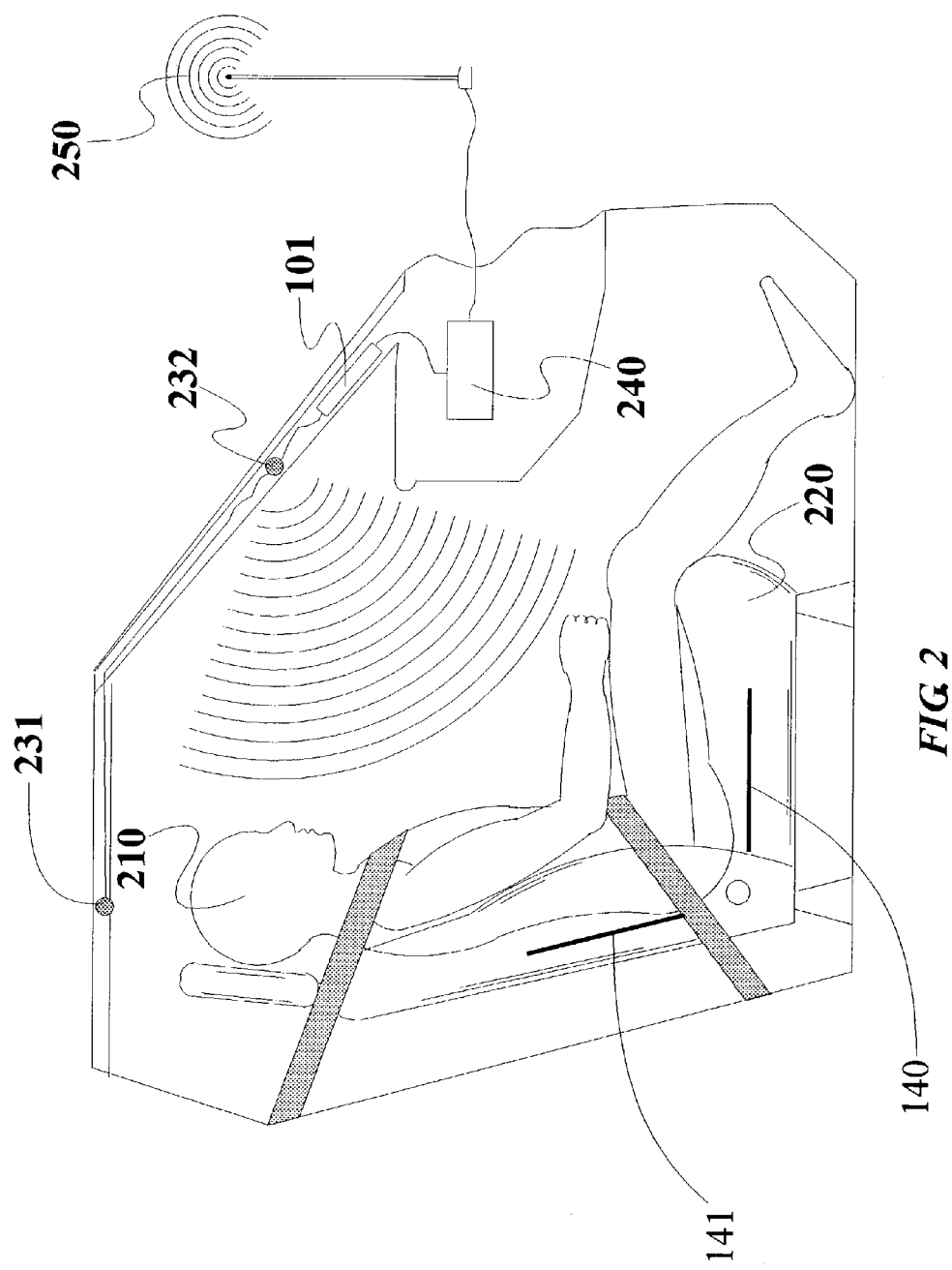
FIG. 2 is a side view with parts cutaway and removed showing schematically the interface between the vehicle interior monitoring system of this invention and the vehicle cellular or other telematics communication system including an antenna field sensor.

An alternate system is shown in FIG. 2, which is a side view showing schematically the interface between the vehicle interior monitoring system of this invention and the vehicle cellular or other communication system. In this view, an adult occupant 210 is shown sitting on the front passenger seat 220 and two transducers 231 and 232 are used to determine the presence (or absence) of the occupant on that seat 220. One of the transducers 232 in this case acts as both a transmitter and receiver while transducer 231 acts only as a receiver. Alternately, transducer 231 could serve as both a transmitter and receiver or the transmitting function could be alternated between the two devices. Also, in many cases more that two transmitters and receivers are used and in still other cases other types of sensors, such as weight, seatbelt tension sensor or switch, heartbeat, self tuning antennas (140, 141), motion and seat and seatback position sensors, are also used alone or in combination with the radiation sensors 231 and 232. As is also the case in FIG. 1, the transducers 231 and 232 are attached to the vehicle embedded in the A-pillar and headliner trim, where their presence is disguised, and are connected to processor 101 that may also hidden in the trim as shown or elsewhere. The A-pillar is the roof support pillar that is closest to the front of the vehicle and which, in addition to supporting the roof, also supports the front windshield and the front door. Naturally, other mounting locations can also be used and in most cases preferred as disclosed in Varga et. al. U.S. Pat. No. RE 37,260.

Figure 1A:
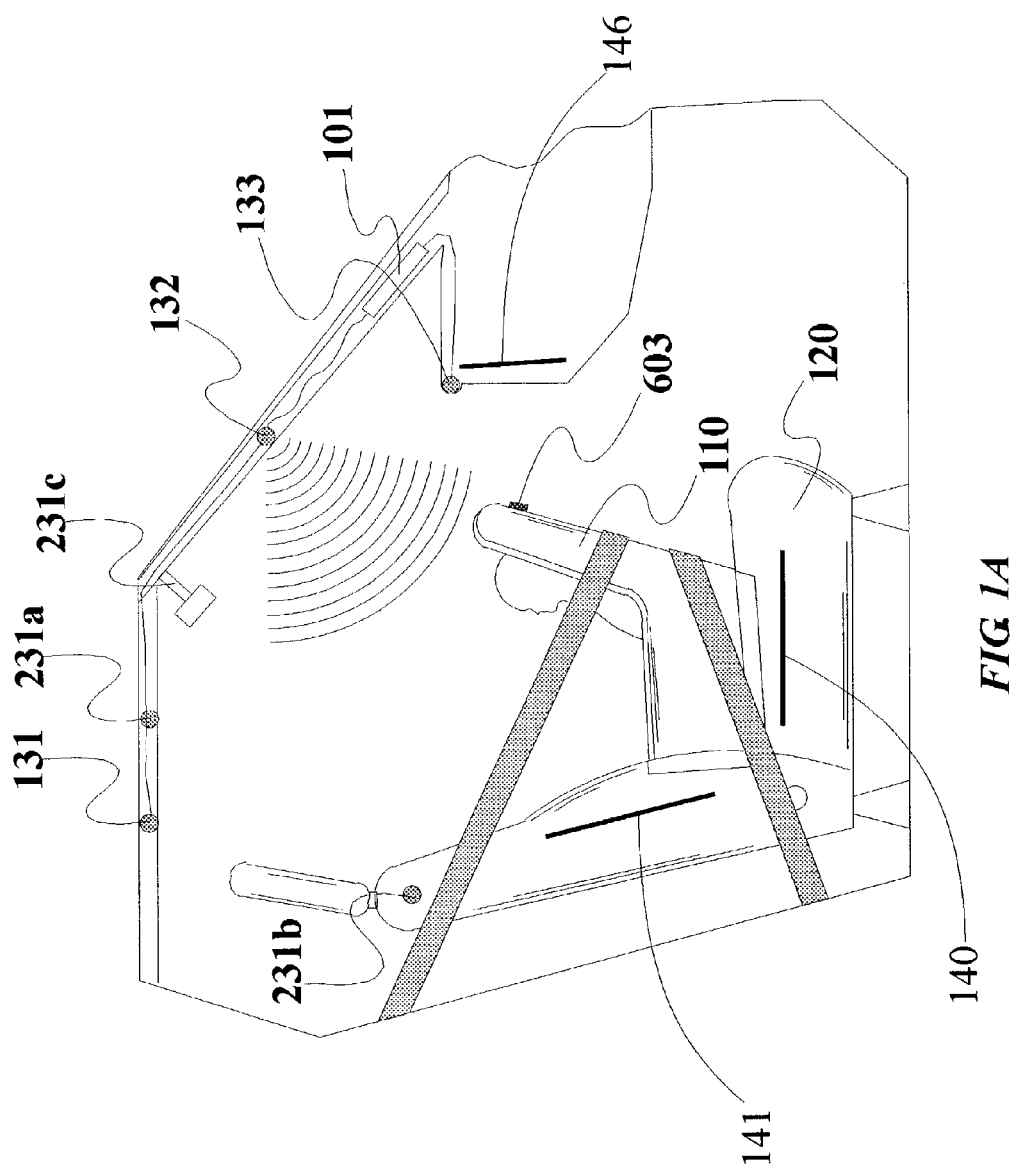
FIG. 1A is a side view with parts cutaway and removed of a vehicle showing the passenger compartment containing a rear facing child seat on the front passenger seat having a resonator or reflector placed onto the forwardmost portion of the child seat.

More specifically, FIG. 1A shows a transducer 231a mounted in the headliner of the vehicle and a transducer 231b arranged in the seat. Transducers 231a, 231b each include at least a receiver component for receiving waves which can be processed to determine the presence or absence of an occupant on the seat, including the presence or absence of a child seat and optionally, its orientation. Transducers 231a, 231b can also be used for any other purpose disclosed herein, e.g., obtaining information about the occupant, such as position, movement or identification.

Further, FIG. 1A shows a transducer 231c arranged on a rear view mirror of the vehicle. As known, the rear view mirror includes a mirror part and a support for mounting the mirror part to a windshield of the vehicle.

The transducer 231c may be arranged anywhere on the rear view mirror so that its operative field encompasses at least a portion of the potential area in which an occupant will be seated. It is an advantage of the positioning of the transducer 231c on the rear view mirror that the field of view is only rarely, if ever, obstructed. By contrast, placement of a transducer on the dashboard may be quite often obstructed, e.g., by a newspaper, feet, etc.

The cellular phone system, or other telematics communication device, is shown schematically by box 240 and outputs to an antenna 250A. The phone system or telematics communication device 240 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched.

The transducers 231 and 232 in conjunction with the pattern recognition hardware and software described below, which is implemented in processor 101 and is packaged on a printed circuit board or flex circuit along with the transducers 231 and 232, determine the presence of an occupant within a few seconds after the vehicle is started. Similar systems located to monitor the remaining seats in the vehicle, also determine the presence of occupants at the other seating locations and this result is stored in the computer memory, which is part of each monitoring system processor 101. Processor 101 thus enables a count of the number of occupants in the vehicle to be obtained by addition of the determined presences of occupants by the transducers associated with each seating location, and in fact can be designed to perform such an addition.

2. Accidents, Health Monitoring and Telematics

In the event of an accident, the electronic system associated with the telematics system interrogates the various interior monitoring system memories in processor 101 and arrives at a count of the number of occupants in the vehicle, and, in more sophisticated systems, even makes a determination as to whether each occupant was wearing a seatbelt and if he or she is moving after the accident or the health state of one or more of the occupants as described above, for example. The telematics communication system then automatically notifies an EMS operator (such as 911, OnStar™ or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

Thus, in basic embodiments of the invention, wave or energy-receiving transducers are arranged in the vehicle at appropriate locations, trained if necessary depending on the particular embodiment (as described below), and function to determine whether a life form is present in the vehicle and if so, how many life forms are present, where they are located and their approximate sizes and perhaps some vital signs to indicate their health or injury state (breathing, pulse rate etc.). A determination can also be made using the transducers as to whether the life forms are humans, or more specifically, adults, child in child seats, etc. As noted above and below, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements. For example, a determination can be made that a human is situated on the driver's seat in a normal position (general) or a determination can be made that a human is situated on the driver's seat and is leaning forward and/or to the side at a specific angle as well as the position of his or her extremities and head and chest (specific). The degree of detail is limited by several factors, including among others the number and position of transducers and training of the pattern recognition algorithm.

In addition to the use of transducers to determine the presence and location of occupants in a vehicle, other sensors could also be used. For example, a heartbeat sensor, which determines the number and presence of heartbeats, can also be arranged in the vehicle. Conventional heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat, if such a human occupant is present. The output of the heartbeat sensor is input to the processor of the interior monitoring system. One heartbeat sensor for use in the invention may be of the types as disclosed in McEwan in U.S. Pat. Nos. 5,573,012 and 5,766,208, which are incorporated herein in their entirety by reference. The heartbeat sensor can be positioned at any convenient position relative to the seats where occupancy is being monitored. A preferred location is within the vehicle seatback.

This type of micropower impulse radar (MIR) sensor is not believed to have been used in an interior monitoring system heretofore. It can be used to determine the motion of an occupant and thus can determine his or her heartbeat (as evidenced by motion of the chest), for example. Such an MIR sensor can also be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Pat. No. 5,361,070, which is incorporated herein by reference), as well as many other patents by the same inventor.

Motion sensing is accomplished by monitoring a particular range from the sensor as disclosed in that patent. MIR is one form of radar that has applicability to occupant sensing and can be mounted at various locations in the vehicle. Other forms include, among others, ultra wideband (UWB) by the Time Domain Corporation and noise radar (NR) by Professor Konstantin Lukin of the National Academy of Sciences of Ukraine Institute of Radiophysics and Electronics. Radar has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR, UWB or NR have additional advantages in lack of sensitivity to temperature variation and has a comparable resolution to about 40 kHz ultrasound. Resolution comparable to higher frequency is of course possible using millimeter waves, for example. Additionally, multiple MIR, UWB or NR sensors can be used when high speed tracking of the motion of an occupant during a crash is required since they can be individually pulsed without interfering with each other through time division, code division or other multiplexing schemes.

The maximum acoustic frequency that is practical to use for acoustic imaging in the acoustic systems herein is about 40 to 160 kilohertz (kHz). The wavelength of a 50 kHz acoustic wave is about 0.6 cm, which is too coarse to determine the fine features of a person's face, for example. It is well understood by those skilled in the art that features that are smaller than the wavelength of the irradiating radiation cannot be distinguished. Similarly, the wavelength of common radar systems varies from about 0.9 cm (for 33,000 MHz K band) to 133 cm (for 225 MHz P band), which is also too coarse for person identification systems. Millimeter wave and sub-millimeter wave radar can of course emit and receive waves considerably smaller. Microwave radar and in particular Micropower Impulse Radar (MIR) as discussed above is particularly useful for occupant detection and especially the motion of occupants such as motion caused by heartbeats and breathing. For security purposes, for example, MIR can be used to detect the presence of weapons on a person that might be approaching a vehicle such as a bus, truck or train and thus provide a warning of a potential terrorist threat. MIR is reflected by edges, joints and boundaries and through the technique of range gating, particular slices in space can be observed. Millimeter wave radar, particularly in the passive mode, can also be used to locate life forms because they naturally emit waves at particular frequencies such as 3 mm. A passive image of such a person will also show the presence of concealed weapons as they block this radiation. Similarly, active millimeter wave radar reflects off of metallic objects but is absorbed by the water in a life form. The absorption property can be used by placing a radar receiver or reflector behind the occupant and measuring the shadow caused by the absorption. The reflective property of weapons including plastics can be used as above to detect possible terrorist threats.

Finally, the use of sub-millimeter waves again using a detector or reflector on the other side of the occupant can be used not only to determine the density of the occupant but also some measure of its chemical composition as the chemical properties alter the pulse shape. Such waves are more readily absorbed by water than by plastic. From the above discussion, it can be seen that there are advantages of using different frequencies of radar for different purposes and, in some cases, a combination of frequencies is most useful. This combination occurs naturally with noise radar (NR), ultra-wideband radar (UWB) and MIR and these technologies are most appropriate for occupant detection when using electromagnetic radiation at longer wavelengths than visible light and IR.

An alternative way to determine motion of the occupant(s) is to monitor the weight distribution of the occupant whereby changes in weight distribution after an accident would be highly suggestive of movement of the occupant. A system for determining the weight distribution of the occupants can be integrated or otherwise arranged in the seats 120, 220 of the vehicle and several patents and publications describe such systems.

More generally, any sensor that determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the vehicle, which can be correlated to the health state of the occupant(s). The motion sensor and chemical sensor can be designed to have a fixed operational field situated near the occupant.

In the alternative, the motion sensor and chemical sensor can be adjustable and adapted to adjust their operational field in conjunction with a determination by an occupant position and location sensor that would determine the location of specific parts of the occupant's body such as his or her chest or mouth. Furthermore, an occupant position and location sensor can be used to determine the location of the occupant's eyes and determine whether the occupant is conscious, that is, whether his or her eyes are open or closed or moving.

Chemical sensors can also be used to detect whether there is blood present in the vehicle such as after an accident. Additionally, microphones can detect whether there is noise in the vehicle caused by groaning, yelling, etc., and transmit any such noise through the cellular or similar connection to a remote listening facility using a telematics communication system such as operated by OnStar™.

Figure 2A:
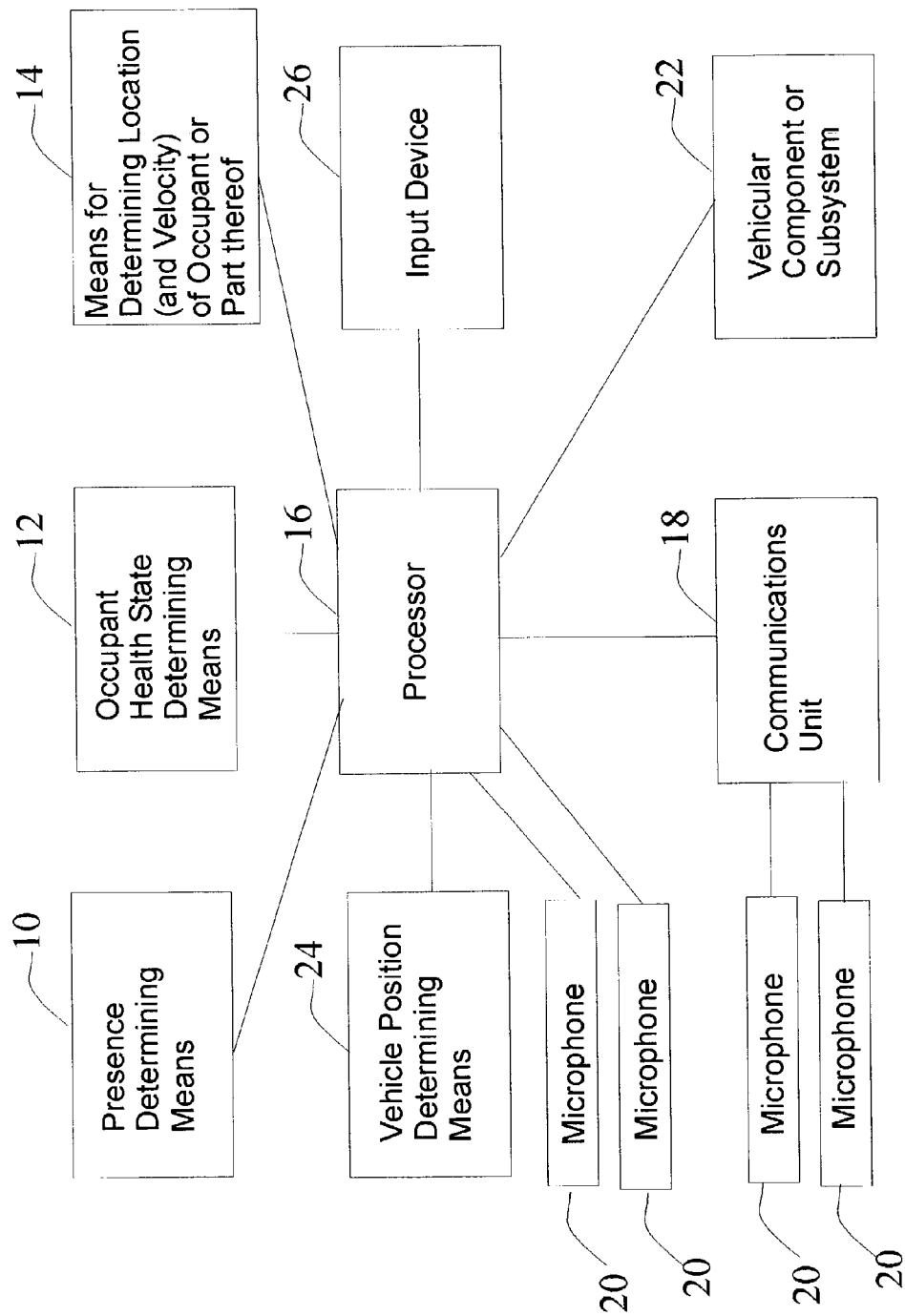
FIG. 2A is a diagram of one exemplifying embodiment of the invention.

FIG. 2A shows a schematic diagram of an embodiment of the invention including a system for determining the presence and health state of any occupants of the vehicle and a telecommunications link. This embodiment includes means for determining the presence of any occupants 10 which may take the form of a heartbeat sensor, chemical sensor or motion sensor as described above and means for determining the health state of any occupants 12. The latter means may be integrated into the means for determining the presence of any occupants using the same or different component. The presence determining means 10 may encompass a dedicated presence determination device associated with each seating location in the vehicle, or at least sufficient presence determination devices having the ability to determine the presence of an occupant at each seating location in the vehicle. Further, means for determining the location, and optionally velocity, of the occupants or one or more parts thereof 14 are provided and may be any conventional occupant position sensor or preferably, one of the occupant position sensors as described herein such as those utilizing waves such as electromagnetic radiation or fields such as capacitance sensors or as described in the current assignee's patents and patent applications referenced above.

A processor 16 is coupled to the presence determining means 10, the health state determining means 12 and the location determining means 14. A communications unit 18 is coupled to the processor 16. The processor 16 and/or communications unit 18 can also be coupled to microphones 20 distributed throughout the vehicle and include voice-processing circuitry to enable the occupant(s) to effect vocal control of the processor 16, communications unit 18 or any coupled component or oral communications via the communications unit 18. The processor 16 is also coupled to another vehicular system, component or subsystem 22 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 24, such as a GPS or differential GPS system, could be coupled to the processor 16 and provides an indication of the absolute position of the vehicle.

The communications unit 18 performs the function of enabling establishment of a communications channel to a remote facility to receive information about the occupancy of the vehicle as determined by the presence determining means 10, occupant health state determining means 12 and/or occupant location determining means 14. The communications unit 18 thus can be designed to transmit over a sufficiently large range and at an established frequency monitored by the remote facility, which may be an EMS facility, sheriff department, or fire department.

In normal use (other than after a crash), the presence determining means 10 determine whether any human occupants are present, i.e., adults or children, and the location determining means 14 determines the occupant's location. The processor 16 receives signals representative of the presence of occupants and their location and determines whether the vehicular system, component or subsystem 22 can be modified to optimize its operation for the specific arrangement of occupants. For example, if the processor 16 determines that only the front seats in the vehicle are occupied, it could control the heating system to provide heat only through vents situated to provide heat for the front-seated occupants.

Another vehicular telematics system, component or subsystem is a navigational aid, such as a route guidance display or map. In this case, the position of the vehicle as determined by the positioning system 24 is conveyed through processor 16 to the communications unit 18 to a remote facility and a map is transmitted from this facility to the vehicle to be displayed on the route display. If directions are needed, a request for such directions can be entered into an input unit 26 associated with the processor 16 and transmitted to the facility. Data for the display map and/or vocal instructions can then be transmitted from this facility to the vehicle.

Moreover, using this embodiment, it is possible to remotely monitor the health state of the occupants in the vehicle and most importantly, the driver. The health state determining means 12 may be used to detect whether the driver's breathing is erratic or indicative of a state in which the driver is dozing off. The health state determining means 12 can also include a breath-analyzer to determine whether the driver's breath contains alcohol. In this case, the health state of the driver is relayed through the processor 16 and the communications unit 18 to the remote facility and appropriate action can be taken. For example, it would be possible to transmit a command to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 22.

In use after a crash, the presence determining means 10, health state determining means 12 and location determining means 14 obtain readings from the passenger compartment and direct such readings to the processor 16. The processor 16 analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds. The determination of the number of occupants is obtained from the presence determining mechanism 10, i.e., the number of occupants whose presence is detected is the number of occupants in the passenger compartment. The determination of the status of the occupants, i.e., whether they are moving is performed by the health state determining mechanism 12, such as the motion sensors, heartbeat sensors, chemical sensors, etc. Moreover, the communications link through the communications unit 18 can be activated immediately after the crash to enable personnel at the remote facility to initiate communications with the vehicle.

3. Pattern Recognition

When different objects are placed on the front passenger seat, the two images (here "image" is used to represent any form of signal) from transducers 131, 133 (FIG. 1) are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the set of "rules" or algorithm that differentiates the images of one type of object from the images of other types of objects, for example which differentiate the adult occupant images from the rear facing child seat images. The similarities of these images for various child seats are frequently not obvious to a person looking at plots of the time series from ultrasonic sensors and thus computer algorithms are developed to sort out the various patterns. For a more detailed discussion of pattern recognition see U.S. Pat. No. RE37260 to Varga et. al., which is incorporated herein by reference.

The determination of these rules is important to the pattern recognition techniques used in this invention. In general, three approaches have been useful, artificial intelligence, fuzzy logic and artificial neural networks including modular neural networks. Other types of pattern recognition techniques may also be used, such as sensor fusion as disclosed in Corrado U.S. Pat. Nos. 5,482,314, 5,890,085, and 6,249,729, which are incorporated herein by reference. In some implementations of this invention, such as the determination that there is an object in the path of a closing window using acoustics as described below, the rules are sufficiently obvious that a trained researcher can look at the returned acoustic signals and devise an algorithm to make the required determinations. In others, such as the determination of the presence of a rear facing child seat or of an occupant, artificial neural networks are used to determine the rules. Neural network software for determining the pattern recognition rules is available from the NeuralWare Corporation of Pittsburgh, Pa. Modular neural network software is available from International Scientific Research, Inc (ISR) of Romeo, Mich.

The system used in a preferred implementation of this invention for the determination of the presence of a rear facing child seat, of an occupant or of an empty seat, for example, is the artificial neural network, which is also commonly referred to as a trained neural network. In this case, the network operates on the two returned signals as sensed by transducers 131 and 133. Through a training session, the system is taught to differentiate between the different cases. This is done by conducting a large number of experiments where a selection of the possible child seats are placed in a large number of possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 131, 133, for example, are associated with the identification of the occupant in the seat or the empty seat and information about the occupant such as its orientation if it is a child seat and/or position.

Data sets are formed from the returned signals and the identification and information about the occupant or the absence of an occupant. The data sets are input into a neural network generating program that creates a trained neural network that can, upon receiving input of two returned signals from the transducers 131, 133, provide an output of the identification and information about the occupant most likely situated in the seat or ascertained the existence of an empty seat. Sometimes as many as 1,000,000 such experiments are run before the neural network is sufficiently trained and tested so that it can differentiate among the several cases and output the correct decision with a very high probability. Of course, it must be realized that a neural network can also be trained to differentiate among additional cases, for example, a forward facing child seat.

Once the network is determined, it is possible to examine the result using tools supplied by NeuralWare or ISR, for example, to determine the rules that were arrived at by the trial and error process. In that case, the rules can then be programmed into a microprocessor resulting in a rule-based system. Alternately, a neural computer can be used to implement the net directly. In either case, the implementation can be carried out by those skilled in the art of pattern recognition. If a microprocessor is used, an additional memory device may be required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

4. Additions to Basic System 4.1 Heating Ventilating and Air Conditioning

The control of the heating, ventilating, and air conditioning (HVAC) system can also be a part of the system although alone it would probably not justify the implementation of an interior monitoring system at least until the time comes when electronic heating and cooling systems replace the conventional systems now used. Nevertheless, if the monitoring system is present, it can be used to control the HVAC for a small increment in cost. The advantage of such a system is that since most vehicles contain only a single occupant, there is no need to direct heat or air conditioning to unoccupied seats. This permits the most rapid heating or cooling for the driver when the vehicle is first started and he or she is alone without heating or cooling unoccupied seats. Since the HVAC system does consume energy, an energy saving also results by only heating and cooling the driver when he or she is alone.

Figure 3:
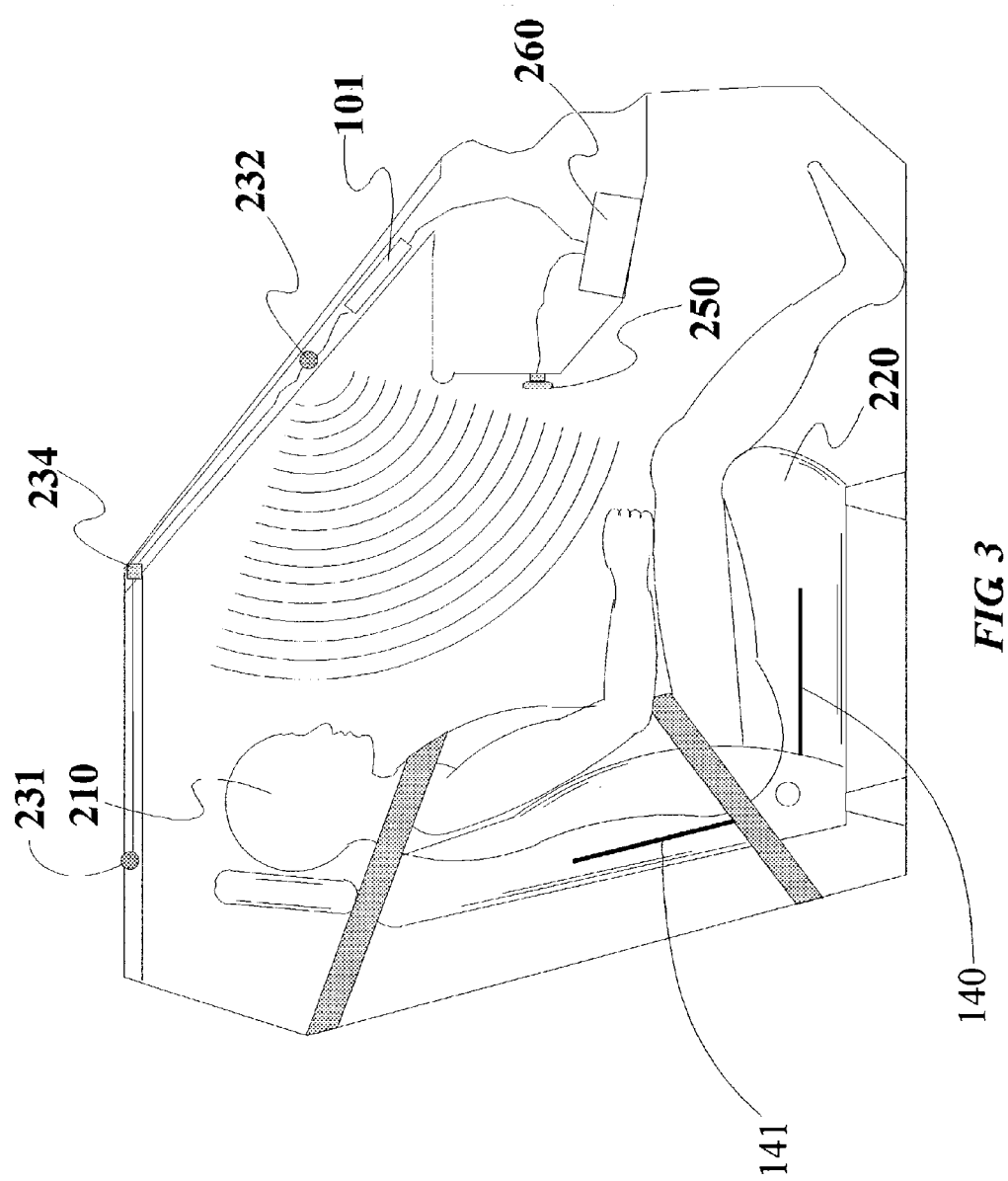
FIG. 3 is a side view with parts cutaway and removed showing schematically the interface between the vehicle interior monitoring system of this invention and the vehicle heating and air conditioning system and including an antenna field sensor.

FIG. 3 shows a side view of a vehicle passenger compartment showing schematically an interface 260 between the vehicle interior monitoring system of this invention and the vehicle heating and air conditioning system. In addition to the transducers 231 and 232, which at least in this embodiment are preferably acoustic transducers, an infrared sensor 234 is also shown mounted in the A-pillar and is constructed and operated to monitor the temperature of the occupant.

The output from each of the transducers is fed into processor 101 that is in turn connected to interface 260. In this manner, the HVAC control is based on the occupant's temperature rather than that of the ambient air in the vehicle, as well as the determined presence of the occupant via transducers 231, 232 as described above. This also permits each vehicle occupant to be independently monitored and the HVAC system to be adjusted for each occupant either based on a set temperature for all occupants or, alternately, each occupant could be permitted to set his or her own preferred temperature through adjusting a control knob shown schematically as 250 in FIG. 3. Since the monitoring system is already installed in the vehicle with its associated electronics including processor 101, the infrared sensor can be added with little additional cost and can share the processing unit.

4.2 Control of Passive Restraints

Figure 4:
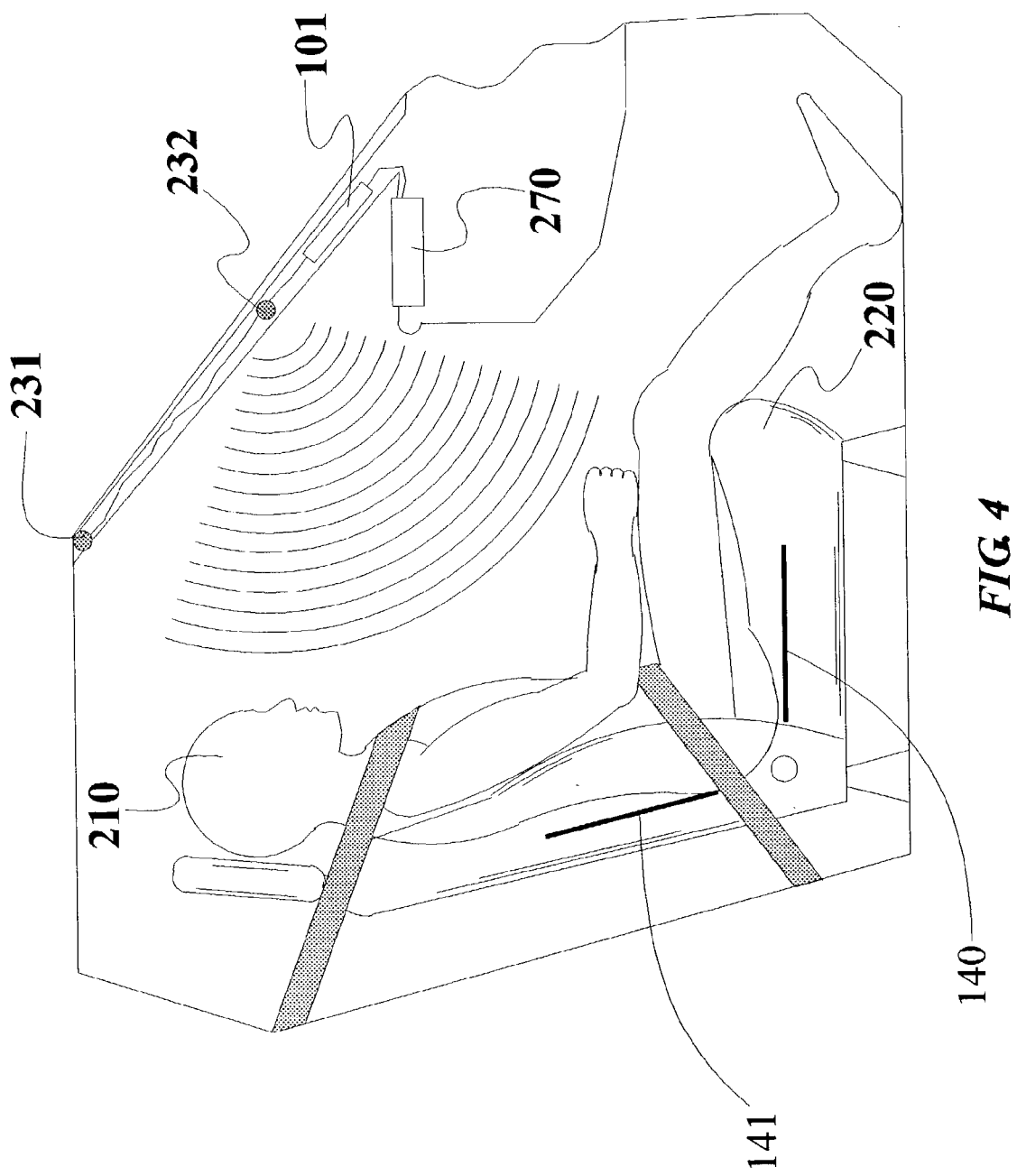
FIG. 4 is a side view with parts cutaway and removed showing schematically the interface between the vehicle interior monitoring system of this invention and the vehicle airbag system and including an antenna field sensor.

The use of the vehicle interior monitoring system to control the deployment of an airbag is discussed in detail in U.S. Pat. No. 5,653,462. In that case, the control is based on the use of a pattern recognition system, such as a neural network, to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of this invention and the vehicle airbag system 270.

In this embodiment, an ultrasonic transducer 232 transmits a burst of ultrasonic waves that travel to the occupant where they are reflected back to transducers or receptors/receivers 231 and 232. The time period required for the waves to travel from the generator and return is used to determine the distance from the occupant to the airbag as described in U.S. Pat. No. 5,653,462, i.e., and thus may also be used to determine the position or location of the occupant. In the case of this invention, however, the portion of the return signal that represents the occupants' head or chest, has been determined based on pattern recognition techniques such as a neural network.

The relative velocity of the occupant toward the airbag can then be determined, from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance that would not be possible if he were wearing a seatbelt gives information that he is not wearing one.

A more detailed discussion of this process and of the advantages of the various technologies, such as acoustic or electromagnetic, can be found in SAE paper 940527, "Vehicle Occupant Position Sensing" by Breed et al, which is incorporated herein by reference in its entirety to the extent the disclosure of this paper is necessary. In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either camera, laser or radar based systems. The main limiting feature of ultrasonics is the wavelength, which places a limitation on the size of features that can be discerned. Optical systems, for example, are required when the identification of particular individuals is required.

4.3 Entertainment and Hypersonic Sound

It is well known among acoustics engineers that the quality of sound coming from an entertainment system can be substantially affected by the characteristics and contents of the space in which it operates and the surfaces surrounding that space. When an engineer is designing a system for an automobile he or she has a great deal of knowledge about that space and of the vehicle surfaces surrounding it. He or she has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved.

FIG. 5, therefore, illustrates schematically the interface between the vehicle interior monitoring system of this invention, i.e., transducers 231, 232 and processor 101 which operate as set forth above, and the vehicle entertainment system 280. The particular design of the entertainment system that uses the information provided by the monitoring system can be determined by those skilled in the appropriate art. Perhaps in combination with this system, the quality of the sound system can be measured by the audio system itself either by using the speakers as receiving units also or through the use of special microphones. The quality of the sound can then be adjusted according to the vehicle occupancy and the reflectivity of the vehicle occupants. If, for example, certain frequencies are being reflected more that others, the audio amplifier can be adjusted to amplify those frequencies to a lesser amount that others.

Recent developments in the field of directing sound using hyper-sound (also referred to as hypersonic sound) now make it possible to accurately direct sound to the vicinity of the ears of an occupant so that only that occupant can hear the sound. The system of this invention can thus be used to find the proximate direction of the ears of the occupant for this purpose.

Hypersonic sound is described in detail in U.S. Pat. No. 5,885,129 (Norris), U.S. Pat. No. 5,889,870 (Norris) and U.S. Pat. No. 6,016,351 (Raida et al.) and International Publication No. WO 00/18031 which are incorporated by reference herein in their entirety to the extent the disclosure of these references is necessary. By practicing the techniques described in these patents and the publication, in some cases coupled with a mechanical or acoustical steering mechanism, sound can be directed to the location of the ears of a particular vehicle occupant in such a manner that the other occupants can barely hear the sound, if at all. This is particularly the case when the vehicle is operating at high speeds on the highway and a high level of "white" noise is present. In this manner, one occupant can be listening to the news while another is listening to an opera, for example. Naturally, white noise can also be added to the vehicle and generated by the hypersonic sound system if necessary when the vehicle is stopped or traveling in heavy traffic. Thus, several occupants of a vehicle can listen to different programming without the other occupants hearing that programming. This can be accomplished using hypersonic sound without requiring earphones.

In principle, hypersonic sound utilizes the emission of inaudible ultrasonic frequencies that mix in air and result in the generation of new audio frequencies. A hypersonic sound system is a highly efficient converter of electrical energy to acoustical energy. Sound is created in air at any desired point that provides flexibility and allows manipulation of the perceived location of the source of the sound. Speaker enclosures are thus rendered dispensable. The dispersion of the mixing area of the ultrasonic frequencies and thus the area in which the new audio frequencies are audible can be controlled to provide a very narrow or wide area as desired.

The audio mixing area generated by each set of two ultrasonic frequency generators in accordance with the invention could thus be directly in front of the ultrasonic frequency generators in which case the audio frequencies would travel from the mixing area in a narrow straight beam or cone to the occupant. Also, the mixing area can include only a single ear of an occupant (another mixing area being formed by ultrasonic frequencies generated by a set of two other ultrasonic frequency generators at the location of the other ear of the occupant with presumably but not definitely the same new audio frequencies) or be large enough to encompass the head and both ears of the occupant. If so desired, the mixing area could even be controlled to encompass the determined location of the ears of multiple occupants, e.g., occupants seated one behind the other or one next to another.

Vehicle entertainment system 280 may include means for generating and transmitting sound waves at the ears of the occupants, the position of which are detected by transducers 231, 232 and processor 101, as well as means for detecting the presence and direction of unwanted noise. In this manner, appropriate sound waves can be generated and transmitted to the occupant to cancel the unwanted noise and thereby optimize the comfort of the occupant, i.e., the reception of the desired sound from the entertainment system 280.

More particularly, the entertainment system 280 includes sound generating components such as speakers, the output of which can be controlled to enable particular occupants to each listen to a specific musical selection. As such, each occupant can listen to different music, or multiple occupants can listen to the same music while other occupant(s) listen to different music. Control of the speakers to direct sound waves at a particular occupant, i.e., at the ears of the particular occupant located in any of the ways discussed herein, can be enabled by any known manner in the art, for example, speakers having an adjustable position and/or orientation or speakers producing directable sound waves. In this manner, once the occupants are located, the speakers are controlled to direct the sound waves at the occupant, or even more specifically, at the head or ears of the occupants.

Figure 5A:
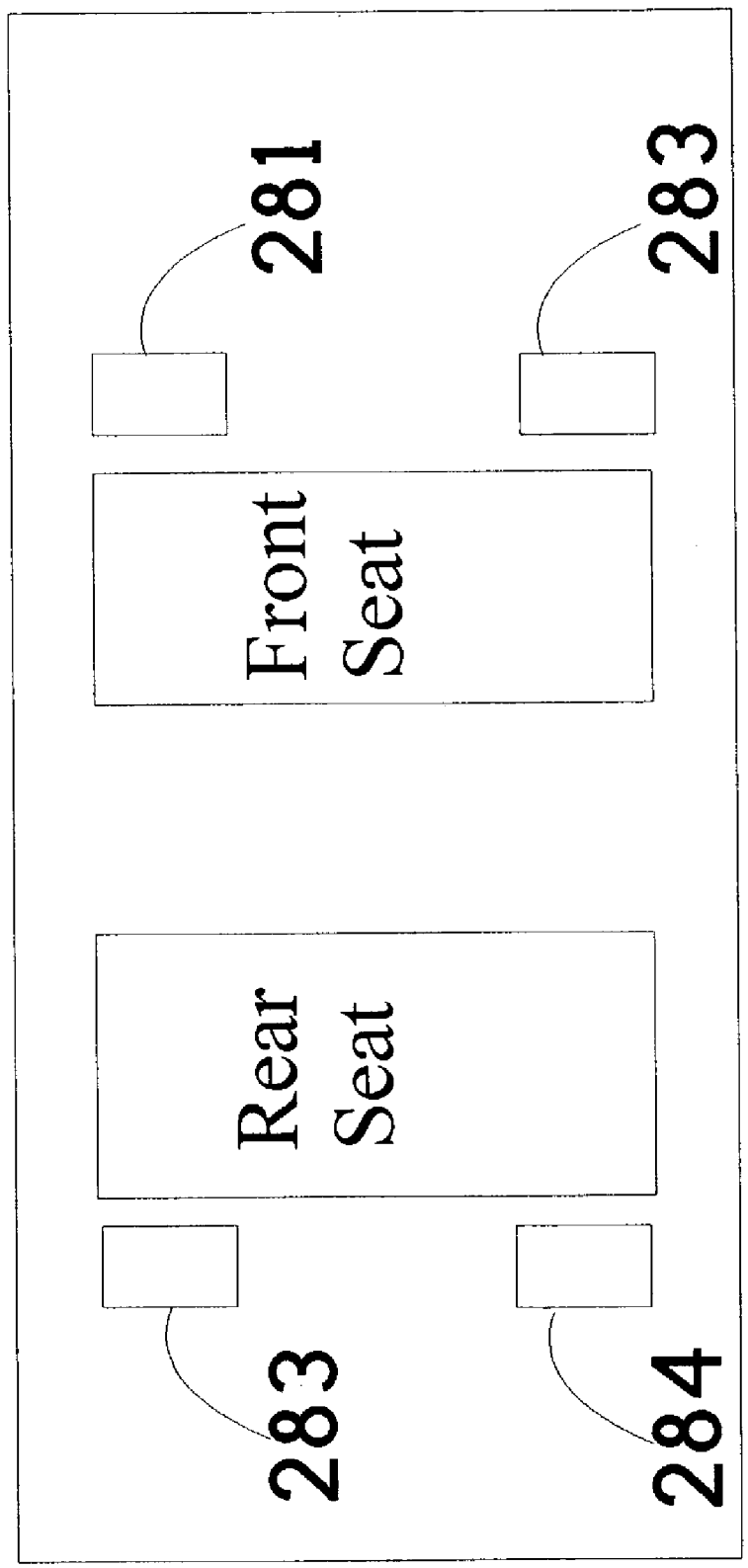
FIG. 5A is a schematic representation of a vehicle in which the entertainment system utilizes hypersonic sound.

FIG. 5A shows a schematic of a vehicle with four sound generating units 281, 282, 283, 284 forming part of the entertainment system 280 of the vehicle which is coupled to the processor 101. Sound generating unit 281 is located to provide sound to the driver. Sound generating unit 282 is located to provide sound for the front-seated passenger. Sound generating unit 283 is located to provide sound for the passenger in the rear seat behind the driver and sound generating unit 284 is located to provide sound for the passenger in the rear seat behind the front-seated passenger. A single sound generating unit could be used to provide sound for multiple locations or multiple sound generating units could be used to provide sound for a single location.

Sound generating units 281, 282, 283, 284 operate independently and are activated independently so that, for example, when the rear seat is empty, sound generating units 283, 284 are not operated. This constitutes control of the entertainment system based on, for example, the presence, number and position of the occupants. Further, each sound generating unit 281–284 can generate different sounds so as to customize the audio reception for each occupant.

Each sound generating units 281, 282, 283, 284 may be constructed to utilize hypersonic sound to enable specific, desired sounds to be directed to each occupant independent of sound directed to another occupant. The construction of sound generating units utilizing hypersonic sound is described in, for example, U.S. Pat. Nos. 5,885,129, 5,889, 870 and 6,016,351 mentioned above and incorporated by reference herein. In general, in hypersonic sound, ultrasonic waves are generated by a pair of ultrasonic frequency generators and mix after generation to create new audio frequencies. By appropriate positioning, orientation and/or control of the ultrasonic frequency generators, the new audio frequencies will be created in an area encompassing the head of the occupant intended to receive the new audio frequencies. Control of the sound generating units 281–284 is accomplished automatically upon a determination by the monitoring system of at least the position of any occupants.

Furthermore, multiple sound generating units or speakers can be provided for each sitting position and these sound generating units or speakers independently activated so that only those sound generating units or speakers which provide sound waves at the determined position of the ears of the occupant will be activated. In this case, there could be four speakers associated with each seat and only two speakers would be activated for, e.g., a small person whose ears are determined to be below the upper edge of the seat, whereas the other two would be activated for a large person whose ears are determined to be above the upper edge of the seat. All four could be activated for a medium size person. This type of control, i.e., control over which of a plurality of speakers are activated, would likely be most advantageous when the output direction of the speakers is fixed in position and provide sound waves only for a predetermined region of the passenger compartment.

When the entertainment system comprises speakers which generate actual audio frequencies, the speakers can be controlled to provide different outputs for the speakers based on the occupancy of the seats. For example, using the identification methods disclosed herein, the identity of the occupants can be determined in association with each seating position and, by enabling such occupants to store music preferences, for example a radio station, the speakers associated with each seating position can be controlled to provide music from the respective radio station. The speakers could also be automatically directed or orientable so that at least one speaker directs sound toward each occupant present in the vehicle. Speakers that cannot direct sound to an occupant would not be activated.

Figure 6:
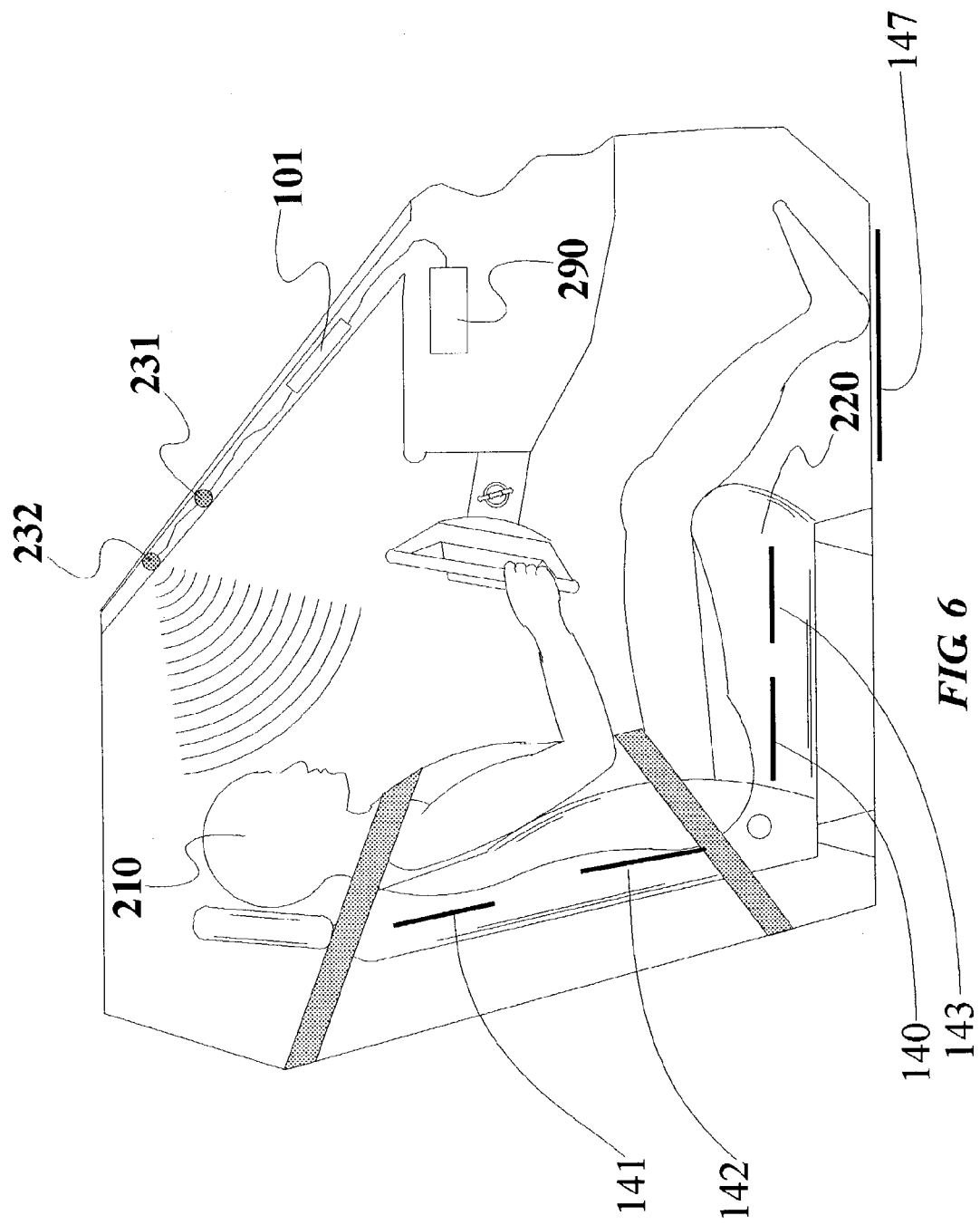
FIG. 6 is a side view with parts cutaway and removed of a vehicle showing the passenger compartment containing a driver and a preferred mounting location for an occupant identification system and including an antenna field sensor.

Thus, one of the more remarkable advantages of the improved audio reception system and method disclosed herein is that by monitoring the position of the occupants, the entertainment system can be controlled without manual input to optimize audio reception by the occupants. Noise cancellation is now possible for each occupant independently 4.4 Other Electromagnetic Transducers In FIG. 6 the ultrasonic transducers of the previous designs are replaced by laser or other electromagnetic wave transducers or transceivers 231 and 232, which are connected to a microprocessor 101. As discussed above, these are only illustrative mounting locations and any of the locations described herein are suitable for particular technologies. Also such electromagnetic transceivers are meant to include the entire electromagnetic spectrum including capacitive or electric field sensors including so called "displacement current sensors" as discussed in detail above, and the auto-tune antenna sensor also discussed above.

Note that the auto-tuned antenna sensor is preferably placed in the vehicle seat, headrest, floor, dashboard, headliner, or airbag module cover. Seat mounted examples are shown at 140, 141, 142 and 143 and a floor mounted example at 147. In most other manners, the system operates the same.

The design of the electronic circuits for a laser system is described in some detail in U.S. Pat. No. 5,653,462 cross-referenced above and in particular FIG. 8 thereof and the corresponding description. In this case, a pattern recognition system such as a neural network, or preferably modular neural network, system is employed and can use the demodulated signals from the receptors 231 and 232. For some cases, such as a laser transceiver that may contain a CMOS, CCD, PIN or avalanche diode or other light sensitive devices, a scanner is also required that can be either solid state as in the case of some radar systems based on a phased array, an acoustical optical system as is used by some laser systems, or a mirror or MEMS based reflecting scanner, or other appropriate technology.

The output of processor 101 of the monitoring system is shown connected schematically to a general interface 290 which can be the vehicle ignition enabling system; the restraint system; the entertainment system; the seat, mirror, suspension or other adjustment systems; or any other appropriate vehicle system.

4.5 Supporting Electronic Circuits

There are several preferred methods of implementing the vehicle interior monitoring system of this invention including a microprocessor, an application specific integrated circuit system (ASIC), and/or an FPGA or DSP. These systems are represented schematically as either 101 or 601 herein. In some systems, both a microprocessor and an ASIC are used. In other systems, most if not all of the circuitry is combined onto a single chip (system on a chip). The particular implementation depends on the quantity to be made and economic considerations. It also depends on time-to-market considerations where FPGA is frequently the technology of choice.

Figure 7A:
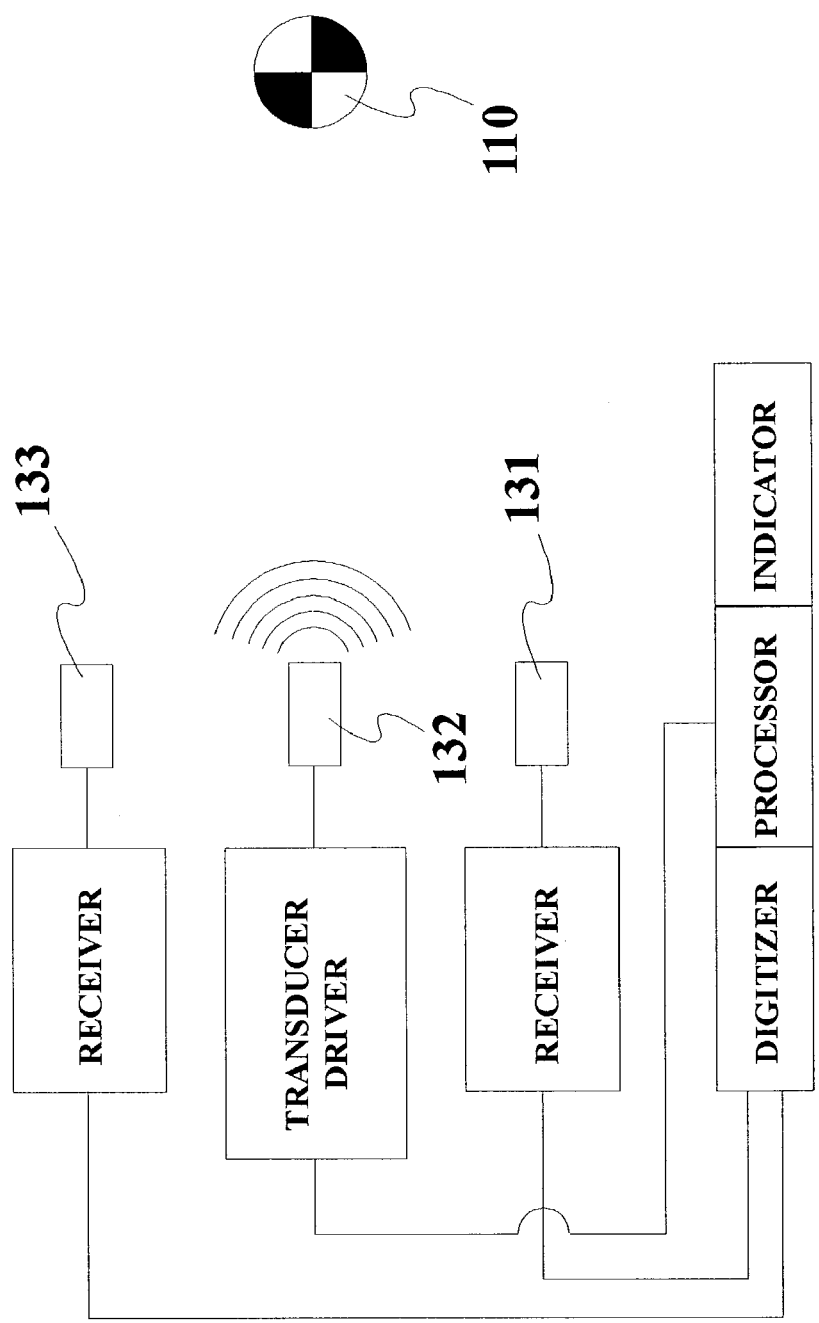
FIG. 7A is a functional block diagram of the ultrasonic imaging system illustrated in FIG. 1 using a microprocessor, DSP or field programmable gate array (FGPA).
Figure 7B:
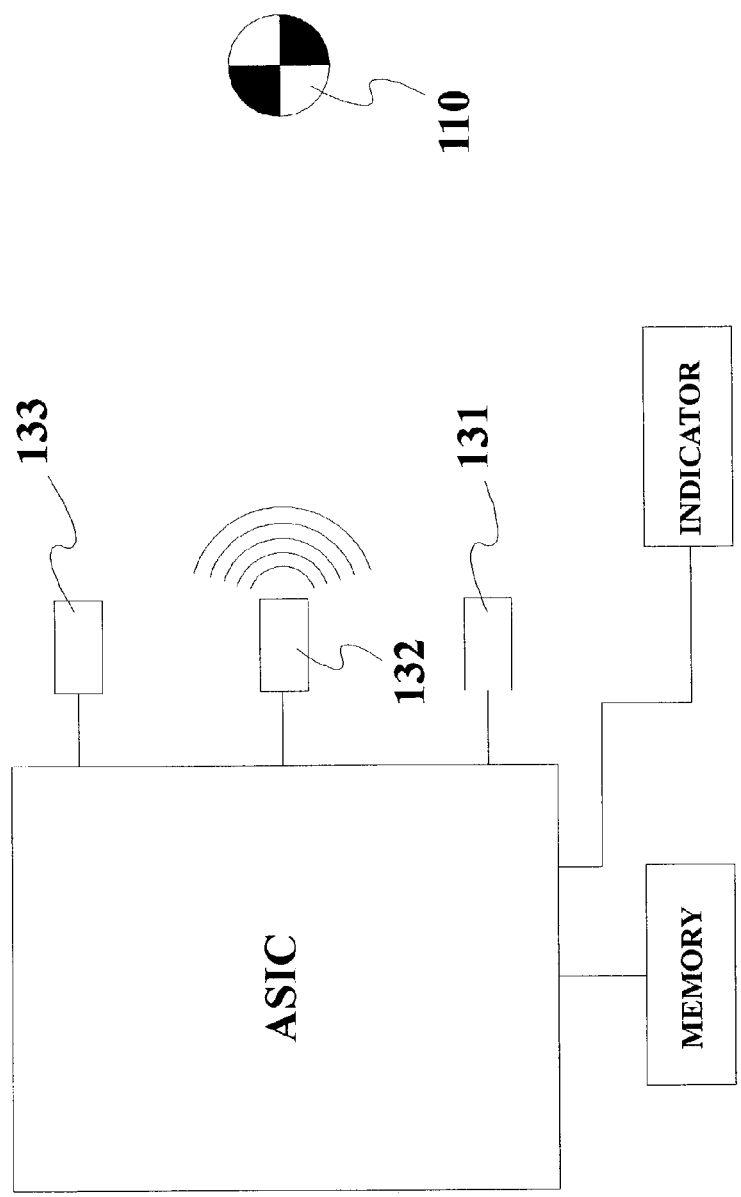
FIG. 7B is a functional block diagram of the ultrasonic imaging system illustrated in FIG. 1 using an application specific integrated circuit (ASIC).

A block diagram illustrating: the microprocessor system is shown in FIG. 7A, which shows the implementation of the system of FIG. 1. An alternate implementation of the FIG. 1 system using an ASIC is shown in FIG. 7B. In both cases the target, which may be a rear facing child seat, is shown schematically as 110 and the three transducers as 131, 132, and 133. In the embodiment of FIG. 7A, there is a digitizer coupled to the receivers 131, 133 and the processor, and an indicator coupled to the processor. In the embodiment of FIG. 7B, there is a memory unit associated with the ASIC and also an indicator coupled to the ASIC.

The above applications illustrate the wide range of opportunities, which become available if the identity and location of various objects and occupants, and some of their parts, within the vehicle were known. Once the system of this invention is operational, integration with the airbag electronic sensor and diagnostics system (SDM) is likely since as interface with SDM is necessary. This sharing of resources will result in a significant cost saving to the auto manufacturer. For the same reasons, the VIMS can include the side impact sensor and diagnostic system.

4.6 Other Occupying Objects

In FIG. 8, a view of the system of FIG. 1 is illustrated with a box 295 shown on the front passenger seat in place of a rear facing child seat. The vehicle interior monitoring system is trained to recognize that this box 295 is neither a rear facing child seat nor an occupant and therefore it is treated as an empty seat and the deployment of the airbag is suppressed. The auto-tune antenna based system 140, 141 is particularly adept at making this distinction particularly if the box does not contain substantial amounts of water. Although a simple implementation of the auto-tune antenna system is illustrated, it is of course possible to use multiple antennas located in the seat and elsewhere in the passenger compartment and these antenna systems can either operate at one or a multiple of different frequencies to discriminate type, location and relative size of the object being investigated. This training can be accomplished using a neural network or modular neural network with the commercially available software disclosed above and provided, for example, by NeuralWare of Pittsburgh or ISR. The system assesses the probability that the box is a person, however, and if there is even the remotest chance that it is a person, the airbag deployment is not suppressed. The system is thus typically biased toward enabling airbag deployment.

5. Other Implementations of the Basic System

5.1 Side Impact

Figure 9:
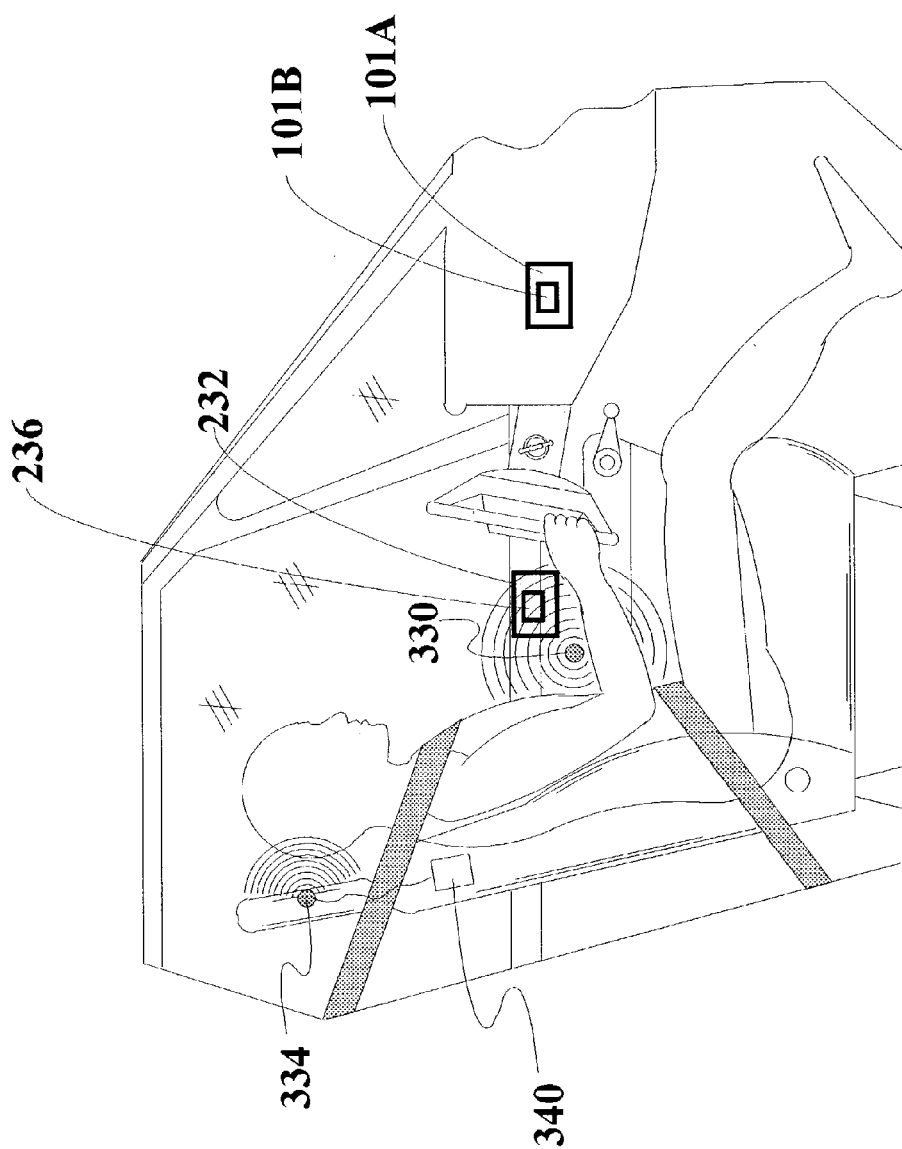
FIG. 9 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

Side impact airbags are now used on some vehicles. Some are quite small compared to driver or passenger airbags used for frontal impact protection. Nevertheless, a small child could be injured if he is sleeping with his head against the airbag module when the airbag deploys and a vehicle interior monitoring system is needed to prevent such a deployment. In FIG. 9, a single ultrasonic transducer 330 is shown mounted in a door adjacent airbag system 332 that houses an airbag 336. The airbag system 332 and components of the interior monitoring system, for example transducer 330, are coupled to a processor 101A including a control circuit 101B for controlling deployment of the airbag 336 based on information obtained by ultrasonic transducer 330.

This device is not used to identify the object that is adjacent the airbag but merely to measure the position of the object. It can also be used to determine the presence of the object, that is the received waves are indicative of the presence or absence of an occupant as well as the position of the occupant or a part thereof. Instead of an ultrasonic transducer, another wave-receiving transducer may be used as described in any of the other embodiments herein, either solely for performing a wave-receiving function or for performing both a wave-receiving function and a wave-transmitting function.

5.2 Headrest Positioning for Rear Impacts

A rear-of-head detector 334 is also illustrated in FIG. 9. This detector 334 is used to determine the distance from the headrest to the rearmost position of the occupant's head and to therefore control the position of the headrest so that it is properly positioned behind the occupant's head to offer optimum support during a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Admin.). A properly positioned headrest could substantially reduce the frequency of such injuries, which can be accomplished by the head detector of this invention. The head detector 334 is shown connected schematically to the headrest control mechanism and circuitry 340. This mechanism is capable of moving the headrest up and down and, in some cases, rotating it fore and aft.

5.3 Directional Microphone

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of drivers' mouths varies significantly depending on such things as the size and seating position of the driver.

Figure 10:
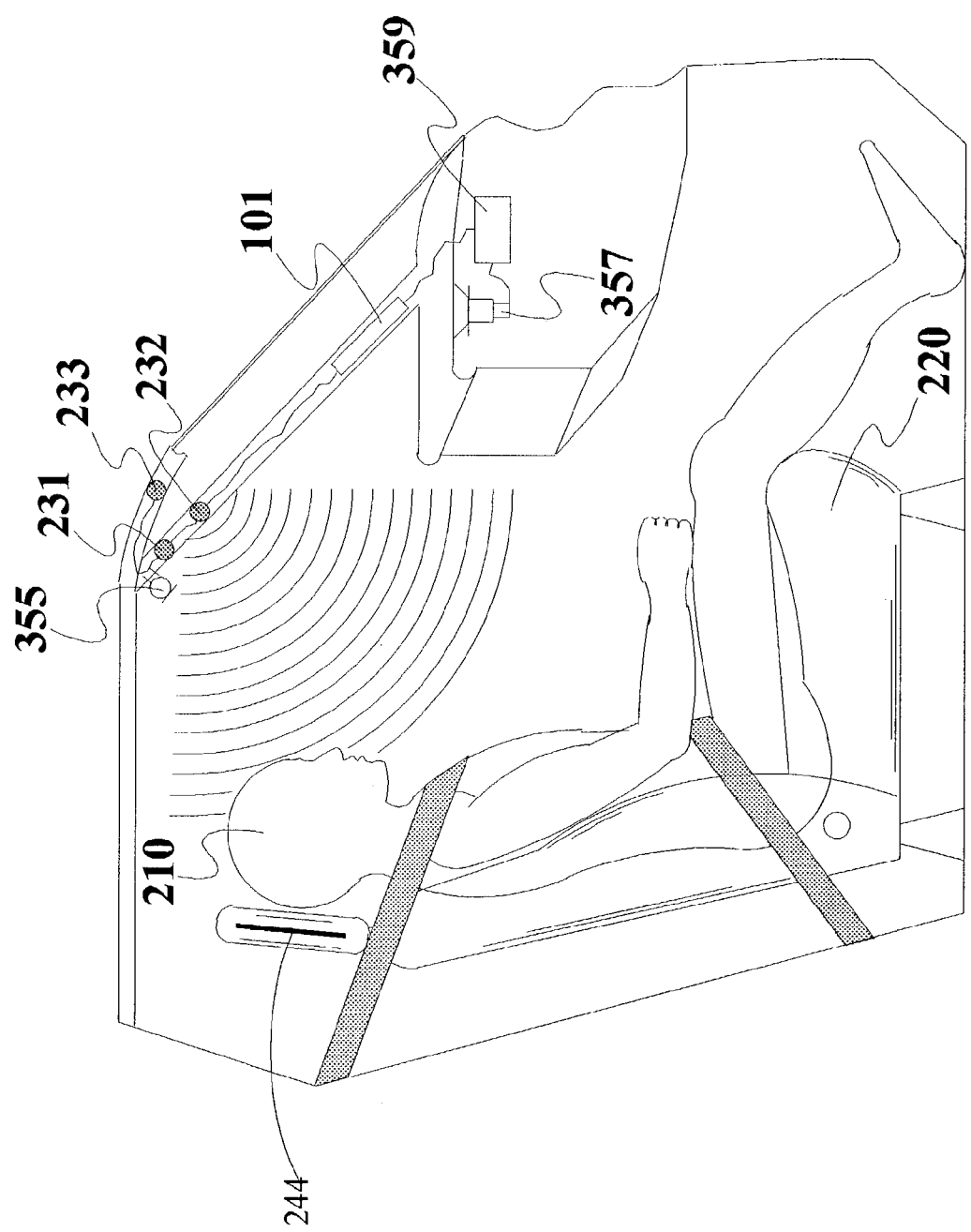
FIG. 10 is a side view with parts cutaway and removed of a vehicle showing the passenger compartment containing a front passenger and a preferred mounting location for an occupant head detector and a preferred mounting location of an adjustable microphone and speakers and including an antenna field sensor in the headrest for a rear of occupant's head locator for use with a headrest adjustment system to reduce whiplash injuries, in particular, in rear impact crashes.

By using the vehicle interior identification and monitoring system of this invention, and through appropriate pattern recognition techniques, the location of the driver's head can be determined with sufficient accuracy even with ultrasonics to permit a directional microphone having, for example, a 15 degree cone angle to be aimed at the mouth of the driver resulting in a clear reception of his voice. The use of directional speakers in a similar manner also improves the telephone system performance. In the extreme case of directionality, the techniques of hypersonic sound can be used. Such a system can also be used to permit effortless conversations between occupants of the front and rear seats. Such a system is shown in FIG. 10, which is a system similar to that of FIG. 2 only using three ultrasonic transducers 231, 232 and 233 to determine the location of the driver's head and control the pointing direction of a microphone 355. Speaker 357 is shown connected schematically to the phone system 359 completing the system. Note, although the transducers are illustrated as being mounted on the A-pillar and headliner, better performance is achieved when the transducers are mounted spaced apart as discussed in Varga et. al. U.S. Pat. No. RE 37,260, which in incorporated herein by reference.

The transducers 231 and 232 can be placed high in the A-pillar and the third transducer 233 is placed in the headliner and displaced horizontally from transducers 231 and 232. The two transducers 231 and 232 provide information to permit the determination of the locus of the head in the vertical direction and the combination of one of transducers 231 and 232 in conjunction with transducer 233 is used to determine the horizontal location of the head. The three transducers are placed high in the vehicle passenger compartment so that the first returned signal is from the head.

Temporal filtering may be used to eliminate signals that are reflections from beyond the head and the determination of the head center location is then found by the approximate centroid of the head returned signal. That is, once the location of the return signal centroid is found from the three received signals from transducers 231, 232 and 233, the distance to that point is known for each of the transducers based on the time it takes the signal to travel from the head to each transducer. In this manner, by using the three transducers, all of which send and receive, plus an algorithm for finding the coordinates of the head center, using processor 101, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise.

6. Glare Reduction

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Opaque visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. The vehicle interior monitoring system of this invention can contribute to the solution of this problem by determining the position of the driver's eyes. If separate sensors are used to sense the direction of the light from the on-coming vehicle or the sun, and through the use of electro-chromic glass, a liquid crystal device, suspended particle device glass (SPD) or other appropriate technology, a portion of the windshield, or special visor as discussed below, can be darkened to impose a filter between the eyes of the driver and the light source.

Electro-chromic glass is a material where the color of the glass can be changed through the application of an electric current. By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development. One example is to place a transparent sun visor type device between the windshield and the driver to selectively darken portions of the visor as described above for the windshield.

Figure 11:
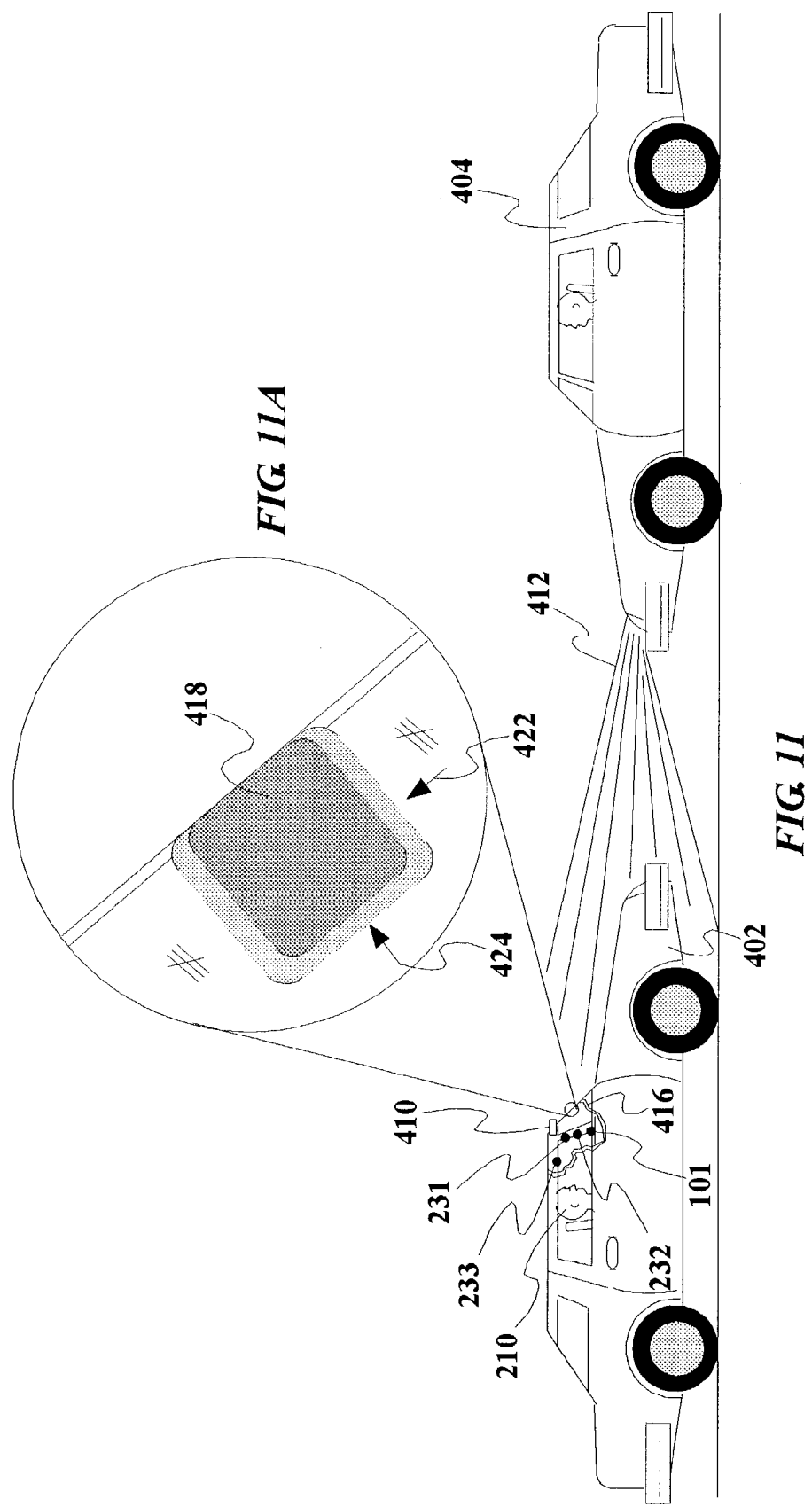
FIG. 11 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electrochromic glass, organic or metallic semiconductor polymers or electropheric particulates (SPD) in the windshield.

FIG. 11 illustrates how such a system operates for the windshield. A sensor 410 located on vehicle 402 determines the direction of the light 412 from the headlights of oncoming vehicle 404. Sensor 410 is comprised of a lens and a charge-coupled device (CCD), of CMOS light sensing or similar device, with appropriate electronic circuitry that determines which elements of the CCD are being most brightly illuminated. An algorithm stored in processor 101 then calculates the direction of the light from the oncoming headlights based on the information from the CCD, or CMOS device. Transducers 231, 232 and 233 determine the probable location of the eyes of the operator 210 of vehicle 402 in a manner such as described above in conjunction with the determination of the location of the driver's mouth in the discussion of FIG. 10. In this case, however, the determination of the probable locus of the driver's eyes is made with an accuracy of a diameter for each eye of about 3 inches (7.5 cm). This calculation sometimes will be in error especially for ultrasonic occupant sensing systems and provision is made for the driver to make an adjustment to correct for this error as described below.

The windshield 416 of vehicle 402 is made from electro-chromic glass, comprises a liquid crystal, SPD device or similar system, and is selectively darkened at area 418 due to the application of a current along perpendicular directions 422 and 424 of windshield 416. The particular portion of the windshield to be darkened is determined by processor 101. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by processor 101. A separate control system, not shown, located on the instrument panel, steering wheel or at some other convenient location, allows the driver to select the amount of darkening accomplished by the system from no darkening to maximum darkening. In this manner, the driver can select the amount of light that is filtered to suit his particular physiology. The sensor 410 can either be designed to respond to a single light source or to multiple light sources to be sensed and thus multiple portions of the vehicle windshield to be darkened.

As an alternative to locating the direction of the offending light source, a camera looking at the eyes of the driver can determine when they are being subjected to glare and then impose a filter, perhaps by a trail and error calculation or through the use of structured light created by a pattern on the windshield, determines where to create the filter to block the glare.

More efficient systems are now becoming available to permit a substantial cost reduction as well as higher speed selective darkening of the windshield for glare control. These systems permit covering the entire windshield which is difficult to achieve with LCDs. For example, such systems are made from thin sheets of plastic film, sometimes with an entrapped liquid, and can usually be sandwiched between the two pieces of glass that make up a typical windshield. The development of conductive plastics permits the addressing and thus the manipulation of pixels of a transparent film that heretofore was not possible. These new technologies will now be discussed.

If the objective is for glare control then the Xerox Gyricon technology applied to windows is appropriate. Heretofore this technology has only been used to make e-paper and a modification to the technology is necessary for it to work for glare control. Gyricon is a thin layer of transparent plastic full of millions of small black and white or red and white beads, like toner particles. The beads are contained in an oil-filled cavity. When voltage is applied, the beads rotate to present a colored side to the viewer. The advantages of Gyricon are: (1) it is electrically writeable and erasable; (2) it can be re-used thousands of times; (3) it does not require backlighting or refreshing; (4) it is brighter than today's reflective displays; and, (5) it operates on low power. The changes required are to cause the colored spheres to rotate 90 degrees rather than 180 degrees and to make half of each sphere transparent so that the display switches from opaque to 50% transparent.

Another technology, SPD light control technology from Research Frontiers Inc., has been used to darken entire windows but not as a system for darkening only a portion of the glass or sun visor to impose a selective filter to block the sun or headlights of an oncoming vehicle. Although it has been used as a display for laptop computers, it has not been used as a heads-up display (HUD) replacement technology for automobile or truck windshields.

Both SPD and Gyricon technologies require that the particles be immersed in a fluid so that the particles can move. Since the properties of the fluid will be temperature sensitive, these technologies will vary somewhat in performance over the automotive temperature range. The preferred technology, therefore, is plastic electronics although in many applications either Gyricon or SPD will also be used in combination with plastic electronics, at least until the technology matures.

The calculations of the location of the driver's eyes using acoustic systems may be in error and therefore provision must be made to correct for this error. One such system permits the driver to adjust the center of the darkened portion of the windshield to correct for such errors through a knob, mouse pad, joy stick or other input device, on the instrument panel, steering wheel, door, armrest or other convenient location. Another solution permits the driver to make the adjustment by slightly moving his head. Once a calculation as to the location of the driver's eyes has been made, that calculation is not changed even though the driver moves his head slightly. It is assumed that the driver will only move his head to center the darkened portion of the windshield to optimally filter the light from the oncoming vehicle. The monitoring system will detect this initial head motion and make the correction automatically for future calculations. Additionally, a camera observing the driver or other occupant can monitor the reflections of the sun or an oncoming vehicles headlights off of the occupant's head or eyes and automatically adjust the filter in the windshield or sun visor.

Electro-chromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions that cover the lights from the offending vehicle, the driver is able to see all of the light coming from the rear whether the source is bright or dim. This permits the driver to see all of the approaching vehicles not just the one with bright lights.

Figure 12:
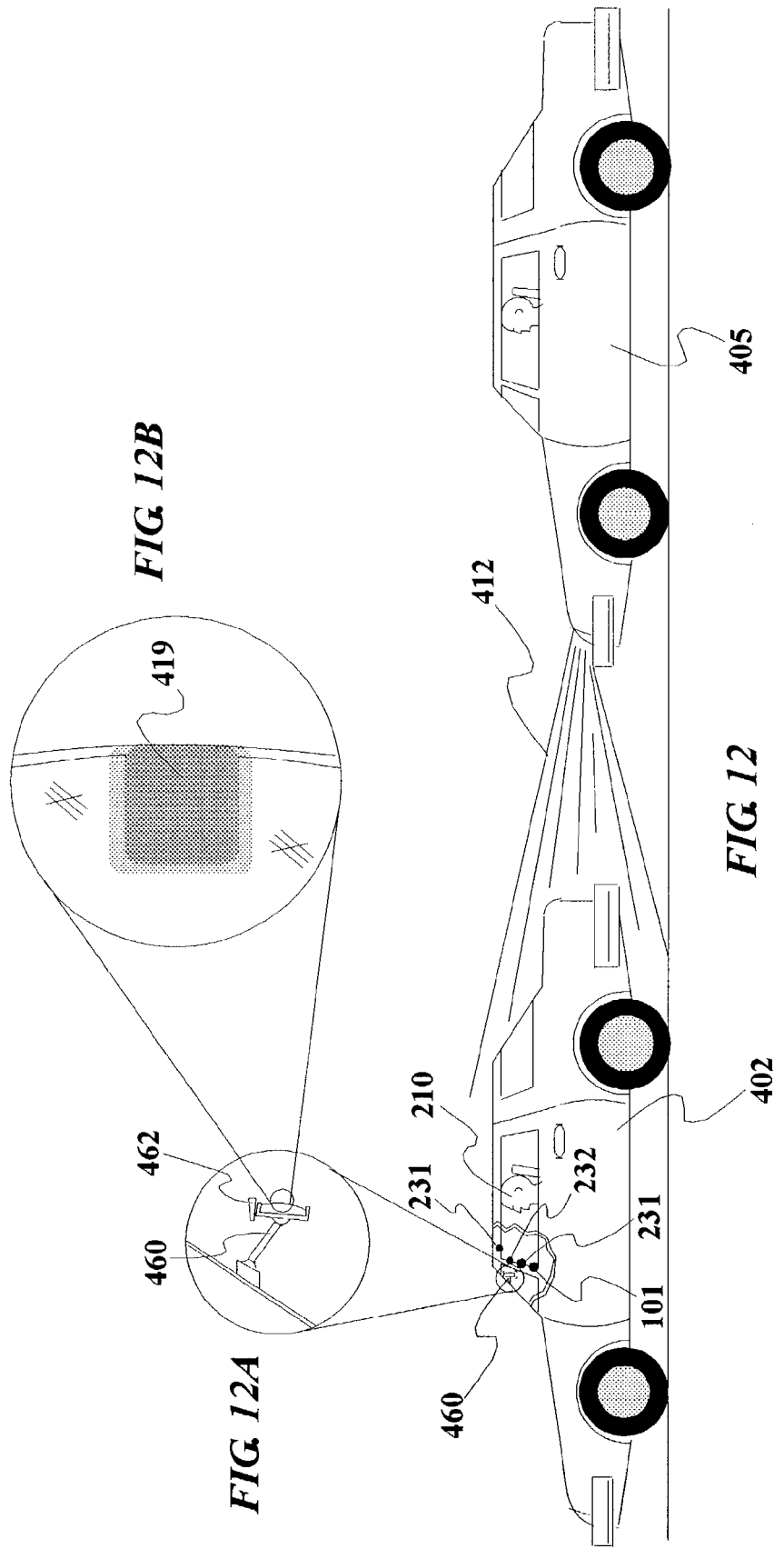
FIG. 12 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass, SPD glass or equivalent, in the rear view mirror.

Such a system is illustrated in FIG. 12 12A and 12B where rear view mirror 460 is equipped with electrochromic glass, or comprises a liquid crystal or similar device, having the capability of being selectively darkened, e.g., at area 419. Associated with mirror 460 is a light sensor 462 that determines the direction of light 412 from the headlights of rear approaching vehicle 405. In the same manner as above, transducers 231, 232 and 233 determine the location of the eyes of the driver 210. The signals from both sensor systems, 231, 232 plus 233 and 462, are combined in processor 101, where a determination is made as to what portions of the mirror should be darkened, e.g., area 419. Appropriate currents are then sent to the mirror in a manner similar to the windshield system described above. Again, an alternative solution is to observe a glare reflection on the face of the driver and remove the glare with a filter.

Note, the rearview mirror is also an appropriate place to display icons of the contents of the blind spot or other areas surrounding the vehicle as disclosed in U.S. patent application Ser. No. 09/851,362 filed May 8, 2001 and incorporated herein by reference.

7. Window Displays

In addition to offering the possibility of glare control, plastic electronics offer the possibility of turning any window into a display. This can be the windshield of an automobile or any window in a vehicle or house or other building, for that matter. A storefront can become a changeable advertising display, for example, and the windows of a house could be a display where emergency services warn people of a coming hurricane. For automotive and truck use, the windshield can now fulfill all of the functions that previously have required a heads up display (HUD). These include displays of any information that a driver may want or need including the gages normally on the instrument panel, displaying the results of a night vision camera and, if an occupant sensor is present, an image of an object, or an icon representation, can be displayed on the windshield where the driver would see it if it were visible through the windshield as discussed in more detail elsewhere herein and in the commonly assigned cross referenced patents and patent applications listed above. In fact, plastic electronics have the ability to cover most or even the entire windshield area at very low cost and without the necessity of an expensive and difficult to mount projection system. In contrast, most HUDs are very limited in windshield coverage. Plastic electronics also provide for a full color display, which is difficult to provide with a HUD since the combiner in the HUD is usually tuned to reflect only a single color.

In addition to safety uses, turning one or more windows of a house or vehicle into a display can have "infotainment" and other uses. For example, a teenager may wish to display a message on the side windows to a passing vehicle such as "hi, can I have your phone number?" The passing vehicle can then display the phone number if the occupant of that vehicle wishes. A vehicle or a vehicle operator that is experiencing problems can display "HELP" or some other appropriate message. The occupants of the back seat of a vehicle can use the side window displays to play games or search the Internet, for example. Similarly, a special visor like display based of plastic electronics can be rotated or pulled down from the ceiling for the same purposes. Thus, in a very cost effective manner, any or all of the windows or sun visors of the vehicle (or house or building) can now become computer displays and thus make use of previously unused surfaces for information display.

In another application, a portion of the windshield, such as the lower left corner, can be used to display the vehicle and surrounding vehicles or other objects as seen from above, for example, as described in U.S. patent application Ser. No. 09/851,362 filed May 8, 2000 which is incorporated herein by reference in its entirety. This display can use pictures or icons as appropriate. In another case, the condition of the road such as the presence, or likelihood of black ice can be displayed on the windshield where it would show on the road if the driver could see it. Naturally, this would require a source of information that such a condition exists, however, here the concern is that it can be displayed whatever the source of this or any other relevant information. When used in conjunction with a navigation system, directions including pointing arrows can be displayed to direct the driver to his destination or to points of interest.

Plastic electronics is in an early stage of development but will have an enormous impact on the windows, sunroofs and sun visors of vehicles. For example, researchers at Philips Research Laboratories have made a 64×64-pixel liquid crystal display (LCD) in which each pixel is controlled by a plastic transistor. Other researchers have used a polymer-dispersed liquid-crystal display (PDLCD) to demonstrate their polymeric transistor patterning. A PDLCD is a reflective display that, unlike most LCD technologies, is not based on polarization effects and so can be used to make a flexible display that could be pulled down like a shade, for example. In a PDLCD, light is either scattered by nonaligned molecules in liquid-crystal domains or the LC domains are transparent because an electrical field aligns the molecules.

Pentacene (5A) and sexithiophene (6T) are currently the two most widely used organic semiconductors. These are two conjugated molecules whose means of assembly in the solid state lead to highly orderly materials, including even the single crystal. The excellent transport properties of these molecules may be explained by the high degree of crystallinity of the thin films of these two semiconductor components.

The discovery of conducting polymers has become even more significant as this class of materials has proven to be of great technological promise. Conducting polymers have been put to use in such niche applications as electromagnetic shielding, antistatic coatings on photographic films, and windows with changeable optical properties. The undoped polymers, which are semiconducting and sometimes electroluminescent, have led to even more exciting possibilities, such as transistors, light-emitting diodes (LEDs), and photodetectors. The quantum efficiency (the ratio of photons out to electrons in) of the first polymer LEDs was about 0.01%, but subsequent work quickly raised it to about 1%. Polymer LEDs now have efficiencies of above about 10%, and they can emit a variety of colors. The upper limit of efficiency was once thought to be about 25% but this limitation has now been exceeded and improvements are expected to continue.

A screen based on PolyLEDs has advantages since it is lightweight and flexible. It can be rolled up or embedded into a windshield or other window. With plastic chips the electronics driving the screen are integrated into the screen itself. Some applications of the PolyLED are information screens of almost unlimited size, for example alongside motorways or at train stations. They now work continuously for about 50,000 hours, which is more that the life of an automobile. Used as a display, PolyLEDs are much thinner than an LCD screen with backlight.

The most important benefit of the PolyLED is the high contrast and the high brightness with the result that they can be easily read in both bright and dark environments, which is important for automotive applications. A PolyLED does not have the viewing angle problem associates with LCDs. The light is transmitted in all directions with the same intensity. Of particular importance is that PolyLEDs can be produced in large quantities at a low price. The efficiency of current plastic electronic devices depends somewhat on their electrical conductivity, which is currently considerably below metals. With improved ordering of the polymer chains, however, the conductivity is expected to eventually exceed that of the best metals. Plastic electronics can be made using solution based processing methods, such as spincoating, casting, and printing. This fact can potentially reduce the fabrication cost and lead to large area reel-to-reel production. In particular, printing methods (particularly screen printing) are especially desirable since the deposition and patterning steps can be combined in one single step. Screen printing has been widely used in commercial printed circuit boards and was recently adopted by several research groups to print electrodes as well as the active polymer layers for organic transistors and simple circuits. Inkjets and rubber stamps are alternative printing methods. A full-color polymer LED fabricated by ink-jet printing has been demonstrated using a solution of semiconducting polymer in a common solvent as the ink.

As reported in Science Observer, November–December, 1998 "Printing Plastic Transistors" plastic transistors can be made transparent, so that they could be used in display systems incorporated in an automobile's windshield. The plastic allows these circuits to be bent along the curvature of a windshield or around a package. For example, investigators at Philips Research in The Netherlands have developed a disposable identification tag that can be incorporated in the wrapping of a soft package.

8. Glare Reducing Sun Visor

Figure 21:
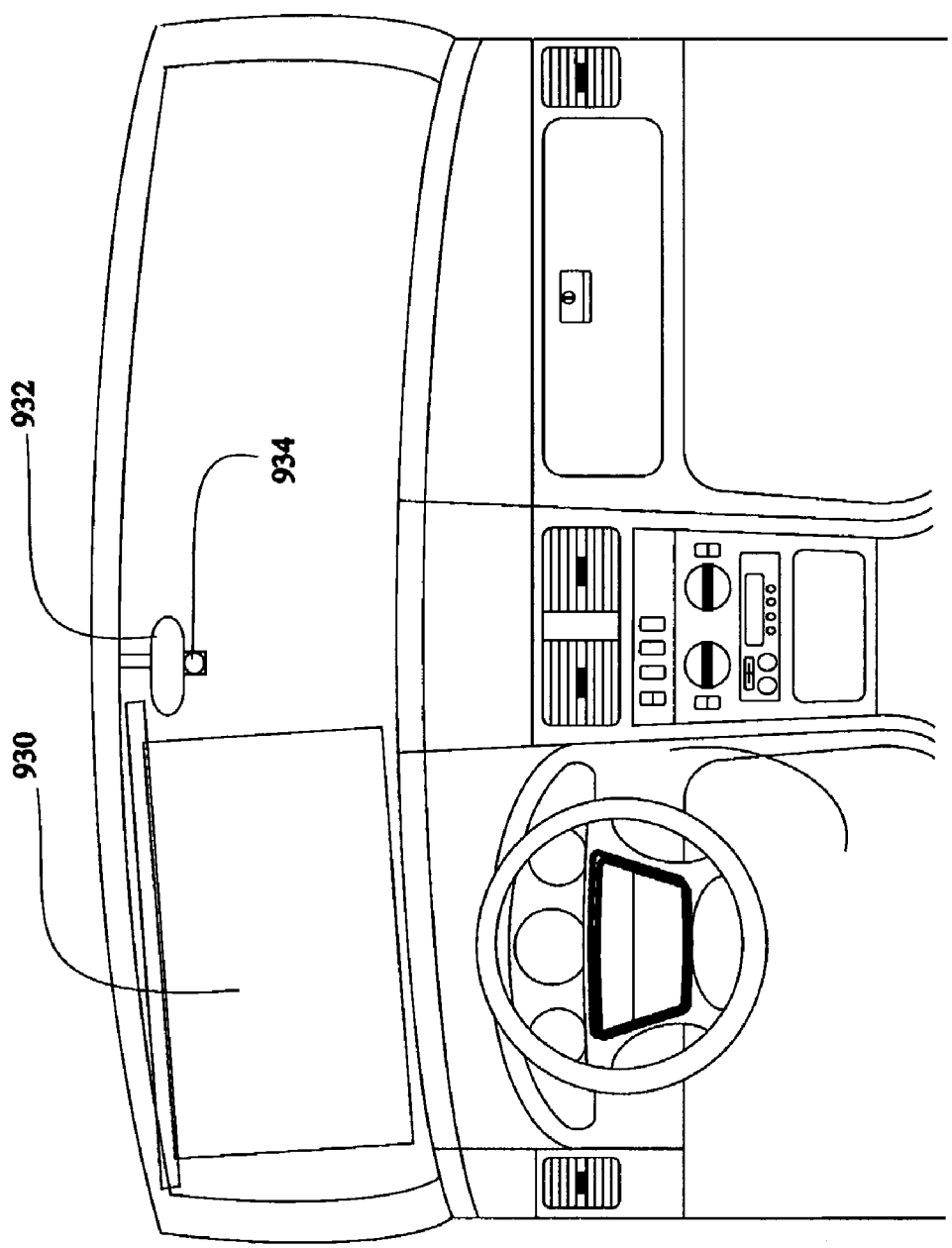
FIG. 21 illustrates the interior of a passenger compartment with a rear view mirror, a camera for viewing the eyes of the driver and a large generally transparent visor for glare filtering.

FIG. 21 illustrates the interior of a passenger compartment with a rear view mirror 932, a camera for viewing the eyes of the driver 934 and a large, generally transparent visor 930. The sun visor 930 is normally largely transparent and is made from electrochromic glass, suspended particle glass or a liquid crystal device or other comparable devices. The camera 934 images the eyes of the driver and looks for a reflection indicating that glare is impinging on the driver's eyes. The camera system may have a source of infrared or other frequency illumination that would be momentarily activated to aid in locating the driver's eyes.

The driver's eyes can also be located in any means, e.g., by determining the location of the driver's head and extrapolating the location of the eyes. Once the eyes have been located, the camera monitors the area around the eyes for an indication of glare. The camera system in this case would not know the direction from which the glare is originating; it would only know that the glare was present. The glare blocker system can then darken selected portions of the visor to attempt to block the source of glare and would use the observation of the glare around the eyes of the driver as feedback information. When the glare has been eliminated, the system maintains the filter perhaps momentarily reducing it from time to time to see that the source of glare has not stopped.

If the filter is electrochromic glass, a significant time period is required to activate the glare filter and therefore a trial and error search for the ideal filter location could be too slow. In this case, a non-recurring pattern can be placed in the visor such that when light passes through the visor and illuminates the face of the driver, the location where the filter should be placed can be easily determined. That is, the pattern reflection off of the face of the driver would indicate the location of the visor through which the light causing the glare was passing. Such a structured light system can also be used for the SPD and LCD filters but since they act significantly more rapidly it would serve only to simplify the search algorithm for filter placement.

A second photo sensor can also be used pointing through the windshield to determine only that glare was present. In this manner when the source of glare disappears the filter can be turned off. Naturally, a more sophisticated system as described above for the windshield system whereby the direction of the light is determined using a camera type device can also be implemented.

The visor 930 is illustrated as substantially covering the front windshield in front of the driver. This is possible since it is transparent except where the filter is applied, which would in general be a small area. A second visor, not shown, can also be used to cover the windshield for the passenger side that would also be useful when the light-causing glare on the driver's eyes enters thought the windshield in front of the passenger or if a passenger system is also desired. In some cases, it might even be advantageous to supply a similar visor to cover the side windows but in general standard opaque visors would serve for both the passenger side windshield area and the side windows since the driver really in general only needs to look through the windshield in front of him or her.

A smaller visor can also be used as long as it is provided with a positioning system or method. The visor really only needs to cover the eyes of the driver. This could either be done manually or by electric motors. If electric motors are used, then the adjustment system would first have to move the visor so that it covered the driver's eyes and then provide the filter. This could be annoying if the vehicle is heading into the sun and turning and/or going up and down hills. In any case, the visor should be movable to cover any portion of the windshield where glare can get through, unlike conventional visors that only cover the top half of the windshield. The visor also does not need to be close to the windshield and the closer that it is to the driver the smaller and thus the less expensive it can be.

As with the windshield, the visor of this invention can also serve as a display using plastic electronics as described above either with or without the SPD or other filter material. Additionally, visor like displays can now be placed at many locations in the vehicle for the display of Internet web pages, movies, games etc. Occupants of the rear seat, for example, can pull down such displays from the ceiling, up from the front seatbacks or out from the B-pillars or other convenient locations.

9. Seatbelt Adjustment

Seatbelts are most effective when the upper attachment point to the vehicle is positioned vertically close to the shoulder of the occupant being restrained. If the attachment point is too low the occupant experiences discomfort from the rubbing of the belt on his shoulder. If it is too high, the occupant may experience discomfort due to the rubbing of the belt against his neck and the occupant will move forward by a greater amount during a crash, which may result in his head striking the steering wheel. Short stature people in particular frequently experience discomfort from an improperly adjusted seatbelt anchorage point. For these reasons, it is desirable to have the upper seatbelt attachment point located slightly above the occupant's shoulder.

Figure 13:
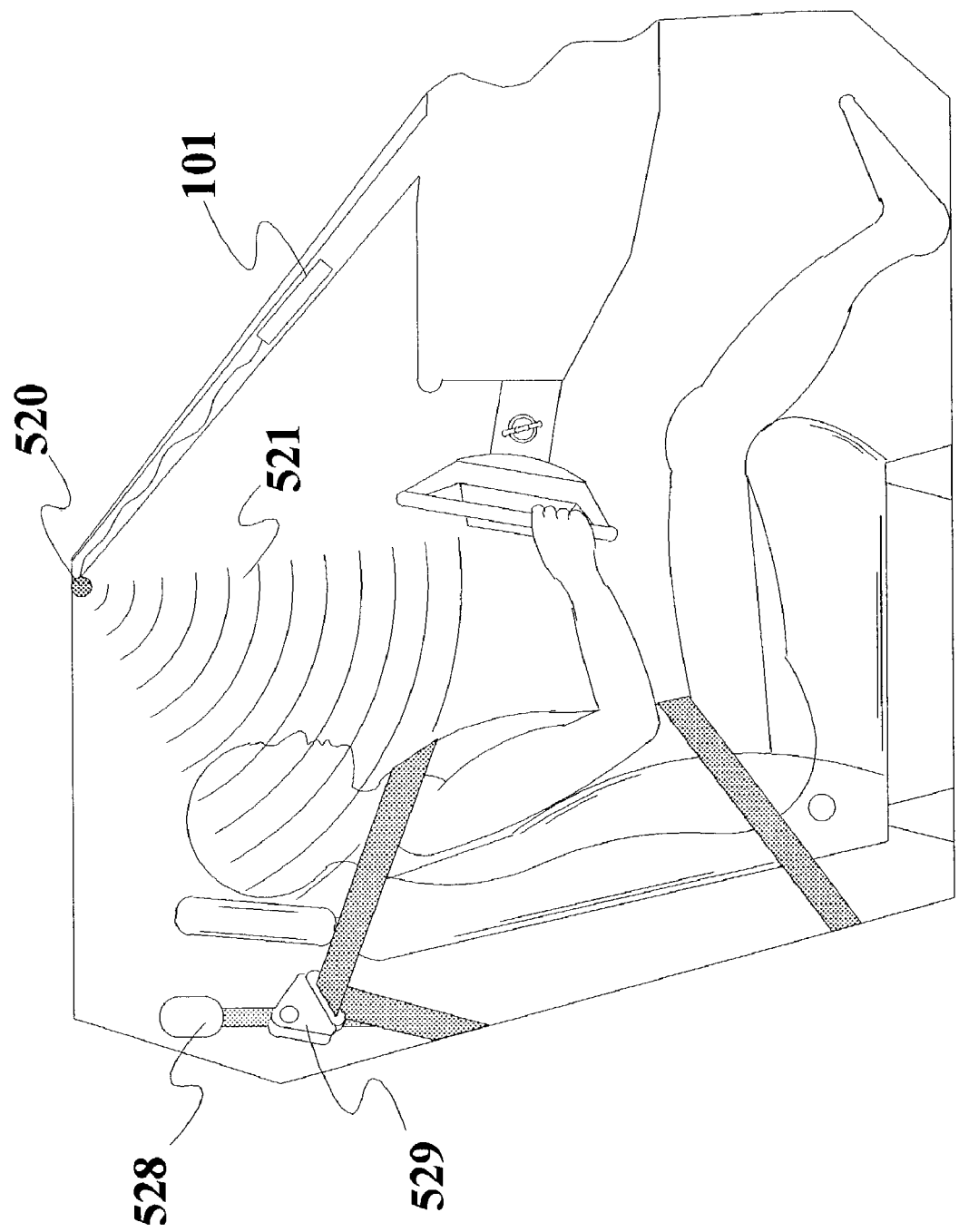
FIG. 13 is a side view with parts cutaway and removed of a vehicle showing the passenger compartment containing a driver, a shoulder height sensor and a seatbelt anchorage adjustment system.

To accomplish this for various sized occupants, the location of the occupant's shoulder must be known which can be accomplished by the vehicle interior monitoring system described herein. Such a system is illustrated in FIG. 13 that is a side view of a seatbelt anchorage adjustment system. In this system, a transmitter and receiver (transducer or transceiver) 520 is positioned in a convenient location, such as the headliner, located above and to the outside of the occupant's shoulder. A narrow beam 521 of energy can be transmitted from transducer 520 in a manner such that it irradiates or illuminates the occupant's shoulder and headrest. An appropriate pattern recognition system as described above is then used to determine the location and position of the occupant's shoulder. This information is fed to the seatbelt anchorage height adjustment system 528, shown schematically, which moves the attachment point 529 to the optimum vertical location.

10. Resonators

Acoustic or electromagnetic resonators are devices that resonate at a preset frequency when excited at that frequency. If such a device, which has been tuned to 40 kHz for example, or some other appropriate frequency, is subjected to radiation at 40 kHz it will return a signal that can be stronger than the reflected radiation. If such a device is placed at a particular point in the passenger compartment of a vehicle, the returned signal can be easily identified as a high magnitude narrow signal at a particular point in time that is proportional to the distance from the resonator to the receiver. Since this device can be easily identified, it provides a particularly effective method of determining the distance to a particular point in the vehicle passenger compartment (i.e., the distance between the location of the resonator and the detector). If several such resonators are used they can be tuned to slightly different frequencies and therefore separated and identified by the circuitry. Using such resonators, the positions of various objects in the vehicle can be determined.

Figure 14:
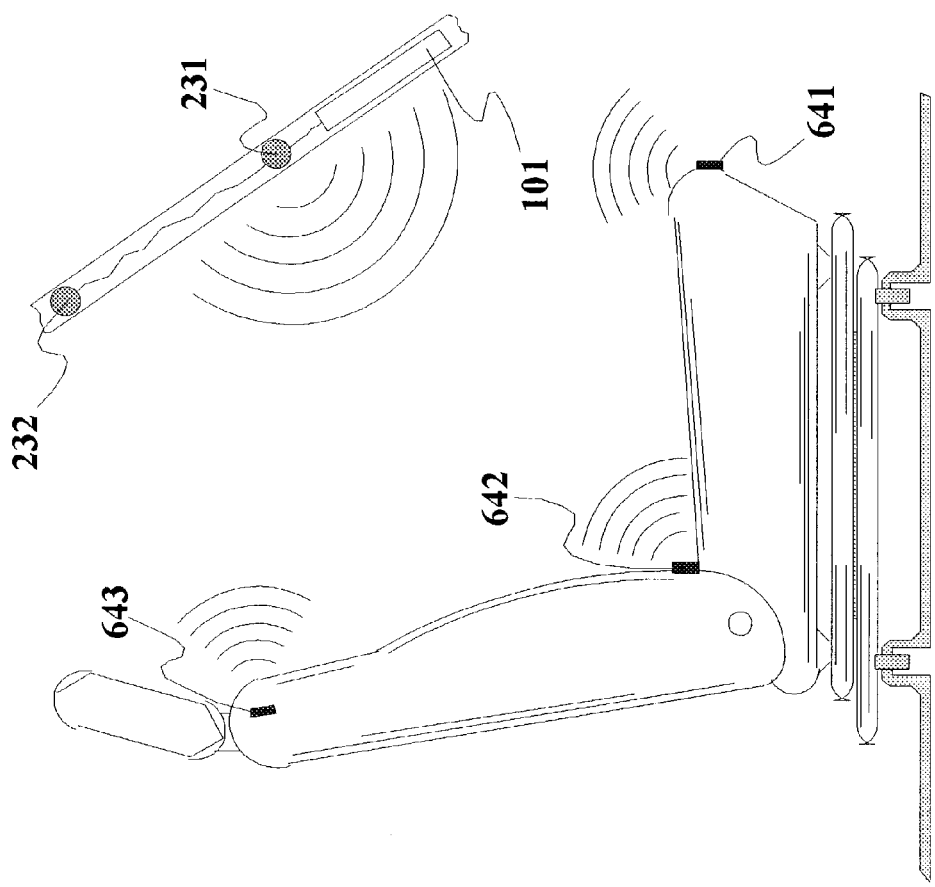
FIG. 14 is a side view with parts cutaway and removed of a seat in the passenger compartment of a vehicle showing the use of resonators or reflectors to determine the position of the seat.

In FIG. 14, for example, three such resonators are placed on the vehicle seat and used to determine the location of the front and back of the seat and the top of the seat back. In this case, transducers 231 and 232, mounted in the A-pillar 662, are used in conjunction with resonators 641, 642 and 643 to determine the position of the seat. Transducers 231, 232 constitute both transmitter means for transmitting energy signals at the excitation frequencies of the resonators 641, 642, 643 and detector means for detecting the return energy signals from the excited resonators. Processor 101 is coupled to the transducers 231, 232 to analyze the energy signals received by the detectors and provide information about the object with which the resonators are associated, i.e., the position of the seat in this embodiment. This information is then fed to the seat memory and adjustment system, not shown, eliminating the currently used sensors that are placed typically beneath the seat adjacent the seat adjustment motors.

In the conventional system, the seat sensors must be wired into the seat adjustment system and are prone to being damaged. By using the vehicle interior monitoring system alone with inexpensive passive resonators, the conventional seat sensors can be eliminated resulting in a cost saving to the vehicle manufacturer. An efficient reflector, such as a parabolic shaped reflector, or in some cases a corner cube reflector (which can be a multiple cube pattern array), can be used in a similar manner as the resonator. Similarly, a surface acoustic wave (SAW) device, RFID, variable resistor, inductor or capacitor device and radio frequency radiation can be used as a resonator or a delay line returning a signal to the interrogator permitting the presence and location of an object to be obtained as described in detail in U.S. patent application Ser. No. 10/079,065 which is incorporated herein in its entirety by reference.

Resonators or reflectors, of the type described above can be used for making a variety of position measurements in the vehicle. They can be placed on an object such as a child seat (see FIG. 2) to permit the direct detection of its presence and, in some cases, its orientation. These resonators are made to resonate at a particular frequency. If the number of resonators increases beyond a reasonable number, dual frequency resonators can be used. A pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators that resonate at different frequencies requires that they be irradiated by radiation containing those frequencies. This an be done with a chirp circuit.

An alternate approach is to make use of secondary emission where the frequency emitted form the device is at a different frequency that the interrogator. Phosphors, for example, convert ultraviolet to visible and devices exist that convert electromagnetic waves to ultrasonic waves. Other devices can return a frequency that is a sub-harmonic of the interrogation frequency. Additionally, an RFID tag can use the incident RF energy to charge up a capacitor and then radiate energy at a different frequency.

Figure 15:
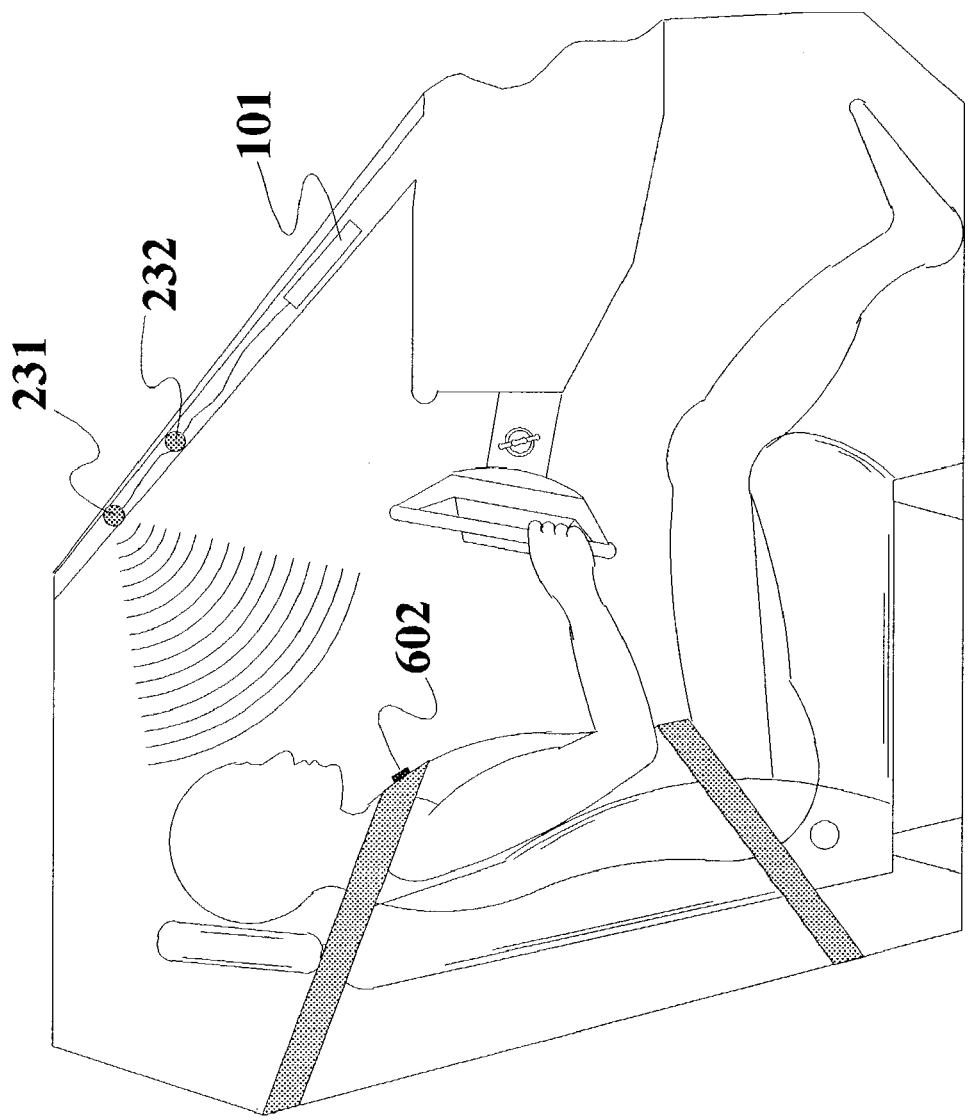
FIG. 15 is a side view with parts cutaway and removed of the passenger compartment of a vehicle showing the use of resonators or reflectors to determine the position of the driver seatbelt.

Another application for a resonator of the type described is to determine the location of the seatbelt and therefore determine whether it is in use. If it is known that the occupants are wearing seatbelts, the airbag deployment parameters can be controlled or adjusted based on the knowledge of seatbelt use, e.g., the deployment threshold can be increased since the airbag is not needed in low velocity accidents if the occupants are already restrained by seatbelts. Deployment of other occupant restraint devices could also be effected based on the knowledge of seatbelt use. This will reduce the number of deployments for cases where the airbag provides little or no improvement in safety over the seatbelt. FIG. 15, for example, shows the placement of a resonator 602 on the front surface of the seatbelt where it can be sensed by the transducers 231 and 232.

Such a system can also be used to positively identify or confirm the presence of a rear facing child seat in the vehicle, if the child seat is equipped with a resonator. In this case, a resonator 603 is placed on the forwardmost portion of the child seat, or in some other convenient position, as shown in FIG. 1A. As illustrated and discussed in U.S. patent application Ser. No. 10/079,065, there are various methods of obtaining distance from a resonator, reflector, RFID or SAW device which include measuring the time of flight, using phase measurements, correlation analysis and triangulation.

The resonator 603, or other type of signal generating device which generates a signal upon excitation, e.g., by a transmitted energy signal, can be used not only to determine the orientation of the child seat but also to determine the position of the child seat (in essentially the same manner as described above with respect to determining the position of the seat and the position of the seatbelt).

The determination of the presence of a child seat can be used to affect another system in the vehicle. Most importantly, deployment of an occupant restraint device can be controlled depending on whether a child seat is present. Control of the occupant restraint device may entail suppression of deployment of the device. If the occupant restraint device is an airbag, e.g., a frontal airbag or a side airbag, control of the airbag deployment may entail not only suppression of the deployment but also depowered deployment, adjustment of the orientation of the airbag, adjustment of the inflation rate or inflation time and/or adjustment of the deflation rate or time.

Other uses for such resonators include placing them on doors and windows in order to determine whether either is open or closed. In FIG. 16A, for example, such a resonator 604 is placed on the top of the window and is sensed by transducers 611 and 612. In this case, transducers 611 and 612 also monitor the space between the edge of the window glass and the top of the window opening. Many vehicles now have systems that permit the rapid opening of the window, called "express open", by a momentary push of a button. For example, when a vehicle approaches a tollbooth, the driver needs only touch the window control button and the window opens rapidly. Some automobile manufacturers do not wish to use such systems for closing the window, called "express close", because of the fear that the hand of the driver, or of a child leaning forward from the rear seat, or some other object, could get caught between the window and window frame. If the space between the edge of the window and the window frame were monitored with an interior monitoring system, this problem can be solved. The presence of the resonator or reflector 604 on the top of the window glass also gives a positive indication of where the top surface is and reflections from below that point can be ignored.

Various design variations of the window monitoring system are possible and the particular choice will depend on the requirements of the vehicle manufacturer and the characteristics of the vehicle. Two systems will be briefly described here.

Figure 16:
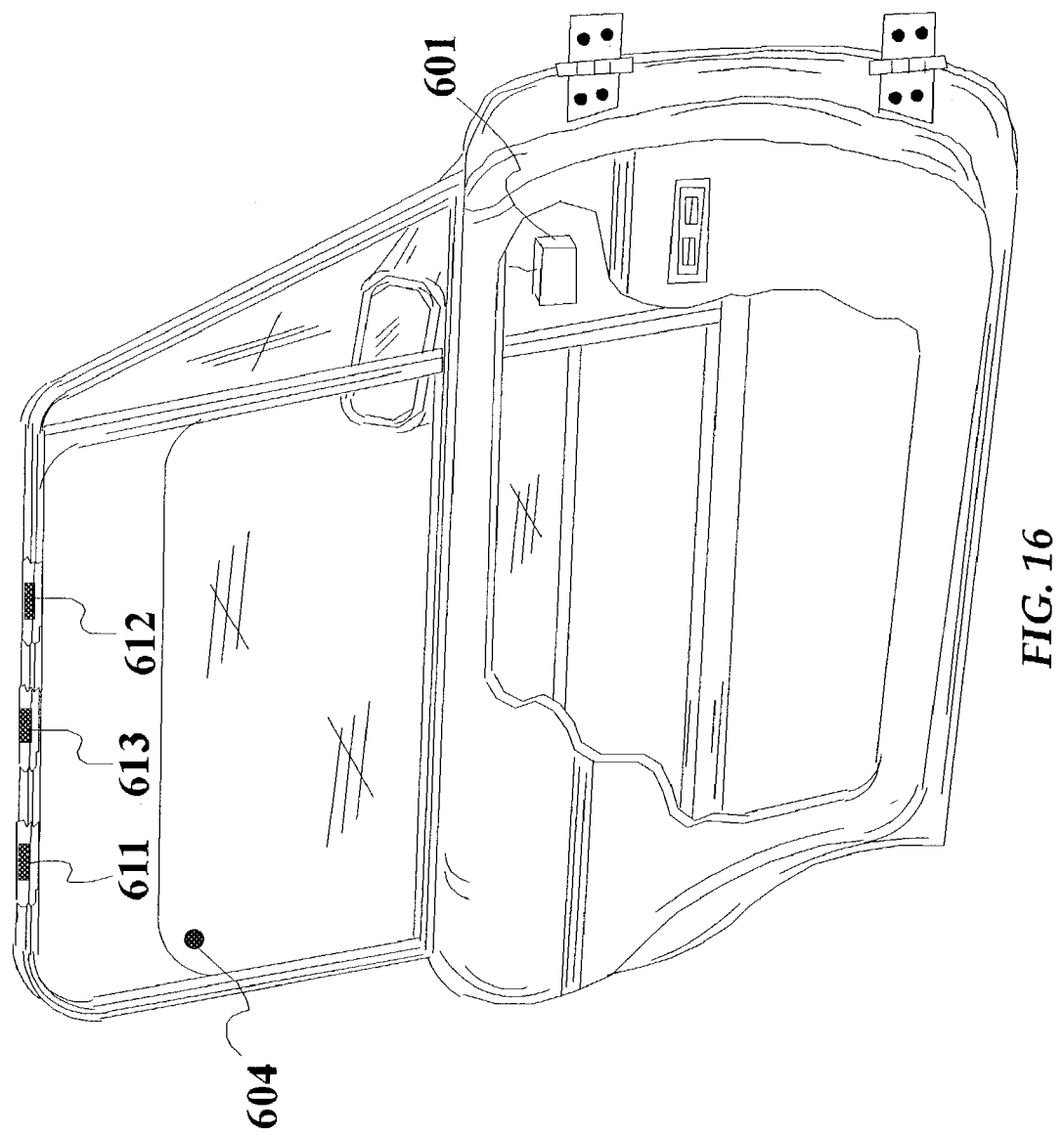
FIG. 16 is a side view with parts cutaway and removed of the passenger compartment of a vehicle showing the use of a resonator or reflector to determine the extent of opening of the driver window and of a system for determining the presence of an object, such as the hand of an occupant, in the window opening.
Figure 16A:
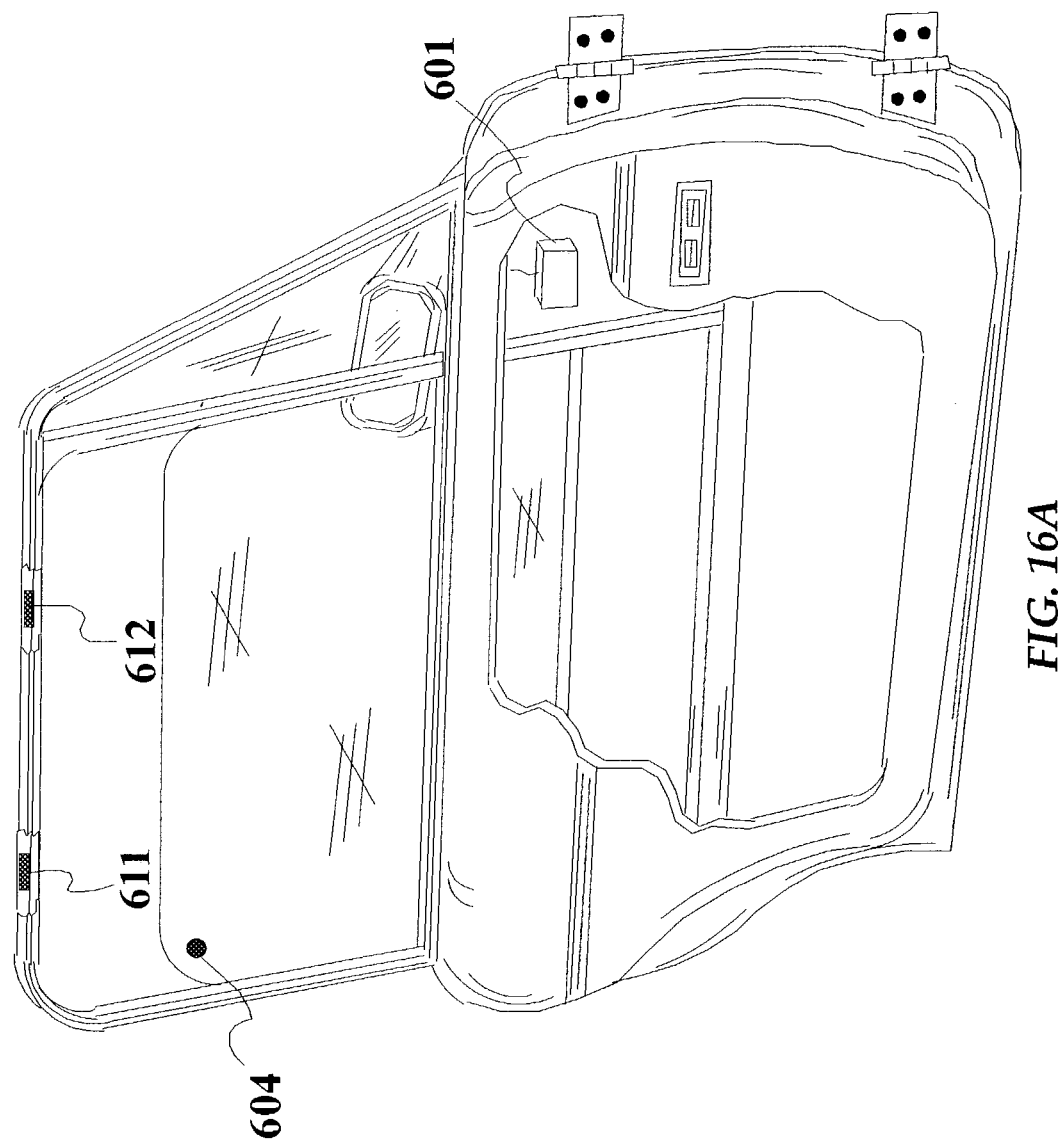
FIG. 16A is a side view with parts cutaway and removed of the passenger compartment of a vehicle showing the use of a resonator or reflector to determine the extent of opening of the driver window and of another system for determining the presence of an object, such as the hand of an occupant, in the window opening.

In the first example shown in FIG. 16, a single transmitter/receiver (transducer) 613 is used in place of and located centrally midway between the transducers 611 and 612 shown in FIG. 16A. A recording of the output of transducer 613 is made of the open window without an object in the space between the window edge and the top of the window frame. When in operation, the transducer 613 receives the return signal from the space it is monitoring and compares that signal with the stored signal referenced above. This is done by processor 601. If the difference between the test signal and the stored signal indicates that there is a reflecting object in the monitored space, the window is prevented from closing in the express close mode. If the window is part way up, a reflection will be received from the edge of the window glass that, in most cases, is easily identifiable from the reflection of a hand for example.

A simple algorithm based on the intensity, or timing, of the reflection in most cases is sufficient to determine that an object rather than the window edge is in the monitored space. In other cases, the algorithm is used to identify the window edge and ignore that reflection and all other reflections that are lower (i.e. later in time) than the window edge. In all cases, the system will default in not permitting the express close if there is any doubt. The operator can still close the window by holding the switch in the window closing position and the window will then close slowly as it now does in vehicles without the express close feature.

In the second system, two transducers 611 and 612 are used as shown in FIG. 16A and the processor 601 comprises a neural network. In this example the system is trained for all cases where the window is down and at intermediate locations. In operation, the transducers monitor the window space and feed the received signals to processor 601. As long as the signals are similar to one of the signals for which the network was trained, the express close system is enabled. As before, the default is to suppress the express close.

An alternate technology to the use of resonators is to use an active or passive radio frequency identification tag (RFID tag) based on either a RF charged electronic circuit or a powerless surface acoustic wave technology (SAW). Such a tag can be placed on an object such as a seat or child seat and when interrogated it will return a signal usually containing an identification number.

Figure 17:
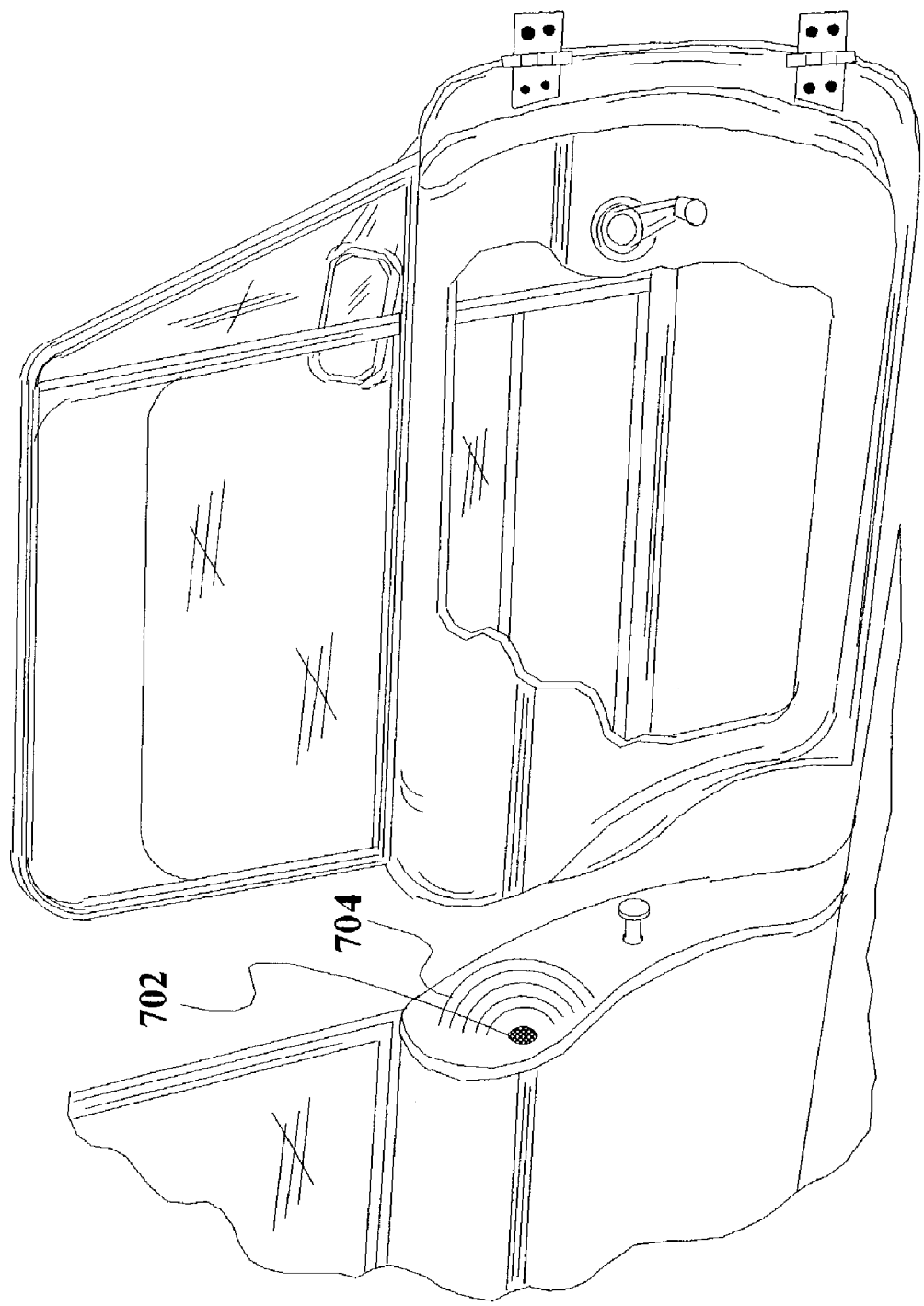
FIG. 17 is a side view with parts cutaway and removed of the passenger compartment of a vehicle showing the use of a resonator or reflector to determine the extent of opening position of the driver side door.

The use of a resonator, RFID or SAW tag, or reflector, to determine whether the vehicle door is properly shut is illustrated in FIG. 17. In this case, the resonator 702 is placed in the B-pillar in such a manner that it is shielded by the door, or by a cover or other inhibiting mechanism (not shown) engaged by the door, and blocked or prevented from resonating when the door is closed. Resonator 702 provides waves 704. If transducers such as 231 and 232 in FIG. 3 are used in this system, the closed-door condition would be determined by the absence of a return signal from the B-pillar 702 resonator. This system permits the substitution of an inexpensive resonator for a more expensive and less reliable electrical switch plus wires.

The use of a resonator has been described above. For those cases where an infrared laser system is used, an optical mirror or reflector would replace the mechanical resonator used with the acoustic system. In the acoustic system, the resonator can be any of a variety of tuned resonating systems including an acoustic cavity or a vibrating mechanical element. As discussed above, a properly designed antenna, corner reflector, or a SAW device fulfills this function for radio frequency waves.

For the purposes herein, the word resonator will frequently be used to include any device that returns a signal when excited by a signal sent by another device through the air. Thus, resonator would include a resonating antenna, a reflector, a surface acoustic wave (SAW) device, an RFID tag, an acoustic resonator, or any other device that performs substantially the same function.

11. Security and Recognition of an Individual

Figure 18:
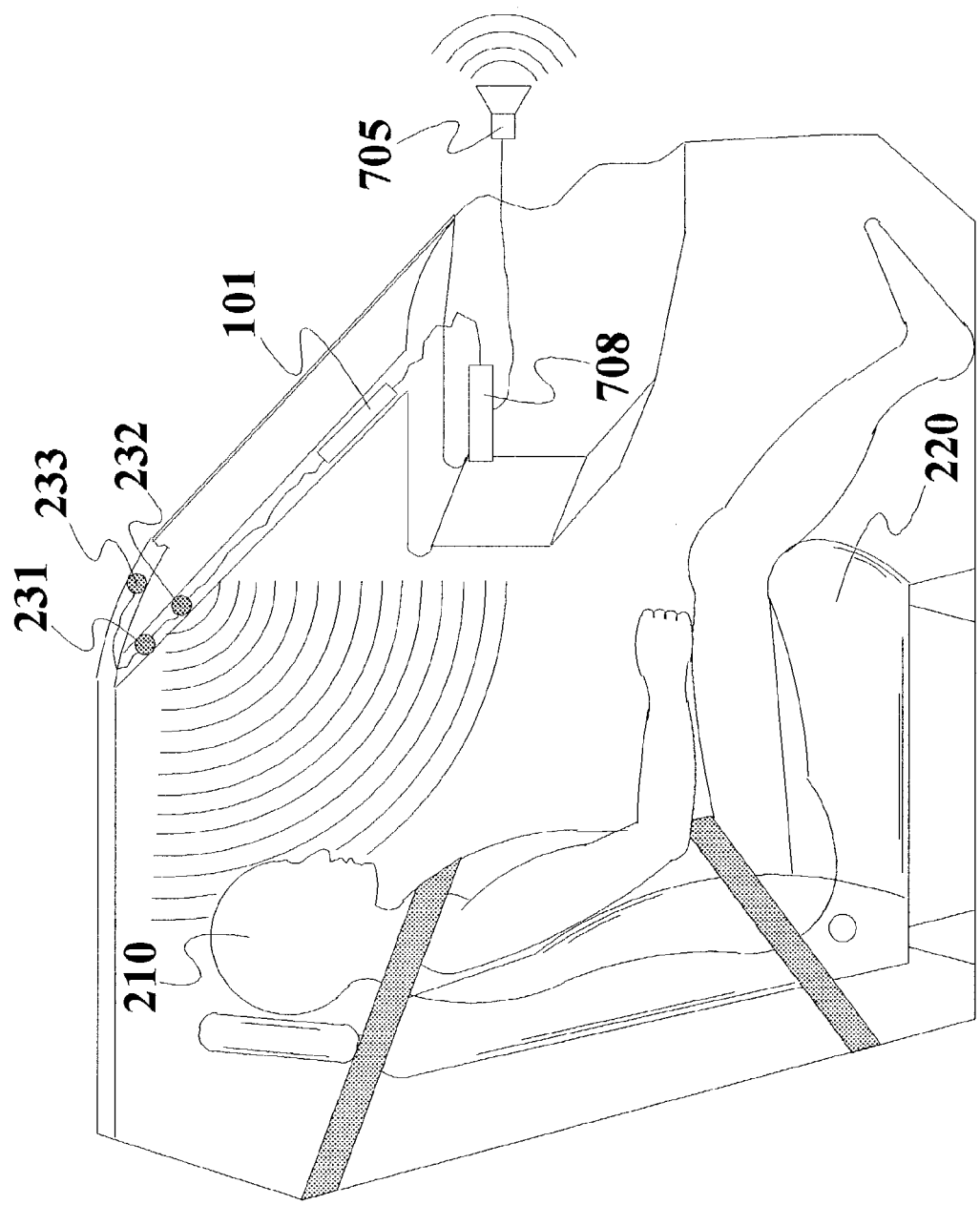
FIG. 18 is a side view with parts cutaway and removed showing schematically the interface between the vehicle interior monitoring system of this invention and the vehicle security system.

A neural network, or other pattern recognition system, can be trained to recognize certain people as permitted operators of a vehicle. In this case, if a non-recognized person attempts to operate the vehicle, the system can disable the vehicle and/or sound an alarm as illustrated in FIG. 18. In this figure the sensing transducers are shown as before as 231A, 232A and 233A, the alarm system schematically as 708 and the alarm as 705. Since it is unlikely that an unauthorized operator will resemble the authorized operator, the neural network system can be quite tolerant of differences in appearance of the operator. The system defaults to where a key must be used in the case that the system doesn't recognize the driver or the owner wishes to allow another person to operate the vehicle. The transducers 231A, 232A and 233A are sensitive to infrared radiation and the operator is irradiated with infrared waves from transducer 231A. This is necessary due to the small size of the features that need to be recognized for high accuracy of recognition.

An alternate system uses an infrared laser, which can be 231A in FIG. 18, to irradiate or illuminate the operator and a CCD or CMOS device, which can be represented as 232A in FIG. 18, to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case, a larger CCD element array containing 100,000 or more elements would in many cases be used instead of the 16 by 16 or 256 element CCD array used by Popesco and Vincent. In fact, the field of facial recognition has expanded greatly in the past few years and systems are available that can be used within a vehicle to recognize the operator based on facial features, the pattern of blood vessels in the iris, or other visual biometric features of the operator and particularly those related to the operator's head and particularly his or her face. Naturally, other biometric features can also be used alone or in combination including fingerprints, weight, voice print, hand print, etc.

The human mind has little problem recognizing faces even when they are partially occluded such as with a hat, sun glasses or a scarf, for example. With the increase in low cost computing power, it is now possible to train a rather large neural network, perhaps a modular neural network, to recognize most of those cases where a human mind will also be successful.

Figure 19:
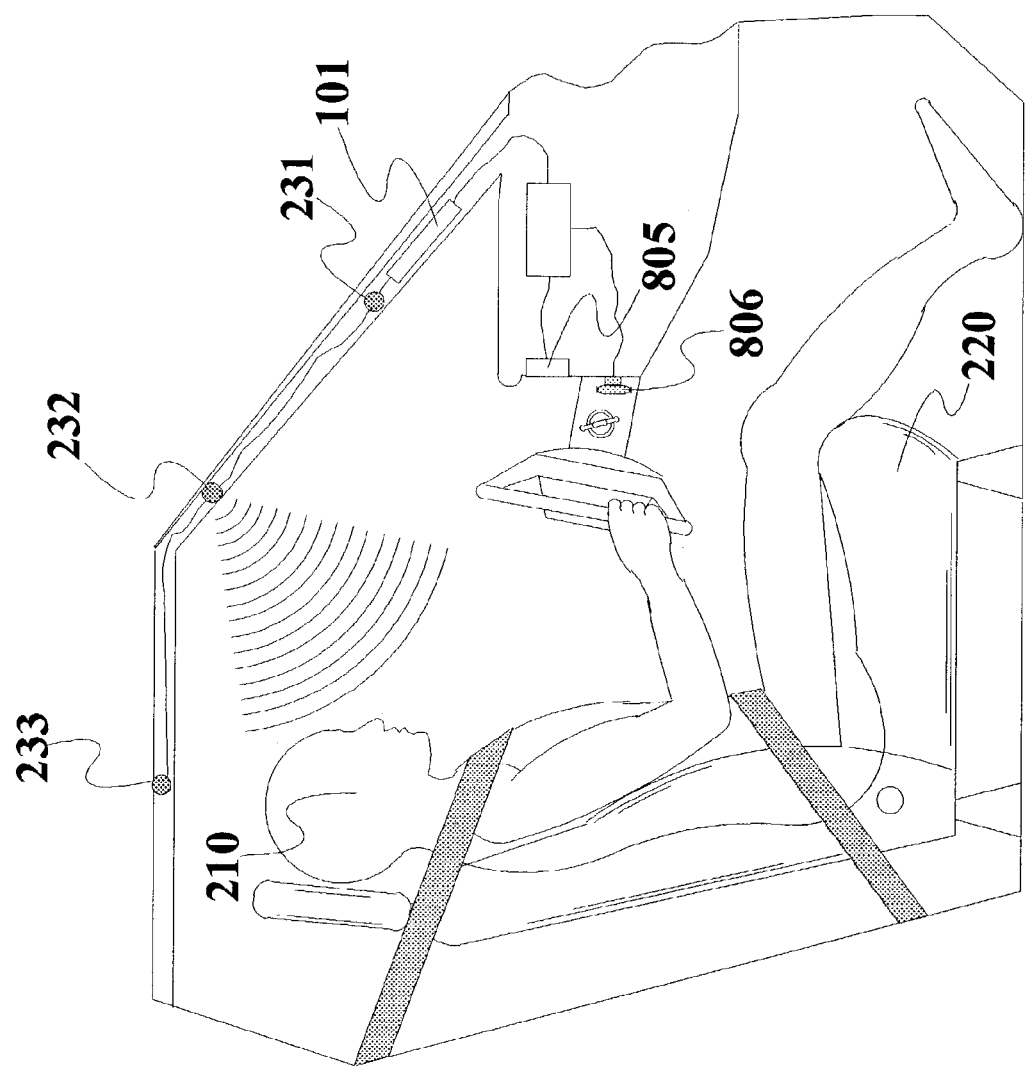
FIG. 19 is a side view with parts cutaway and removed showing schematically the interface between the vehicle interior monitoring system of this invention and an instrument panel mounted inattentiveness warning light or buzzer and reset button.

Once a vehicle interior monitoring system employing a sophisticated pattern recognition system, such as a neural network or modular neural network, is in place, it is possible to monitor the motions of the driver over time and determine if he is falling asleep or has otherwise become incapacitated. In such an event, the vehicle can be caused to respond in a number of different ways. One such system is illustrated in FIG. 19 and consists of a monitoring system having transducers 231, 232 and 233 plus microprocessor 101, such as shown in FIG. 7A, programmed to compare the motions of the driver over time and trained to recognize changes in behavior representative of becoming incapacitated. If the system determines that there is a reasonable probability that the driver has fallen asleep, for example, then it can turn on a warning light shown here as 805 or send a warning sound. If the driver fails to respond to the warning by pushing a button 806, for example, then the horn and lights can be operated in a manner to warn other vehicles and the vehicle brought to a stop. One novel approach, not shown, would be to use the horn as the button 806. For a momentary depression of the horn, for this case, the horn would not sound. Naturally other responses can also be programmed.

An even more sophisticated system of monitoring the behavior of the driver is to track his eye motions using such techniques as are described in: Freidman et al., U.S. Pat. No. 4,648,052 "Eye Tracker Communication System"; Heyner et al., U.S. Pat. No. 4,720,189 "Eye Position Sensor"; Hutchinson, U.S. Pat. No. 4,836,670 "Eye Movement Detector"; and Hutchinson, U.S. Pat. No. 4,950,069 "Eye Movement Detector With Improved Calibration and Speed", all of which are incorporated herein by reference in their entirety to the extent the disclosure of these references is necessary. The detection of the impaired driver in particular can be best determined by these techniques. Also, in a similar manner as described in these patents, the motion of the driver's eyes can be used to control various systems in the vehicle permitting hands off control of the entertainment system, heating and air conditioning system or all of the other systems described above. Although some of these systems have been described in the afore-mentioned patents, none have made use of neural networks for interpreting the eye movements.

In most of the applications described above, single frequency energy was used to irradiate various occupying items of the passenger compartment. This was for illustrative purposes only and this invention is not limited to single frequency irradiation. In many applications, it is useful to use several discrete frequencies or a band of frequencies. In this manner, considerably greater information is received from the reflected irradiation permitting greater discrimination between different classes of objects. In general each object will have a different reflectivity, absorbtivity and transmissivity at each frequency. Also, the different resonators placed at different positions in the passenger compartment can now be tuned to different frequencies making it easier to isolate one resonator from another.

12. Near Field Antenna Sensor

Figure 20:
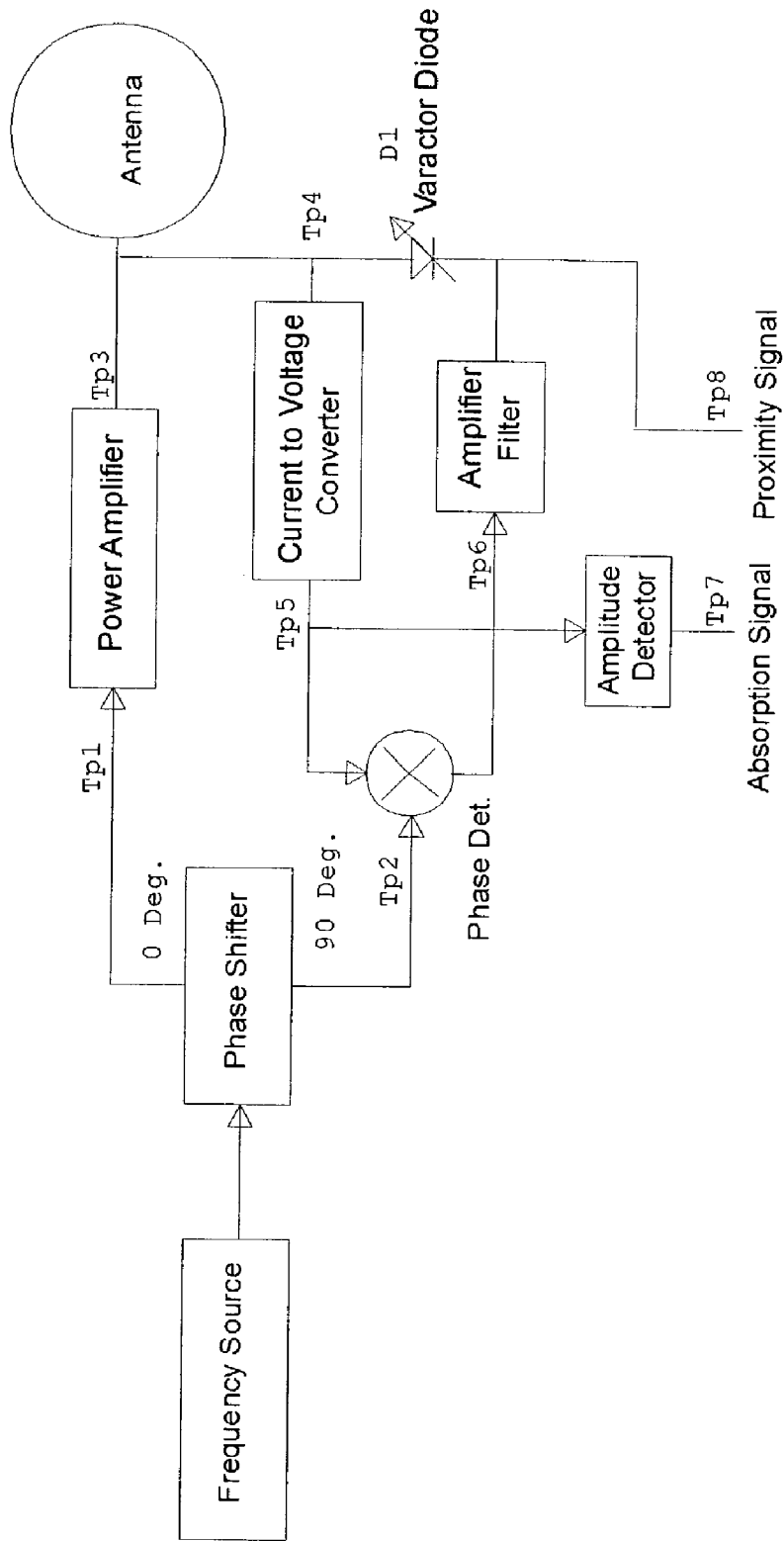
FIG. 20 is a block diagram of an antenna-based near field object discriminator.

A block diagram of an antenna based near field object detector is illustrated in FIG. 20. The circuit variables are defined as follows:

F=Frequency of operation (Hz).

$\omega = 2*\pi*F$ radians/second $\alpha$= Phase angle between antenna voltage and antenna current.

A, k1, k2, k3, k4 are scale factors, determined by system design.

Tp1–8 are points on FIG. 20.

Tp1=k1*Sin($\omega$t)

Tp2=k1*Cos($\omega$t) Reference voltage to phase detector

Tp3=k2*Sin($\omega$t) drive voltage to Antenna

Tp4=k3*Cos($\omega$t+$\delta$) Antenna current

Tp5=k4*Cos($\omega$t+$\delta$) Voltage representing Antenna current

Tp6=0.5□t)Sin($\delta$ Output of phase detector

Tp7=Absorption signal output

Tp8=Proximity signal output

In a tuned circuit, the voltage and the current are 90 degrees out of phase with each other at the resonant frequency. The frequency source 300 supplies a signal to the phase shifter 302. The phase shifter 302 outputs two signals that are out of phase by 90 degrees at frequency F. The drive to the antenna 304 is the signal Tp3. The antenna 304 can be of any suitable type such as dipole, patch, yagi etc. In cases where the signal Tp1 from the phase shifter 302 has sufficient power, the power amplifier 306 may be eliminated. The antenna current is at Tp4, which is converted into a voltage since the phase detector 308 requires a voltage drive. The output of the phase detector 308 is Tp6, which is filtered via an amplifier filter 312 and used to drive the varactor tuning diode D1 (314). Multiple diodes may be used in place of diode D1. The phase detector 308, amplifier filter 312, varactor diode 314 and current to voltage converter 316 form a closed loop (tuning loop) servo that keeps the antenna voltage and current in a 90-degree relationship at frequency F. The tuning loop maintains a 90-degree phase relationship between the antenna voltage and the antenna current. When an object such as a human comes near the antenna 304 and attempts to detune it, the phase detector 308 senses the phase change and adds or subtracts capacity by changing voltage to the varactor diode D1 thereby maintaining resonance at frequency F.

The voltage Tp8 is an indication of the capacity of a nearby object. An object that is near the loop and absorbs energy from it will change the amplitude of the signal at Tp5, which is detected and outputted to Tp7. The two signals Tp7 and Tp8 are used to determine the nature of the object near the antenna.

An object such as a human or animal with a fairly high electrical permittivity or dielectric constant and a relatively high loss dielectric property (high loss tangent) absorbs a lot of energy. This effect varies with the frequency used for the detection. If a human, who has a high loss tangent is present in the detection field then the dielectric absorption causes the value of the capacitance of the object to change with frequency. For a human with high dielectric losses (high loss tangent), the decay with frequency will be more pronounced than objects that do not present this high loss tangency. Exploiting this phenomenon makes it possible to detect the presence of an adult, child, baby, pet or other animal in the detection field.

13. Summary

An older method of antenna tuning used the antenna current and the voltage across the antenna to supply the inputs to a phase detector. In a 25 to 50 mw transmitter with a 50 ohm impedance, the current is small, it is therefore preferable to use the method described herein.

14. Additional Occupant Sensors

Figure 22:
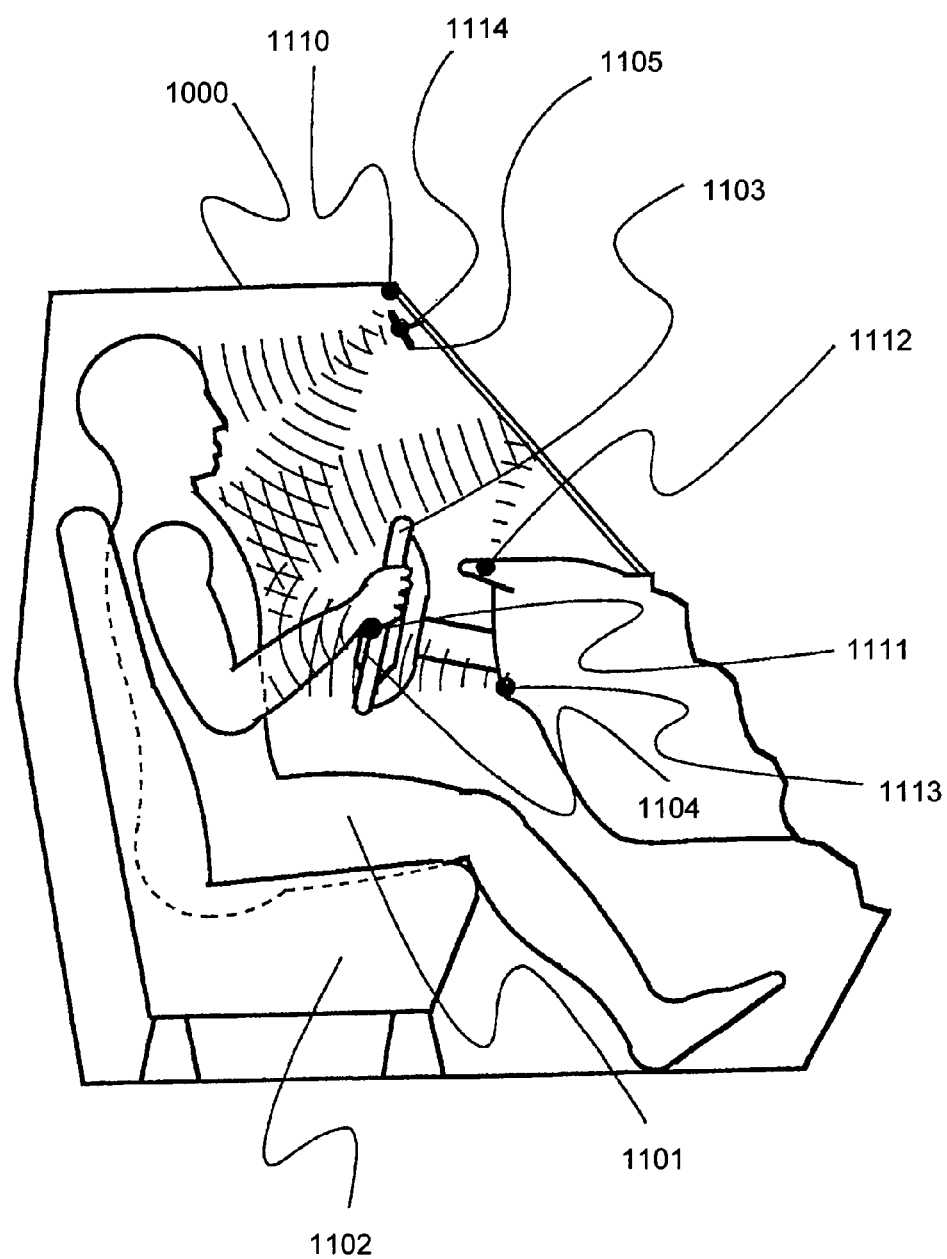
FIG. 22 is a side view, with certain portions removed or cut away, of a portion of the passenger compartment of a vehicle showing several preferred mounting locations of occupant position sensors for sensing the position of the vehicle driver.

Referring now to FIGS. 22–29, a section of the passenger compartment of an automobile is shown generally as 1000 in FIG. 22. A driver of a vehicle 1101 sits on a seat 1102 behind a steering wheel 1103 which contains an airbag assembly 1104. Five transmitter and/or receiver assemblies 1110, 1111, 1112, 1113 and 1114 are positioned at various places in the passenger compartment to determine the location of the head, chest and torso of the driver relative to the airbag. Usually, in any given implementation, only one or two of the transmitters and receivers would be used depending on their mounting locations as described below.

FIG. 22 illustrates several of the possible locations of such devices. For example, transmitter and receiver 1110 emits ultrasonic acoustical waves which bounce off the chest of the driver and return. Periodically a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and thereby determines the distance from the transmitter/receiver to the driver based on the velocity of sound. This information is then sent to the crash sensor and diagnostic circuitry which determines if the driver is close enough to the airbag that a deployment might, by itself, cause injury to the driver. In such a case the circuit disables the airbag system and thereby prevents its deployment.

In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises to 95% for a more distant occupant. Although a driver system has been illustrated, the passenger system would be identical.

In another implementation, the sensor algorithm may determine the rate that gas is generated to affect the rate that the airbag is inflated. In all of these cases the position of the occupant is used to affect the deployment of the airbag either as to whether or not it should be deployed at all, the time of deployment or as to the rate of inflation.

The ultrasonic transmitter/receiver 1110 is similar to that used on modern auto-focus cameras such as manufactured by the Polaroid Corporation. Other camera auto-focusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 1114 is located proximate or attached to the rear view mirror 1105, as shown in FIG. 22. Alternately, the infrared could be sent by the device 1114 and received by a receiver elsewhere. Since any of the devices shown in FIGS. 22 and 24 could be either transmitters or receivers or both, for simplicity, only the transmitted and not the reflected wave fronts are illustrated.

In the above-described system, a lens within receptor 1114 captures the reflected infrared light from the head or chest of the driver and displays it onto a charge coupled device (CCD), CMOS or equivalent array. One type of CCD is that used in television cameras to convert an image into an electrical signal. For the discussion of FIGS. 22–29 at least, a CCD will be used to include all devices which are capable of converting light frequencies, including infrared, into electrical signals. The CCD is scanned and the focal point of the lens is altered, under control of an appropriate circuit, until the sharpest image of the driver's head or chest results and the distance is then known from the focusing circuitry.

The precision of this measurement is enhanced if two receptors are used which can either project images onto a single CCD or on separate CCD's. In the first case, one of the lenses could be moved to bring the two images into coincidence while in the other case the displacement of the images needed for coincidence would be determined mathematically. Naturally, other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag.

In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An optical infrared transmitter and receiver assembly is shown generally at 1112 in FIG. 22 and is mounted onto the instrument panel facing the windshield. Although not shown in this view, reference 1112 consists of three devices, one transmitter and two receivers, one on each side of the transmitter. In this case the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers.

In its most elementary sense, this system can be used to measure the distance of the driver to the airbag module. In more sophisticated applications, the position of the driver, and particularly of the drivers head, can be monitored over time and any behavior, such as a drooping head, indicative of the driver falling asleep or of being incapacitated by drugs, alcohol or illness can be detected and appropriate action taken. Other forms of radiation including visual light, radar and microwaves as well as high frequency ultra sound could also be used by those skilled in the art.

Particular mention should be made of the use of radar since inexpensive antennas are now readily available. A scanning radar beam is used in this implementation and the reflected signal is received by a phase array antenna to generate an image of the occupant for input into the appropriate pattern detection circuitry. The word circuitry as used herein includes, in addition to normal electronic circuits, a microprocessor and appropriate software.

Electromagnetic or ultrasonic energy can be transmitted in three modes in determining the position of an occupant. In most of the cases disclosed above, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. This can be partially overcome through the use of the second mode which uses a narrow beam. In this case, several narrow beams are used. These beams are aimed in different directions toward the occupant from a position sufficiently away from the occupant that interference is unlikely. A single receptor could be used providing the beams are either cycled on at different times or are of different frequencies. Another approach is to use a single beam emanating from a location which has an unimpeded view of the occupant such as the windshield header. If two spaced apart CCD array receivers are used, the angle of the reflected beam can be determined and the location of the occupant can be calculated, The third mode is to use a single beam in a manner so that it scans back and forth or up and down, or in some other pattern, across the occupant. In this manner, an image of the occupant can be obtained using a single receptor and pattern recognition software can be used to locate the head or chest of the occupant. The beam approach is most applicable to electromagnetic energy but high frequency ultra sound can also be formed into a narrow beam.

The windshield header as used herein includes the space above the front windshield including the first few inches of the roof.

A similar effect to modifying the wave transmission mode can also be obtained by varying the characteristics of the receptors. Through appropriate lenses or reflectors, receptors can be made to be most sensitive to radiation emitted from a particular direction. In this manner a single broad beam transmitter can be used coupled with an array of focused receivers to obtain a rough image of the occupant.

Each of these methods of transmission or reception could be used, for example, at any of the preferred mounting locations shown in FIG. 22.

Another preferred location of a transmitter/receiver for use with airbags is shown at 1111 in FIG. 22. In this case, the device is attached to the steering wheel and gives an accurate determination of the distance of the driver's chest from the airbag module. This implementation would generally be used with another device such as 1110 at another location.

Alternate mountings for the transmitter/receiver include various locations on the instrument panel on either side of the steering column such as 1113 in FIG. 22. Also, although some of the devices herein illustrated assume that for the ultrasonic system the same device would be used for both transmitting and receiving waves, there are advantages in separating these functions. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously providing the transmitted signal is modulated in such a manner that the received signal can be compared with the transmitted signal to determine the time it took for the waves to reach and reflect off of the occupant.

Many methods exist for this modulation including varying the frequency or amplitude of the waves or by pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant, may be several milliseconds, information as to the position of the occupant is received continuously which permits an accurate, although delayed, determination of the occupant's velocity from successive position measurements. Conventional ultrasonic distance measuring devices must wait for the signal to travel to the occupant and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant located one foot from the transmitter can only be obtained every 2 milliseconds which corresponds to a frequency of 500 cycles per second.

This slow frequency that data can be collected seriously degrades the accuracy of the velocity calculation. The reflection of ultrasonic waves from the clothes of an occupant, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler effect where the frequency of the reflected waves differs from the transmitted waves by an amount which is proportional to the occupant's velocity. In a preferred embodiment, a single ultrasonic transmitter and a separate receiver are used to measure the position of the occupant, by the travel time of a known signal, and the velocity, by the frequency shift of that signal. Although the Doppler effect has been used to determine whether an occupant has fallen asleep, it has not heretofore been used in conjunction with a position measuring device to determine whether an occupant is likely to become out of position and thus in danger of being injured by a deploying airbag. This combination is particularly advantageous since both measurements can be accurately and efficiently determined using a single transmitter and receiver pair resulting in a low cost system.

Another preferred embodiment makes use of radio waves and a voltage-controlled oscillator (VCO). In this embodiment, the frequency of the oscillator is controlled through the use of a phase detector which adjusts the oscillator frequency so that exactly one half wave occupies the distance from the transmitter to the receiver via reflection off of the occupant. The adjusted frequency is thus inversely proportional to the distance from the transmitter to the occupant. Alternately, an FM phase discriminator can be used as known to those skilled in the art. These systems could be used in any of the locations illustrated in FIG. 22.

A passive infrared system could be used to determine the position of an occupant relative to an airbag. Passive infrared measures the infrared radiation emitted by the occupant and compares it to the background. As such, unless it is coupled with a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position.

When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 22 as well as others not illustrated.

Passive infrared could also be used effectively in conjunction with a pattern recognition system. In this case, the passive infrared radiation emitted from an occupant can be focused onto a CCD array and analyzed with appropriate pattern recognition circuitry, or software, to determine the position of the occupant. Such a system could be mounted at any of the preferred mounting locations shown in FIG. 22 as well as others not illustrated.

Figure 23:
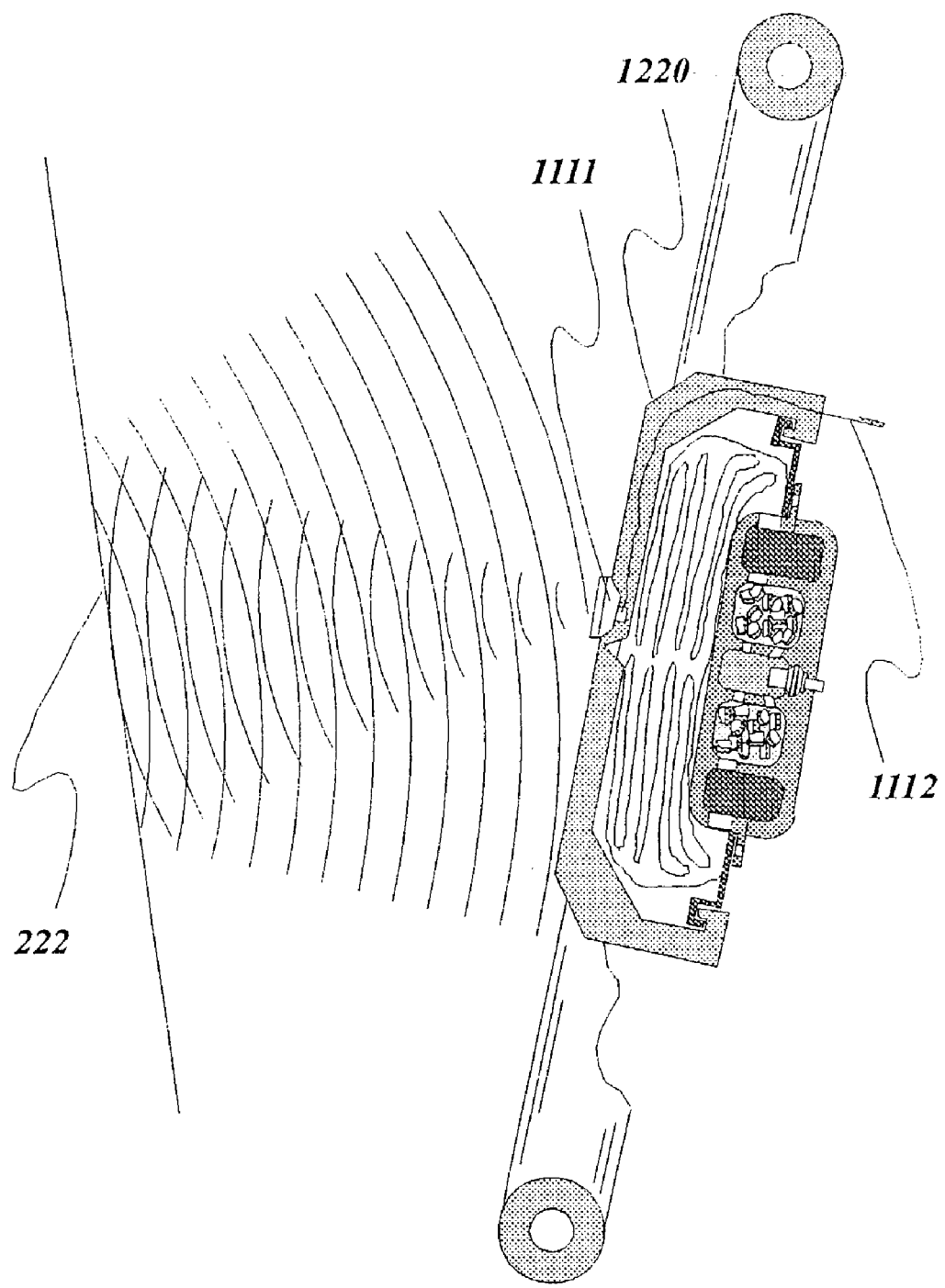
FIG. 23 is a cross section view of a steering wheel and airbag module assembly showing a preferred mounting location of an ultrasonic wave generator and receiver.

A transmitter/receiver 1215 shown mounted on the cover 1220 of the airbag module 1216 is shown in FIG. 23. The transmitter/receiver 1215 is attached to various electronic circuitry, not shown, by means of wire cable 1212. When an airbag 1218 deploys, the cover 1220 begins moving toward the driver. If the driver is in close proximity to this cover during the early stages of deployment, the driver can be seriously injured or even killed. It is important, therefore, to sense the proximity of the driver to the cover and if he or she gets too close, to disable deployment of the airbag 1218. An accurate method of obtaining this information would be to place the distance-measuring device onto the airbag cover 1220 as shown in FIG. 23. Appropriate electronic circuitry can be used to not only determine the actual distance of the driver from the cover but also his velocity as discussed above. In this manner, a determination can be made as to where the driver is likely to be at the time of deployment of the airbag 1218. This information can be used most importantly to prevent deployment but also to modify the rate of airbag deployment. In FIG. 22, for one implementation, ultrasonic waves are transmitted by a transmitter/receiver 1215 toward the chest 1222 of the driver. The reflected waves are then received by the same transmitter/receiver 1215.

Figure 24:
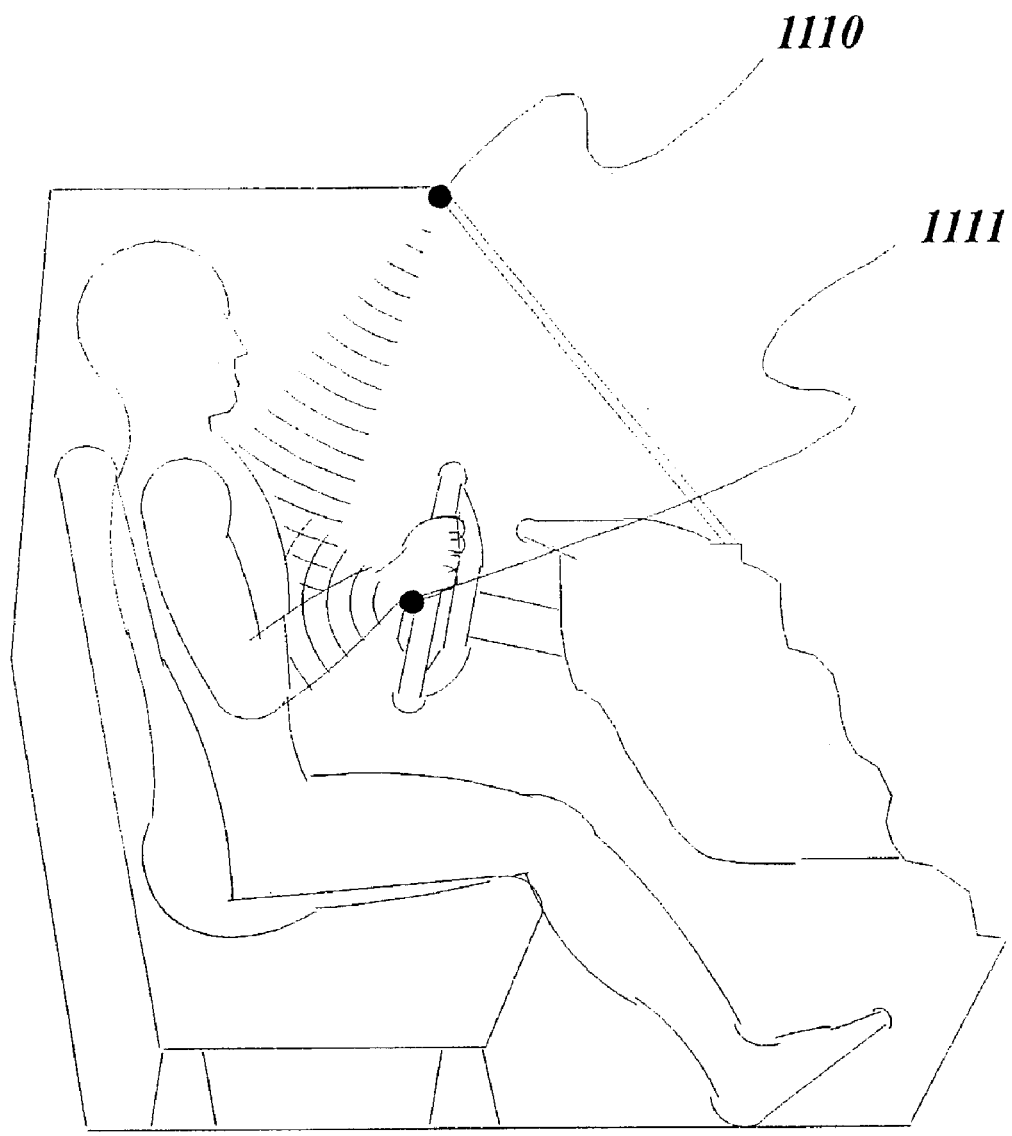
FIG. 24 is a side view, with certain portions removed or cut away, of a portion of the passenger compartment of a vehicle showing preferred mounting locations of the occupant position sensor employing multiple transmitters and receivers.

One problem of the system using a sensor 1111 in FIG. 22 or sensor 1215 as shown in FIG. 23 is that a driver may have inadvertently placed his hand over the transmitter/receiver 1111 or 1215, thus defeating the operation of the device. A second confirming transmitter/receiver 1110 is therefore placed at some other convenient position such as on the roof or headliner of the passenger compartment as shown in FIG. 24. This transmitter/receiver operates in a manner similar to 1111 and 1215.

Figure 25:
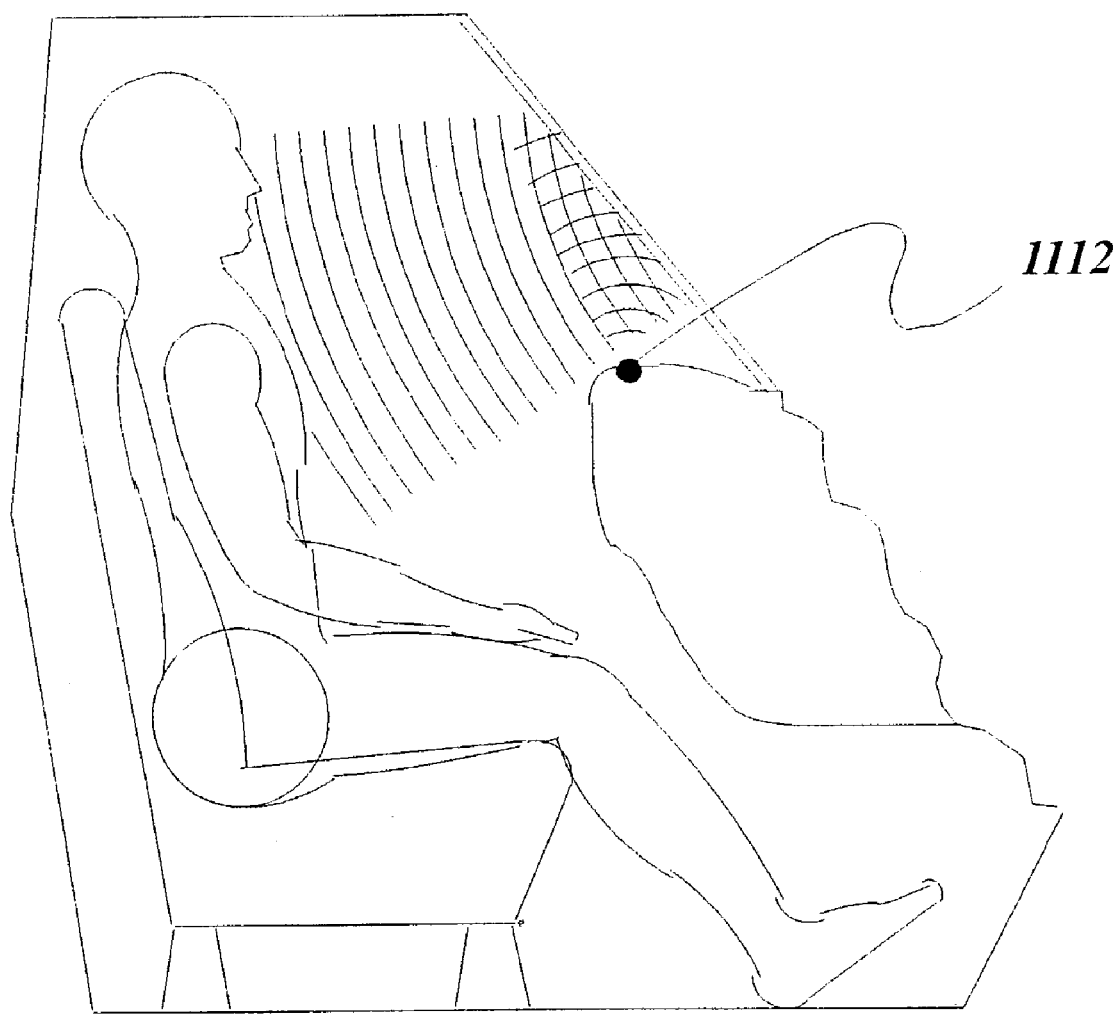
FIG. 25 is a side view, with certain portions removed or cut away, of a portion of the passenger compartment of a vehicle showing an occupant position sensor used in combination with a reflective windshield for sensing the position of the vehicle passenger.
Figure 26:
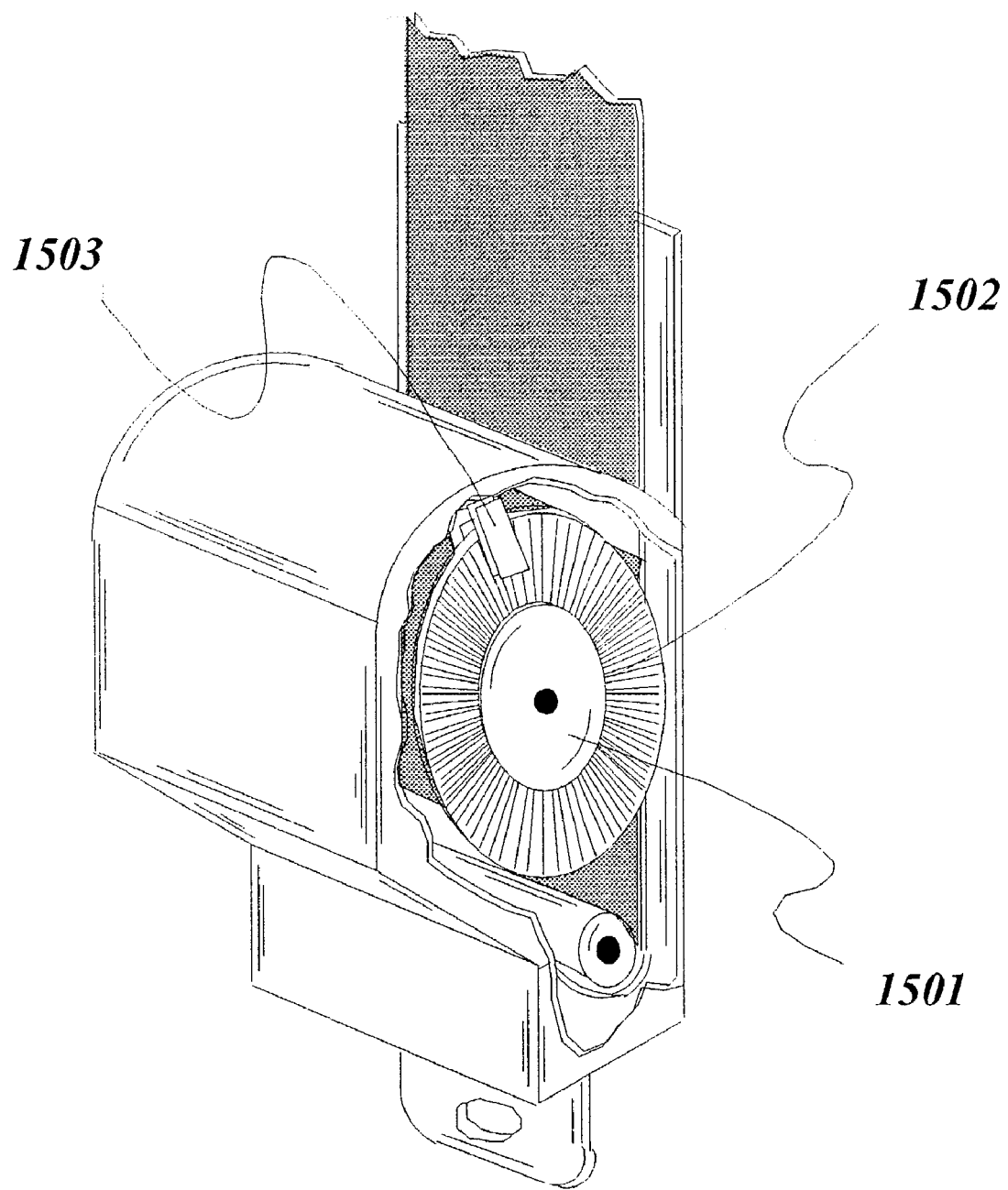
FIG. 26 is a partial cutaway view of a seatbelt retractor with a spool out sensor utilizing a shaft encoder.

A more complicated and sophisticated system is shown conceptually in FIG. 25 where transmitter/receiver assembly 1112 is illustrated. In this case, as described briefly above, an infrared transmitter and a pair of optical receivers are used to capture the reflection of the passenger. When this system is used to monitor the driver as shown in FIG. 25, with appropriate circuitry and a microprocessor, the behavior of the driver can be monitored. Using this system, not only can the position and velocity of the driver be determined and used in conjunction with an airbag system, but it is also possible to determine whether the driver is falling asleep or exhibiting other potentially dangerous behavior by comparing portions of his/her image over time. In this case the speed of the vehicle can be reduced or the vehicle even stopped if this action is considered appropriate. This implementation has the highest probability of an unimpeded view of the driver since he/she must have a clear view through the windshield in order to operate the motor vehicle.

Information is provided as to the location of the driver, or other vehicle occupant, relative to the airbag, to appropriate circuitry which will process this information and make a decision as to whether to prevent deployment of the airbag in a situation where it would otherwise be deployed, or otherwise affect the time of deployment. One method of determining the position of the driver as discussed above is to actually measure his or her position either using microwaves, optics or acoustics. An alternate approach, which is preferably used to confirm the measurements made by the systems described above, is to use information about the position of the seat and the seatbelt spool out to determine the likely location of the driver relative to the airbag. To accomplish this the length of belt material which has been pulled out of the seatbelt retractor can be measured using conventional shaft encoder technology using either magnetic or optical systems. An example of an optical encoder is illustrated generally as 1501 in FIG. 26. It consists of an encoder disk 1502 and a receptor 1503 which sends a signal to appropriate circuitry every time a line on the encoder disk passes by the receptor.

Figure 27:
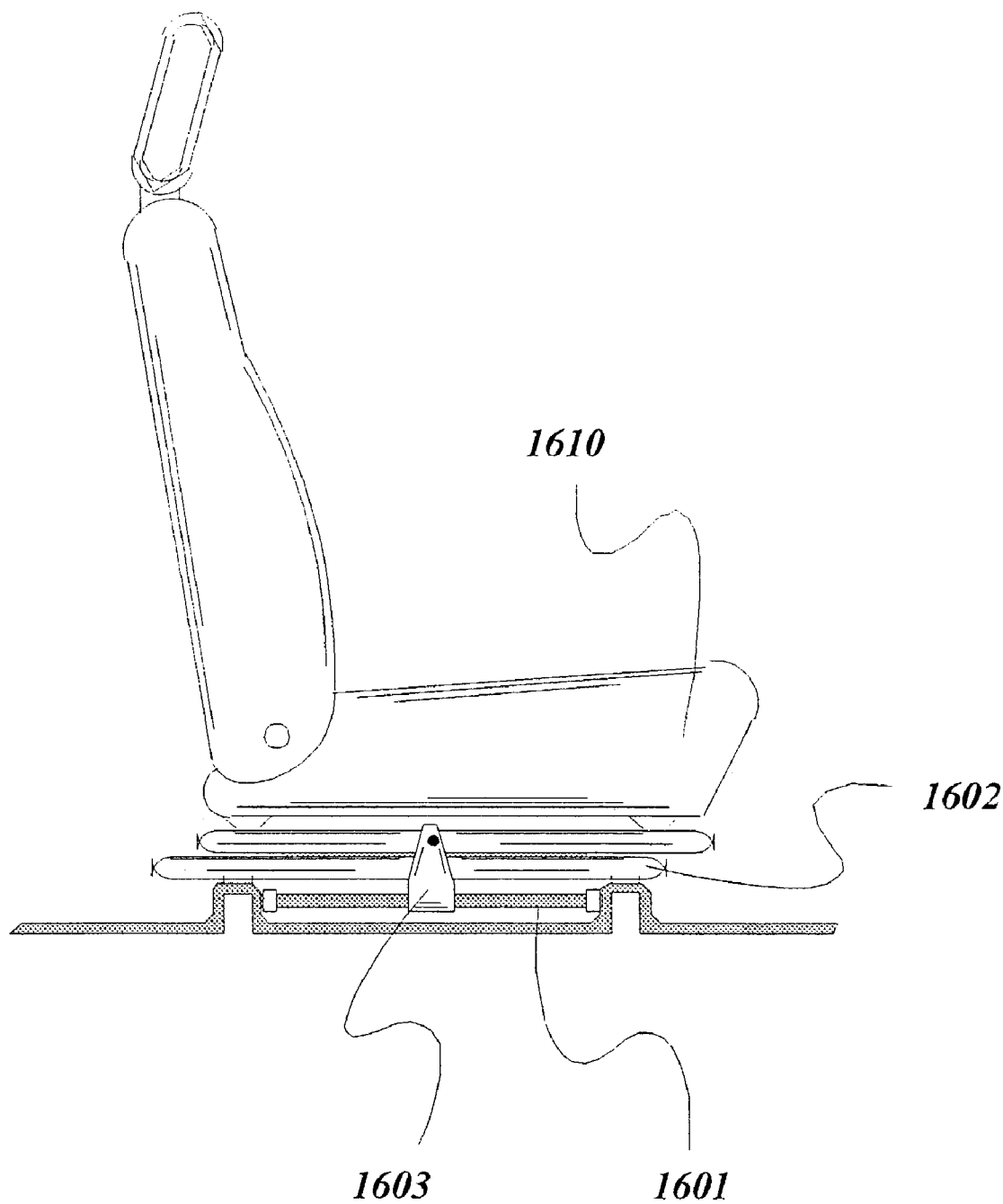
FIG. 27 is a side view of a portion of a seat and seat rail showing a seat position sensor utilizing a potentiometer.

In a similar manner, the position of the seat can be determined through either a linear encoder or a potentiometer as illustrated in FIG. 27. In this case, a potentiometer 1601 is positioned along the seat track 1602 and a sliding brush assembly 1603 is used with appropriate circuitry to determine the fore and aft location of the seat 1610. Naturally, for those seats which permit the seat back angle to be adjusted, a similar measuring system would be used to determine the angle of the seat back. In this manner the position of the seat relative to the airbag module can be determined. This information can be used in conjunction with the seatbelt spool out sensor to confirm the approximate position of the chest of the driver relative to the airbag.

For most cases, the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors would be used for the lap and shoulder portions of the seatbelt and the belt would not be permitted to slip through the "D-ring". The length of belt spooled out from the shoulder belt retractor then becomes a very good confirming measure of the position of the occupant's chest.

Figure 28:
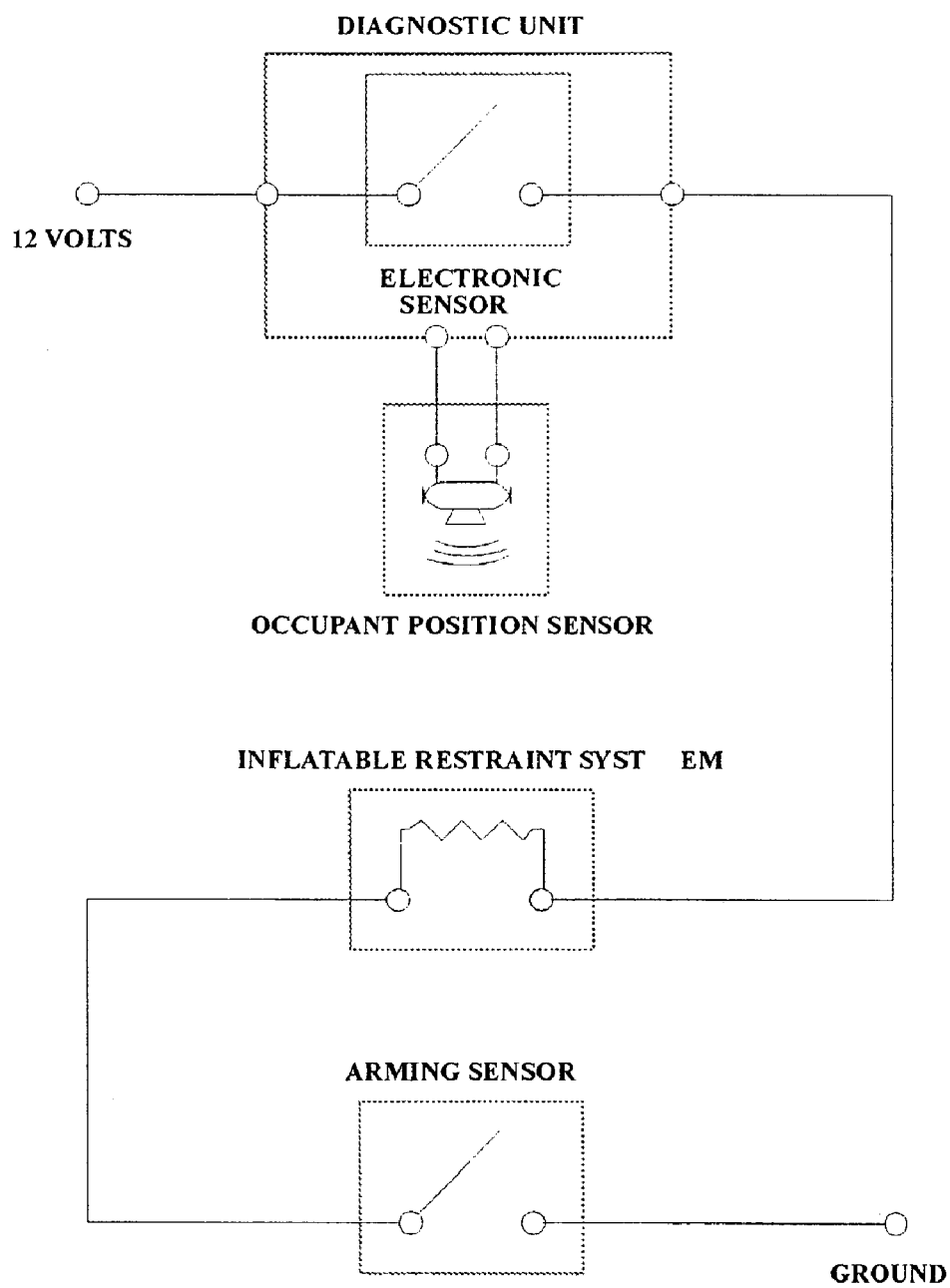
FIG. 28 is a circuit schematic illustrating the use of the occupant position sensor in conjunction with the remainder of the inflatable restraint system.

The occupant position sensor in any of its various forms can be integrated into the airbag system circuitry as shown schematically in FIG. 28. In this example, the occupant position sensors are used as an input to a smart electronic sensor and diagnostic system. The electronic sensor determines whether the airbag should be deployed based on the vehicle acceleration crash pulse, or crush zone mounted crash sensors, and the occupant position sensor determines whether the occupant is too close to the airbag and therefore that the deployment should not take place.

Figure 29:
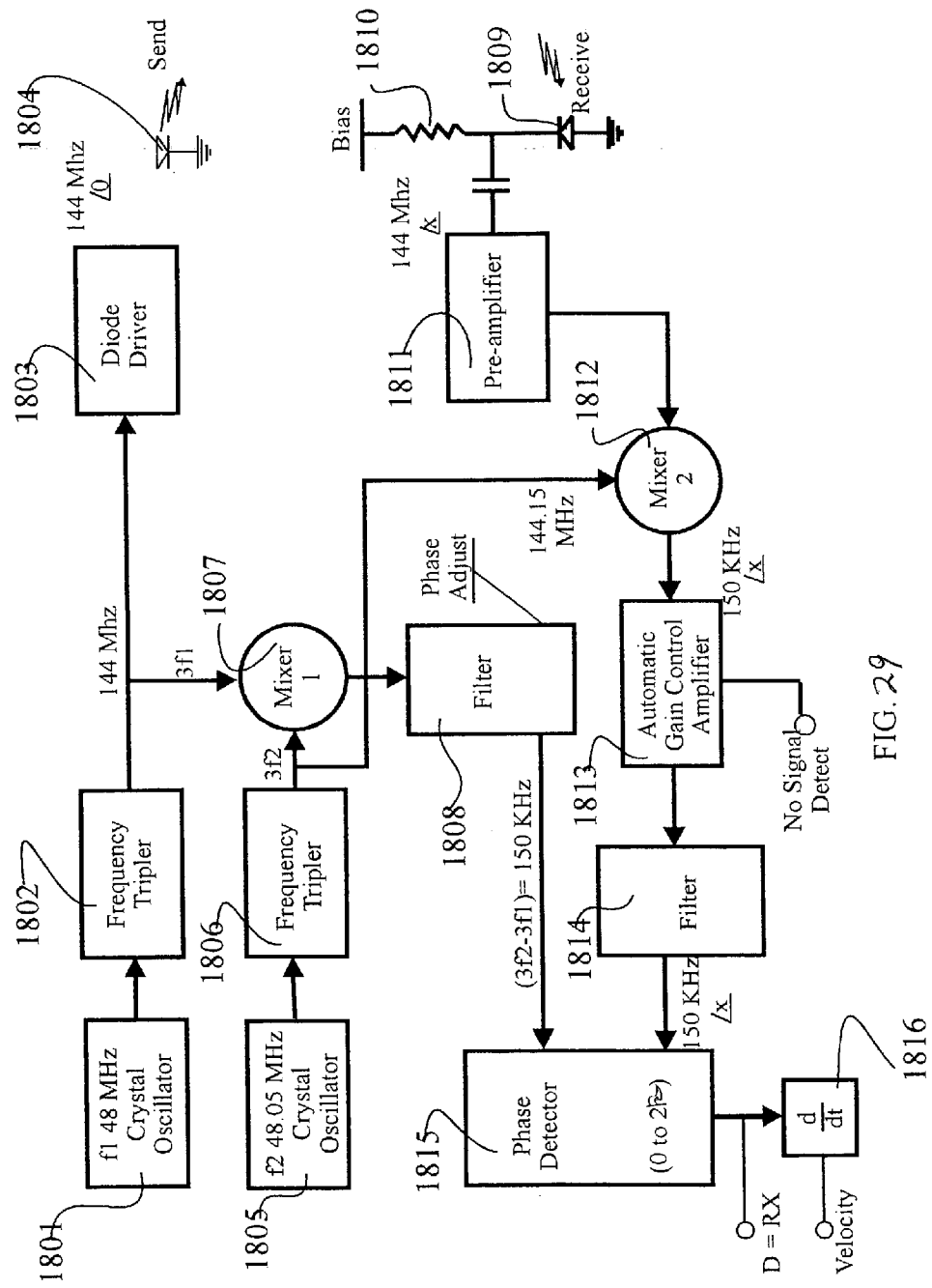
FIG. 29 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 29. The operation is as follows. A 48 MHz signal, f1, is generated by a crystal oscillator 1801 and fed into a frequency tripler 1802 which produces an output signal at 1.44 MHz. The 1.44 MHz signal is then fed into an infrared diode driver 1803 which drives the infrared diode 1804 causing it to emit infrared light modulated at 144 MHz and a reference phase angle of zero degrees. The infrared diode 1804 is directed at the vehicle occupant. A second signal f2 having a frequency of 48.05 MHz, which is slightly greater than f1, is also fed into a frequency tripler 1806 to create a frequency of 144.15 MHz. This signal is then fed into a mixer 1807 which combines it with the 144 MHz signal from frequency tripler 1802. The combined signal from the mixer 1807 is then fed to filter 1808 which removes all signals except for the difference, or beat frequency, between 3 times f1 and 3 times f2, of 150 kHz.

The infrared signal which is reflected from the occupant is received by receiver 1809 and fed into preamplifier 1811. This signal has the same modulation frequency, 144 MHz, as the transmitted signal but now is out of phase with the transmitted signal by an angle x due to the path that the signal took from the transmitter to the occupant and back to the receiver. The output from pre-amplifier 1811 is fed to a second mixer 1812 along with the 144.15 MHz signal from the frequency tripler 1806. The output from mixer 1812 is then amplified by the automatic gain amplifier 1813 and fed into filter 1814. The filter 1814 eliminates all frequencies except for the 150 kHz difference, or beat, frequency in a similar manner as was done by filter 1808. The resulting 150 kHz frequency, however, now has a phase angle x relative to the signal from filter 1808. Both 150 kHz signals are now fed into a phase detector 1815 which determines the magnitude of the phase angle x. It can be shown mathematically that, with the above values, the distance from the transmitting diode to the occupant is x/345.6 where x is measured in degrees and the distance in meters.

The applications described herein have been illustrated using the driver of the vehicle. Naturally the same systems of determining the position of the occupant relative to the airbag apply to the passenger, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries, for example. Finally, there has been much written about the out of position child who is standing or otherwise positioned adjacent to the airbag, perhaps due to pre-crash braking. Naturally, the occupant position sensor described herein can prevent the deployment of the airbag in this situation.

Figure 30:
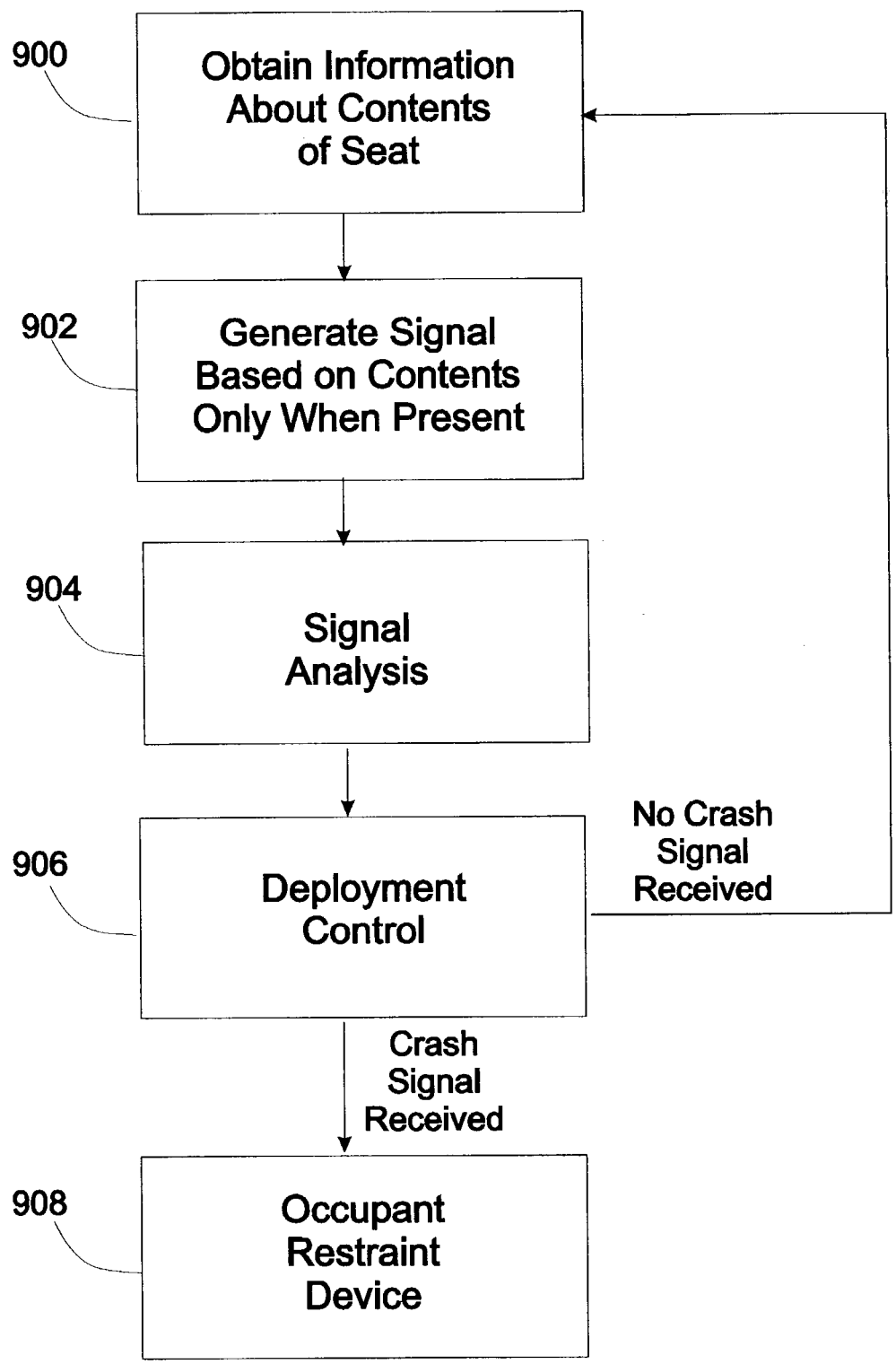
FIG. 30 is a schematic drawing of one embodiment of an occupant restraint device control system in accordance with the invention.

FIG. 30 is a schematic drawing of one embodiment of an occupant restraint device control system in accordance with the invention. The first step is to obtain information about the contents of the seat at 900, when such contents are present on the seat. To this end, a presence sensor can be employed to activate the system only when the presence of an object, or living being, is detected. Next, at 902, a signal is generated based on the contents of the seat, with different signals being generated for different contents of the seat. Thus, while a signal for a dog will be different than the signal for a child set, the signals for different child seats will be not that different. Next, at 904, the signal is analyzed to determine whether a child seat is present, whether a child seat in a particular orientation is present and/or whether a child seat in a particular position is present. Deployment control 906 provides a deployment control signal or command based on the analysis of the signal generated based on the contents of the seat. This signal or command is directed to the occupant protection or restraint device 908 to provide for deployment for that particular contents of the seat. The system continually obtains information about the contents of the seat until such time as a deployment signal is received from, e.g., a crash sensor, to initiate deployment of the occupant restraint device.

Figure 31:
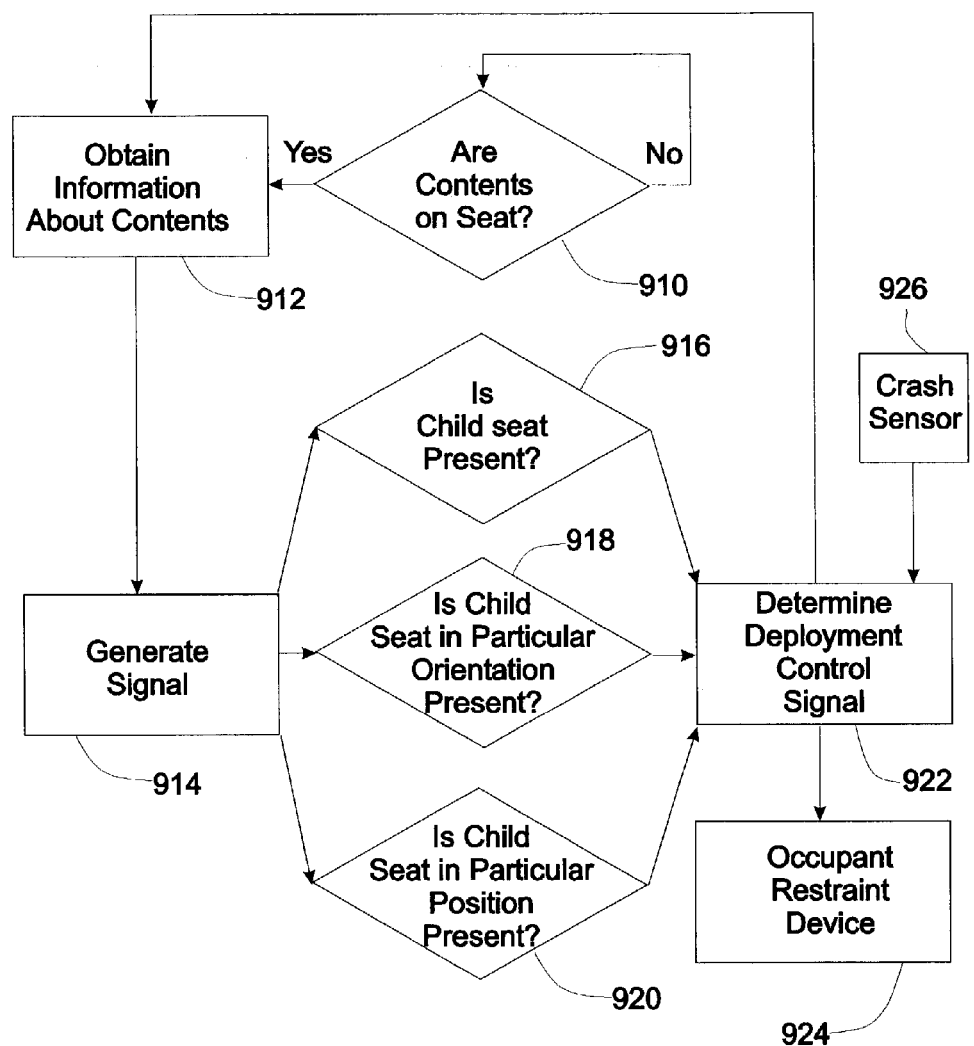
FIG. 31 is a flow chart of the operation of one embodiment of an occupant restraint device control method in accordance with the invention.

FIG. 31 is a flow chart of the operation of one embodiment of an occupant restraint device control method in accordance with the invention. The first step is to determine whether contents are present on the seat at 910. If so, information is obtained about the contents of the seat at 912. At 914, a signal is generated based on the contents of the seat, with different signals being generated for different contents of the seat. The signal is analyzed to determine whether a child seat is present at 916, whether a child seat in a particular orientation is present at 918 and/or whether a child seat in a particular position is present at 920. Deployment control 922 provides a deployment control signal or command based on the analysis of the signal generated based on the contents of the seat. This signal or command is directed to the occupant protection or restraint device 924 to provide for deployment for that particular contents of the seat. The system continually obtains information about the contents of the seat until such time as a deployment signal is received from, e.g., a crash sensor 926, to initiate deployment of the occupant restraint device.

Among the inventions disclosed above is an arrangement for obtaining and conveying information about occupancy of a passenger compartment of a vehicle which comprises at least one wave-receiving sensor for receiving waves from the passenger compartment, generating means coupled to the wave-receiving sensor(s) for generating information about the occupancy of the passenger compartment based on the waves received by the wave-receiving sensor(s) and communications means coupled to the generating means for transmitting the information about the occupancy of the passenger compartment. As such, response personnel can receive the information about the occupancy of the passenger compartment and respond appropriately, if necessary. There may be several wave-receiving sensors and they may be, e.g., ultrasonic wave-receiving sensors, electromagnetic wave-receiving sensors, electric, magnetic or electromagnetic field sensors, antenna near field modification sensing sensors, energy absorption sensors, capacitance sensors, or combinations thereof. The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. Waves may also be from natural sources such as the sun, from lights on a vehicle or roadway, or radiation naturally emitted from the occupant or other object in the vehicle.

One or more memory units may be coupled to the generating means for storing the information about the occupancy of the passenger compartment and to the communications means. The communications means then can interrogate the memory unit(s) upon a crash of the vehicle to thereby obtain the information about the occupancy of the passenger compartment. In one particularly useful embodiment, means for determining the health state of at least one occupant are provided, e.g., a heartbeat sensor, a motion sensor such as a micropower impulse radar sensor for detecting motion of the at least one occupant and motion sensor for determining whether the occupant(s) is/are breathing, and coupled to the communications means. The communications means can interrogate the health state determining means upon a crash of the vehicle, or some other event or even continuously, to thereby obtain and transmit the health state of the occupant(s). The health state determining means can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant(s), or an analysis of waves from the space occupied by the occupant(s). Each wave-receiving sensor generates a signal representative of the waves received thereby and the generating means may comprise a processor for receiving and analyzing the signal from the wave-receiving sensor in order to generate the information about the occupancy of the passenger compartment. The processor can comprise pattern recognition means for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating means is an indication of whether the occupant is breathing. Also, the wave-receiving sensor may generate a signal representative of the waves received thereby and the generating means receive this signal over time and determine whether any occupants in the passenger compartment are moving. As such, the information about the occupancy of the passenger compartment generated by the generating means includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment and thereafter the information with or without pictures of the passenger compartment before, during and/or after a crash or other event can be sent to a remote location such as an emergency services personnel station. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

Other embodiments disclosed above are directed to methods and arrangements for controlling deployment of an airbag. One exemplifying embodiment of an arrangement for controlling deployment of an airbag from an airbag module to protect an occupant in a seat of a vehicle in a crash comprises determining means for determining the position of the occupant or a part thereof, and control means coupled to the determining means for controlling deployment of the airbag based on the determined position of the occupant or part thereof. The determining means may comprise receiver means, e.g., a wave-receiving transducer such as an electromagnetic wave receiver (such as a SAW, CCD, CMOS, capacitor plate or antenna) or an ultrasonic transducer, for receiving waves from a space above a seat portion of the seat and processor means coupled to the receiver means for generating a signal representative of the position of the occupant or part thereof based on the waves received by the receiver means. The determining means can include transmitter means for transmitting waves into the space above the seat portion of the seat which are receivable by the receiver means. The receiver means may be mounted in various positions in the vehicle, including in a door of the vehicle, in which case, the distance between the occupant and the door would be determined, i.e., to determine whether the occupant is leaning against the door, and possibly adjacent the airbag module if it is situated in the door, or elsewhere in the vehicle. The control means are designed to suppress deployment of the airbag, control the time at which deployment of the airbag starts, control the rate of gas flow into the airbag, control the rate of gas flow out of the airbag and/or control the rate of deployment of the airbag.

Another arrangement for controlling deployment of an airbag comprises determining means for determining whether an occupant is present in the seat, and control means coupled to the determining means for controlling deployment of the airbag based on whether an occupant is present in the seat, e.g., to suppress deployment if the seat is unoccupied. The determining means may comprise receiver means, e.g., a wave-receiving transducer such as an ultrasonic transducer, SAW, CCD, CMOS, capacitor plate, capacitance sensor or antenna, for receiving waves from a space above a seat portion of the seat and processor means coupled to the receiver means for generating a signal representative of the presence or absence of an occupant in the seat based on the waves received by the receiver means. The determining means may optionally include transmitter means for transmitting waves into the space above the seat portion of the seat which are receivable by the receiver means. Further, the determining means may be designed to determine the position of the occupant or a part thereof when an occupant is in the seat in which case, the control means are arranged to control deployment of side airbag based on the determined position of the occupant or part thereof.

One method for controlling deployment of an airbag from an airbag module comprising the steps of determining the position of the occupant or a part thereof, and controlling deployment of the airbag based on the determined position of the occupant or part thereof. The position of the occupant or part thereof is determined as in the arrangement described above.

Another method for controlling deployment of an airbag comprises the steps of determining whether an occupant is present in the seat, and controlling deployment of the airbag based on the presence or absence of an occupant in the seat. The presence of the occupant, and optionally position of the occupant or a part thereof, are determined as in the arrangement described above.

Furthermore, disclosed above are methods for controlling a system in the vehicle based on an occupying item in which at least a portion of the passenger compartment in which the occupying item is situated is irradiated, radiation from the occupying item are received, e.g., by a plurality of sensors or transducers each arranged at a discrete location, the received radiation is processed by a processor in order to create one or more electronic signals characteristic of the occupying item based on the received radiation, each signal containing a pattern representative and/or characteristic of the occupying item and each signal is then categorized by utilizing pattern recognition techniques for recognizing and thus identifying the class of the occupying item. In the pattern recognition process, each signal is processed into a categorization thereof based on data corresponding to patterns of received radiation stored within the pattern recognition means and associated with possible classes of occupying items of the vehicle. Once the signal(s) is/are categorized, the operation of the system in the vehicle may be affected based on the categorization of the signal(s), and thus based on the occupying item. If the system in the vehicle is a vehicle communication system, then an output representative of the number of occupants and/or their health or injury state in the vehicle may be produced based on the categorization of the signal(s) and the vehicle communication system thus controlled based on such output. Similarly, if the system in the vehicle is a vehicle entertainment system or heating and air conditioning system, then an output representative of specific seat occupancy may be produced based on the categorization of the signal(s) and the vehicle entertainment system or heating and air conditioning system thus controlled based on such output. In one embodiment designed to ensure safe operation of the vehicle, the attentiveness of the occupying item is determined from the signal(s) if the occupying item is an occupant, and in addition to affecting the system in the vehicle based on the categorization of the signal, the system in the vehicle is affected based on the determined attentiveness of the occupant.

One embodiment of the interior monitoring system in accordance with the invention comprises means for irradiating at least a portion of the passenger compartment in which an occupying item is situated, receiver means for receiving radiation from the occupying item, e.g., a plurality of receivers, each arranged at a discrete location, processor means coupled to the receivers for processing the received radiation from each receiver in order to create a respective electronic signal characteristic of the occupying item based on the received radiation, each signal containing a pattern representative of the occupying item, categorization means coupled to the processor means for categorizing the signals, and output means coupled to the categorization means for affecting another system within the vehicle based on the categorization of the signals characteristic of the occupying item. The categorization means may use a pattern recognition technique for recognizing and thus identifying the class of the occupying item by processing the signals into a categorization thereof based on data corresponding to patterns of received radiation and associated with possible classes of occupying items of the vehicle. Each signal may comprise a plurality of data, all of which is compared to the data corresponding to patterns of received radiation and associated with possible classes of contents of the vehicle. In one specific embodiment, the system includes location determining means coupled to the processor means for determining the location of the occupying item, e.g., based on the received radiation such that the output means which are coupled to the location determining means, in addition to affecting the other system based on the categorization of the signals characteristic of the occupying item, affect the system based on the determined location of the occupying item. In another embodiment to determine the presence or absence of an occupant, the categorization means comprise pattern recognition means for recognizing the presence or absence of an occupying item in the passenger compartment by processing each signal into a categorization thereof signal based on data corresponding to patterns of received radiation and associated with possible occupying items of the vehicle and the absence of such occupying items.

Disclosed above is also an arrangement for controlling audio reception by at least one occupant of a passenger compartment of the vehicle which comprises a monitoring system for determining the position of the occupant(s) and sound generating means coupled to the monitoring system for generating specific sounds. The sound generating means are automatically adjustable based on the determined position of the occupant(s) such that the specific sounds are audible to the occupant(s). The sound generating means may utilize hypersonic sound, e.g., comprise one or more pairs of ultrasonic frequency generators for generating ultrasonic waves whereby for each pair, the ultrasonic frequency generators generate ultrasonic waves which mix to thereby create new audio frequencies. Each pair of ultrasonic frequency generators is controlled independently of the others so that each of the occupants is able to have different new audio frequencies created.

For noise cancellation purposes, the vehicle can include a system for detecting the presence and direction of unwanted noise whereby the sound generating means are coupled to the unwanted noise presence and detection system and direct sound to prevent reception of the unwanted noise by the occupant(s).

If the sound generating means comprise speakers, the speakers being controllable based on the determined positions of the occupants such that at least one speaker directs sounds toward each occupant.

The monitoring system may be any type of system which is capable of determining the location of the occupant, or more specifically, the location of the head or ears of the occupants. For example, the monitoring system may comprise at least one wave-receiving sensor for receiving waves from the passenger compartment, and a processor coupled to the wave-receiving sensor(s) for determining the position of the occupant(s) based on the waves received by the wave-receiving sensor(s). The monitoring system can also determine the position of objects other than the occupants and control the sound generating means in consideration of the determined position of the objects.

A method for controlling audio reception by occupants in a vehicle comprises the steps of determining the position of at least one occupant of the vehicle, providing a sound generator for generating specific sounds and automatically adjusting the sound generator based on the determined position of the occupant(s) such that the specific sounds are audible to the occupant(s). The features of the arrangement described above may be used in the method.

Another arrangement for controlling audio reception by occupants of a passenger compartment of the vehicle comprises a monitoring system for determining the presence of any occupants and sound generating means coupled to the monitoring system for generating specific sounds. The sound generating means are automatically adjustable based on the determined presence of any occupants such that the specific sounds are audible to any occupants present in the passenger compartment. The monitoring system and sound generating means may be as in the arrangement described above. However, in this case, the sound generating means are controlled based on the determined presence of the occupants.

Also disclosed above is a vehicle including a system for obtaining information about an object in the vehicle, comprises at least one resonator or reflector arranged in association with the object, each resonator emitting an energy signal upon receipt of a signal at an excitation frequency, a transmitter device for transmitting signals at least at the excitation frequency of each resonator, an energy signal detector for detecting the energy signal emitted by each resonator upon receipt of the signal at the excitation frequency, and a processor coupled to the detector for obtaining information about the object upon analysis of the energy signal detected by the detector.

The information obtained about the object may be a distance between each resonator and the detector, which positional information is useful for controlling components in the vehicle such as the occupant restraint or protection device.

If the object is a seat, the information obtained about the seat may be an indication of the position of the seat, the position of the back cushion of the seat, the position of the bottom cushion of the seat, the angular orientation of the seat, and other seat parameters.

The resonator(s) may be arranged within the object and may be a SAW device, antenna and/or RFID tag. When several resonators are used, each may be designed to emit an energy signal upon receipt of a signal at a different excitation frequency. The resonators may be tuned resonators including an acoustic cavity or a vibrating mechanical element.

If the object is a seatbelt, the information obtained about the seatbelt may be an indication of whether the seatbelt is in use and/or the position of the seatbelt.

If the object is a child seat, the information obtained about the child seat may be whether the child seat is present and whether the child seat is rear-facing, front-facing, etc. (i.e., its orientation).

If the object is a window of the vehicle, the information obtained about the window may be an indication of whether the window is open or closed, or the state of openness.

If the object is a door, a resonator may be arranged in a surface facing the door such that closure of the door prevents emission of the energy signal from the resonator, whereby the information obtained about the door is an indication of whether the door is open or closed.

In another embodiment, the vehicle comprises at least one reflector arranged in association with the object and arranged to reflect an energy signal, a transmitter for transmitting energy signals in a direction of each of reflector, an energy signal detector for detecting energy signals reflected by the reflector(s), and a processor coupled to the detector for obtaining information about the object upon analysis of the energy signal detected by the detector. The reflector may be a parabolic-shaped reflector, a corner cube reflector, a cube array reflector, an antenna reflector and other types of reflector or reflective devices. The transmitter may be an infrared laser system in which case, the reflector comprises an optical mirror.

The information obtained about the object may be a distance between each reflector and the detector, which positional information is useful for controlling components in the vehicle such as the occupant restraint or protection device. If the object is a seat, the information obtained about the seat may be an indication of the position of the seat, the position of the back cushion of the seat, the position of the bottom cushion of the seat, the angular orientation of the seat, and other seat parameters. If the object is a seatbelt, the information obtained about the seatbelt may be an indication of whether the seatbelt is in use and/or the position of the seatbelt. If the object is a child seat, the information obtained about the child seat may be whether the child seat is present and whether the child seat is rear-facing, front-facing, etc. If the object is a window of the vehicle, the information obtained about the window may be an indication of whether the window is open or closed, or the state of openness. If the object is a door, a reflector may be arranged in a surface facing the door such that closure of the door prevents reflection of the energy signal from the reflector, whereby the information obtained about the door is an indication of whether the door is open or closed.

Another embodiment of a motor vehicle detection system to achieve some of the above-listed objects comprises at least one transmitter for transmitting energy signals toward a target in a passenger compartment of the vehicle, at least one reflector arranged in association with the target, and at least one detector for detecting energy signals reflected by the reflector(s). A processor is optionally coupled to the detector(s) for obtaining information about the target upon analysis of the energy signal detected by the detector(s).

All of the above-described methods and apparatus may be used in conjunction with one another and in combination with the methods and apparatus for optimizing the driving conditions for the occupants of the vehicle described herein.

Although several preferred embodiments are illustrated and described above, there are possible combinations using other geometries, sensors, materials and different dimensions for the components that perform the same functions. This invention is not limited to the above embodiments and should be determined by the following claims.

We claim:

1. A vehicle including a system for obtaining information about objects in the vehicle, comprising:
   a rear-view minor including a mirror part and a support for mounting said mirror part to the vehicle;
   a wave-receiving system arranged on said mirror for receiving waves from spaces above at least one seat of the vehicle in which at least one of the objects would normally be situated; and
   a processor coupled to said wave-receiving system and arranged to obtain information about the at least one object based on the waves received by said wave-receiving system.

2. The vehicle of claim 1, wherein said wave-receiving system comprises an infrared receiver.

3. The vehicle of claim 1, wherein said wave-receiving system comprises a transmitter/receiver capable of transmitting and receiving waves.

4. The vehicle of claim 1, wherein said wave-receiving system comprises an ultrasonic wave receiver.

5. The vehicle of claim 1, wherein said wave-receiving system comprises an array for displaying infrared light reflected from or generated by the at least one object.

6. The vehicle of claim 1, wherein said processor is arranged to identify the at least one object based on the waves received by said wave-receiving system.

7. The vehicle of claim 1, wherein said processor is arranged to ascertain the identity of the at least one object based on the waves received by said wave-receiving system.

8. The vehicle of claim 1, wherein said processor is arranged to determine the position of the at least one object based on the waves received by said wave-receiving system.

9. The vehicle of claim 1, wherein said processor is arranged to determine movement of the at least one object based on the waves received by said wave-receiving system.

10. The vehicle of claim 1, wherein said processor is arranged to determine the distance between said wave-receiving system and the at least one object based on the waves received by said wave-receiving system.

11. The vehicle of claim 1, wherein said wave-receiving system comprises a transmitter/receiver capable of transmitting and receiving waves, said processor being arranged to determine the distance between said transmitter/receiver and the at least one object based on the waves transmitted and received by said transmitter/receiver.

12. The vehicle of claim 1, further comprising a wave transmitter arranged to transmit waves into the spaces above the at least one seat.

13. The vehicle of claim 1, wherein said processor embodies a pattern recognition system for obtaining information about the at least one object based on training designed to create an algorithm capable of processing data on the waves received by said wave-receiving system into information about the at least one object.

14. The vehicle of claim 1, wherein said support is arranged to mount said minor to a windshield of the vehicle.

15. A method for obtaining information about objects of the vehicle, comprising:
mounting a rear view minor to the vehicle;
arranging a wave-receiving system on the mirror,
operatively actuating the wave-receiving system to receive waves from spaces above at least one seat of the vehicle in which at least one of the objects would normally be situated including when present in the seat; and
processing the received waves to obtain information about the at least one object in the seats.

16. The method of claim 15, further comprising transmitting waves into the spaces above the at least one seat.

17. The method of claim 15, wherein the step of processing the received waves comprises identifying the at least one object based on the received waves.

18. The method of claim 15, wherein the step of processing the received waves comprises ascertaining the identity of the at least one object based on the received waves.

19. The method of claim 15, wherein the step of processing the received waves comprises determining the position of the at least one object based on the received waves.

20. The method of claim 15, wherein the step of processing the received waves comprises determining movement of the at least one object based on the received waves.

21. The method of claim 15, wherein the step of processing the received waves comprises applying a pattern recognition system including an algorithm capable of processing data on the received waves into information about the at least one object.

22. The method of claim 15, wherein the step of mounting the mirror to the vehicle comprises mounting the minor to a windshield of the mirror.

* * * * *

UNITED STATES PATENT AND TRADEMARK OFFICE
CERTIFICATE OF CORRECTION

PATENT NO. : 7,134,687 B2 Page 1 of 1
APPLICATION NO. : 10/365129
DATED : November 14, 2006
INVENTOR(S) : David S. Breed It is certified that error appears in the above-identified patent and that said Letters Patent is hereby corrected as shown below:

Col. 3, line 3, change "May" to --Mar.--.

Col. 3, line 13, change "a is" to --is a--.

Col. 3, line 15, after "which" insert --is a--.

Signed and Sealed this

Twenty-third Day of January, 2007

JON W. DUDAS
*Director of the United States Patent and Trademark Office*